(12) United States Patent
Katoh

(10) Patent No.: US 9,898,598 B2
(45) Date of Patent: Feb. 20, 2018

(54) AUTHENTICATION SYSTEM HAVING A NON-VOLATILE MEMORY INCLUDING MEMORY CELLS IN INITIAL OR VARIABLE STATES AND A HOST COMPUTER FOR PERFORMING AUTHENTICATION THEREBETWEEN

(71) Applicant: Panasonic Intellectual Property Management Co., Ltd., Osaka (JP)

(72) Inventor: Yoshikazu Katoh, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 204 days.

(21) Appl. No.: 14/684,883

(22) Filed: Apr. 13, 2015

(65) Prior Publication Data

US 2015/0227738 A1  Aug. 13, 2015

Related U.S. Application Data

(63) Continuation of application No. PCT/JP2014/001112, filed on Feb. 28, 2014.

(30) Foreign Application Priority Data

Feb. 28, 2013 (JP) .................... 2013-039785

(51) Int. Cl.
*G06F 21/44* (2013.01)
*G09C 1/00* (2006.01)
(Continued)

(52) U.S. Cl.
CPC .............. *G06F 21/44* (2013.01); *G09C 1/00* (2013.01); *G11C 7/1006* (2013.01);
(Continued)

(58) Field of Classification Search
None
See application file for complete search history.

(56) References Cited

U.S. PATENT DOCUMENTS

2007/0028118 A1* 2/2007 Brown ................ G06Q 20/341
                                                                   713/185
2008/0162804 A1* 7/2008 Iida ........................ G06F 21/31
                                                                   711/112
(Continued)

FOREIGN PATENT DOCUMENTS

JP   2006-351780 A   12/2006
JP   2008-066438 A   3/2008
JP   2010-193013 A   9/2010

OTHER PUBLICATIONS

International Search Report issued in PCT/JP2014/001112, dated May 27, 2014, with English translation.

*Primary Examiner* — Henry Tsang
(74) *Attorney, Agent, or Firm* — McDermott Will & Emery LLP

(57) ABSTRACT

An authentication system comprises a host computer; and a non-volatile memory that includes a memory cell array including a plurality of memory cells are arranged in array, the plurality of memory cells including: a memory cell in a variable state, in which a resistance value reversibly changes between a plurality of changeable resistance value ranges in accordance with an electric signal applied; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data including first authentication data is stored on the basis of whether each of (Continued)

the plurality of memory cells is in the initial state or the variable state, wherein at least one of the host computer and the non-volatile memory stores second authentication data, and wherein at least one of the host computer and the non-volatile memory is operative to perform authentication on the basis of the first authentication data and the second authentication data.

20 Claims, 28 Drawing Sheets

(51) Int. Cl.
| | | |
|---|---|---|
| *G11C 13/00* | (2006.01) | |
| *H04L 9/32* | (2006.01) | |
| *G11C 7/10* | (2006.01) | |
| *G11C 11/00* | (2006.01) | |

(52) U.S. Cl.
CPC ........ *G11C 11/005* (2013.01); *G11C 13/0007* (2013.01); *G11C 13/0059* (2013.01); *G11C 13/0069* (2013.01); *H04L 9/32* (2013.01); *H04L 9/3278* (2013.01); *G11C 2013/0083* (2013.01); *H04L 2209/12* (2013.01)

(56) References Cited

U.S. PATENT DOCUMENTS

| | | | |
|---|---|---|---|
| 2010/0322008 | A1 | 12/2010 | Yoneya et al. |
| 2011/0110144 | A1* | 5/2011 | Kawai ................. G11C 11/5685 365/148 |
| 2011/0116296 | A1 | 5/2011 | Kitagawa et al. |
| 2011/0228587 | A1 | 9/2011 | Ito |
| 2012/0030268 | A1 | 2/2012 | Liu et al. |
| 2012/0044777 | A1 | 2/2012 | Fujiwara et al. |
| 2012/0081946 | A1 | 4/2012 | Kawabata et al. |

* cited by examiner

Hexadecimal form

| | | | | | |
|---|---|---|---|---|---|
| 255 | 255 | 255 | 255 | | 0 |
| 255 | 255 | 255 | 9 | | 1 |
| 255 | 255 | 10 | 255 | | 2 |
| 255 | 255 | 11 | 9 | | 3 |
| 255 | 11 | 255 | 255 | | 4 |
| 255 | 9 | 255 | 10 | | 5 |
| 255 | 10 | 10 | 255 | | 6 |
| 255 | 10 | 10 | 10 | | 7 |
| 15 | 255 | 255 | 255 | | 8 |
| 11 | 255 | 255 | 9 | | 9 |
| 13 | 255 | 10 | 255 | | A |
| 9 | 255 | 9 | 10 | | B |
| 9 | 10 | 255 | 255 | | C |
| 9 | 10 | 255 | 9 | | D |
| 9 | 10 | 9 | 255 | | E |
| 9 | 11 | 10 | 10 | | F |

Fig.15

Hexadecimal form

| | | | | | |
|---|---|---|---|---|---|
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 255 | 255 | 255 | 255 | | 0 |
| 11 | 255 | 255 | 255 | | 8 |
| 10 | 255 | 255 | 255 | | 8 |
| 11 | 255 | 255 | 255 | | 8 |
| 10 | 255 | 21 | 255 | | A |
| 11 | 255 | 255 | 255 | | 8 |

Fig.16

AUTHENTICATION SYSTEM HAVING A NON-VOLATILE MEMORY INCLUDING MEMORY CELLS IN INITIAL OR VARIABLE STATES AND A HOST COMPUTER FOR PERFORMING AUTHENTICATION THEREBETWEEN This is a continuation application under 35 U.S.C 111(a) of pending prior International application No. PCT/JP2014/001112, filed on Feb. 28, 2014, which in turn claims the benefit of Japanese Application No. 2013-039785, filed on Feb. 28, 2013, the disclosures of which Applications are incorporated by reference herein.

BACKGROUND OF THE INVENTION

1. Field of the Invention

The present disclosure relates to an authentication system, a non-volatile memory, a host computer and an authentication method. More particularly, the present disclosure relates to an authentication system, a non-volatile memory, a host computer and an authentication method, which employ a novel data storing method.

2. Description of the Related Art

Japanese Laid-Open Patent Application Publication No. 2008-165439 (Patent Literature 1) discloses a magnetic disc device including a storage medium section including a storage medium, a magnetic disc medium section including a magnetic disc medium, a storage means which stores data transmitted from a host in the storage medium, a first verification means which verifies a password input externally with a password pre-stored in the storage medium or a semiconductor memory configured on the same board as that of the storage medium, and a control means which is provided in the storage medium section and controls access to the magnetic disc medium configured in the magnetic disc medium section according to a result of the verification of the first verification means.

Japanese Laid-Open Patent Application Publication No. 2010-193013 (Patent Literature 2) discloses a cipher key protecting method of a semiconductor memory device including a non-volatile memory including a memory cell array and being configured to encrypt file data input, store the encrypted file data in a portion of the non-volatile memory, and store management information including a key used to decrypt the encrypted file data, in another portion of the non-volatile memory, in which method, in a first state in which password reference by using the management information is valid, the input password is verified, and the encrypted file data is permitted to be decrypted by the key based on a result of the verification, while in a second state in which the password reference by using the management information is invalid, the encrypted file data is permitted to be decrypted by the key without an input of the password, the management information indicating that the first state is formed is stored in the memory cell array by using a first threshold voltage and a second threshold voltage which is lower than the first threshold voltage, and the management information indicating that the second state is formed is stored in the memory cell array by using a third threshold voltage and a fourth threshold voltage which is lower than the third threshold voltage.

SUMMARY OF THE INVENTION

One non-limiting and exemplary embodiment provide a novel data storing method which is not provided in a prior art, and is applicable to a safer encryption technique, and the like, in a non-volatile memory device.

The other non-limiting and exemplary embodiment provide a safer authentication technique which employs the novel data storing method which is not provided in the prior art, in the non-volatile memory device.

In one general aspect, the techniques disclosed here feature is an authentication system comprising: a host computer; and a non-volatile memory that includes a memory cell array including a plurality of memory cells, the plurality of memory cells including: a memory cell in a variable state, in which a resistance value reversibly changes between a plurality of changeable resistance value ranges in accordance with an electric signal applied thereto; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data including first authentication data is stored on the basis of whether each of the plurality of memory cells is in the initial state or the variable state, wherein at least one of the host computer and the non-volatile memory stores second authentication data, and wherein at least one of the host computer and the non-volatile memory is operative to perform authentication on the basis of the first authentication data and the second authentication data.

According to one general aspect of the techniques, it becomes possible to achieve an advantage that it becomes possible to provide a safer cipher technique which employs a novel data storing method which is not provided in the prior art, in a non-volatile memory device.

BRIEF DESCRIPTION OF DRAWINGS

FIG. 15 is a table showing the exemplary result of reading of data in a special read mode from the memory cell to which the data is written in the special write mode of FIG. 14.

FIG. 16 is a table showing the exemplary result of reading of data in a normal read mode from the memory cell to which the data is written in the special write mode of FIG. 14.

DESCRIPTION OF THE PREFERRED EMBODIMENT

Figure 1:
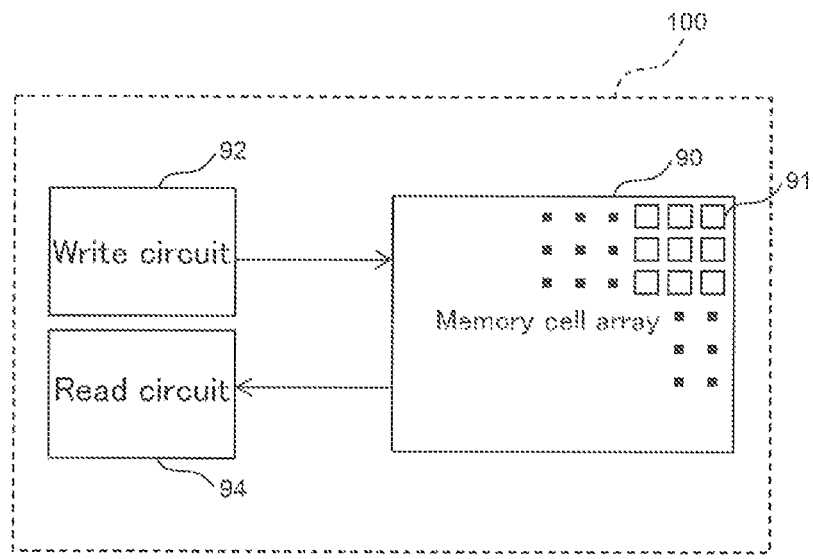
FIG. 1 is a block diagram showing the exemplary schematic configuration of a non-volatile memory device according to Reference embodiment 1.

Hereinafter, the embodiments of the present disclosure will be described with reference to the attached drawings.

The embodiments described hereinafter are preferred specific examples of the present disclosure. Numeric values, shapes, materials, constituents (elements), layout positions of the constituents, connection form of the constituents, steps, the order of the steps, etc., which are illustrated in the embodiments described below, are merely exemplary, and are not intended to limit the present disclosure. Also, among the constituents in the embodiments described below, the constituents which are not recited in independent claims defining a broadest concept of the present disclosure will be described as arbitrary constituents constituting a more desirable embodiment. Description of the constituents designated by the same reference symbols in the drawings will be sometimes omitted. For easier understanding, in the drawings, the constituents are schematically shown, and their shapes, dimension ratio, etc., are not sometimes accurate. Moreover, in a manufacturing method, the order of the steps, etc., can be changed and other known steps may be added as necessary.

Reference Embodiment 1

A non-volatile memory device of Reference embodiment 1, comprises a memory cell array that includes a plurality of memory cells, the plurality of memory cells including: a memory cell in a variable state, in which a resistance value reversibly changes between a plurality of changeable resistance value ranges in accordance with an electric signal applied thereto; and a memory cell in an initial state, which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data is stored on the basis of whether each of the plurality of memory cells is in the initial state or the variable state.

In this configuration, it becomes possible to provide a novel data storing method which is not provided in a prior art, and is applicable to a safer encryption technique, and the like, in a non-volatile memory device.

The phrase "initial resistance value range which does not overlap with the changeable resistance value ranges" refers to the fact that when a particular resistance value is within the initial resistance value range, this resistance value is not within the changeable resistance value ranges, while when a particular resistance value is within the changeable resistance value ranges, this resistance value is not within the initial resistance value range.

It is sufficient that the plurality of memory cells include at least the memory cell in the initial state and the memory cell in the variable state, and may partially include, for example, a failure memory cell in which a resistance value is not within the initial resistance value range and the changeable resistance value ranges. In some cases, there may cause a failure memory cell, because the resistance value of the memory cell which fell into the changeable resistance value range is within the initial resistance value range with a passage of time. Such a failure memory cell emerges, for example, in a case where the memory cell is left under a high-temperature environment, and thereby the resistance value changes. The data of the failure memory cell is corrected into correct data by, for example, error correction.

The phrase "data is stored on the basis of whether each of the memory cells is in the initial state or the variable state", specifically refers to the fact that the data is stored by allocating each information (e.g. integer value such as "0" or "1") such that the information corresponds to the state of the memory cell (one of the initial state and the plurality of variable states). More specifically, for example, the phrase "data is stored on the basis of whether each of the memory cells is in the initial state or the variable state", refers to the fact that binary data is stored in the memory cell in such a manner that a case where the memory cell is in the initial state is allocated to the first value of the data, and a case where the memory cell is in the variable state is allocated to the second value of the data.

The forming stress may be larger in magnitude than the plurality of different electric signals applied to reversibly change the resistance value of the memory cell in the variable state between the changeable resistance value ranges. For example, the forming stress is larger in at least one of amplitude and pulse width than the plurality of different electric signals applied to reversibly change the resistance value of the memory cell in the variable state.

Or, for example, in a case where the memory cell in the variable state is selectively placed in a high-resistance state or a low-resistance state, three-valued data may be stored in the memory cell in such a manner that a case where the memory cell is in the initial state is allocated to the first value of the data, a case where the memory cell is in the high-resistance state is allocated to the second value of the data, and a case where the memory cell is in the low-resistance state is allocated to the third value of the data. More specifically, for example, the second value and the third value are allocated to correspond to the different changeable resistance value ranges, respectively.

In the above non-volatile memory device, a lower limit of the initial resistance value range may be equal to or larger than upper limits of all of the changeable resistance value ranges.

In the above non-volatile memory device, an upper limit of the initial resistance value range may be equal to or smaller than lower limits of all of the changeable resistance value ranges.

In the above non-volatile memory device, when N is an integer which is equal to or larger than 3, the memory cell in the variable state may change between (N−1) changeable resistance value ranges in accordance with an electric signal applied thereto, and in the memory cell array, multi-valued data may be stored, on the basis of which of N resistance value ranges including the initial resistance value range and the (N−1) changeable resistance value ranges, the resistance value of each of the memory cells is within.

The "multi-valued data" refers to data which is more in value than the "binary (two-valued) data". Specifically, for example, the "multi-valued data" may be three-valued data, four-valued data, etc.

The above non-volatile memory device may comprise a read circuit operative to read the stored data, by determining whether the selected memory cell is in the initial resistance value range or the variable state.

In the above non-volatile memory device, a lower limit of the initial resistance value range may be larger in resistance value than upper limits of all of the changeable resistance value ranges, and the above non-volatile memory device may further comprise a read circuit configured such that when a first threshold is equal to or smaller than a lower limit of the initial resistance value range, and is equal to or larger than an upper limit of one of the plurality of changeable resistance value ranges, corresponding to a largest resistance value, and a second threshold is equal to or smaller than a lower limit of one of the plurality of changeable resistance value ranges, corresponding to the largest resistance value and is equal to or larger than an upper limit of one of the plurality of changeable resistance value ranges, corresponding to a smallest resistance value, the read circuit reads the stored data, by selectively executing a first read mode for determining whether or not the resistance value of a selected memory cell is larger than the first threshold, or a second read mode for determining whether or not the resistance value of the selected memory cell is larger than the second threshold.

Note that the determination as to the resistance value may be performed by directly detecting the resistance value, or by detecting another physical amount (e.g., current amount and attenuation time of voltage amount, etc.) relating to the resistance value.

In the above non-volatile memory device, an upper limit of the initial resistance value range may be equal to or smaller than lower limits of all of the changeable resistance value ranges, and the above non-volatile memory device may further comprise a read circuit configured such that when a first threshold is equal to or larger than an upper limit of the initial resistance value range, and is equal to or smaller than a lower limit of one of the plurality of changeable resistance value ranges, corresponding to a smallest resistance value, and a second threshold is equal to or larger than an upper limit of one of the plurality of changeable resistance value ranges, corresponding to the smallest resistance value and is equal to or smaller than a lower limit of one of the plurality of changeable resistance value ranges, corresponding to a largest resistance value, the read circuit reads the stored data, by selectively executing a first read mode for determining whether or not the resistance value of a selected memory cell is larger than the first threshold, or a second read mode for determining whether or not the resistance value of the selected memory cell is larger than the second threshold.

In the above non-volatile memory device, the stored data may include first-kind data and second-kind data, the first-kind data may be stored on the basis of whether or not the resistance value of each of the memory cells is within the initial resistance value range, and the second-kind data may be stored without utilizing whether or not the resistance value of each of the memory cells is within the initial resistance value range and on the basis of whether or not the resistance value of each of the memory cells is within at least one of the changeable resistance value ranges. Specifically, for example, the second-kind data may be stored in such a manner that different values (e.g. integer value such as "0" or "1") are allocated to the plurality of changeable resistance value ranges, respectively.

In the above non-volatile memory device, when N is an integer which is equal to or larger than 3, M1 is a positive integer which is equal to or smaller than N, and M2 is a positive integer which is equal to or smaller than (N−1), the first-kind data may be stored on the basis of which of M1 resistance value ranges which do not overlap with each other and include the initial resistance value range, the resistance value of each of the memory cells is within, the second-kind data may be stored on the basis of which of M2 resistance value ranges which do not overlap with each other and do not include the initial resistance value range, the resistance value of each of the memory cells is within, and (M1−1) resistance value ranges which do not include the initial resistance value range, of the M1 resistance value ranges used to store the first-kind data, may be identical to one of the M2 resistance value ranges used to store the second-kind data.

In the above non-volatile memory device, when N is an integer which is equal to or larger than 3, M1 is a positive integer which is equal to or smaller than N, and M2 is a positive integer which is equal to or smaller than (N−1), the first-kind data may be stored on the basis of which of M1 resistance value ranges which do not overlap with each other and include the initial resistance value range, the resistance value of each of the memory cells is within, the second-kind data may be stored on the basis of which of M2 resistance value ranges which do not overlap with each other and do not include the initial resistance value range, the resistance value of each of the memory cells is within, and at least one of (M1−1) resistance value ranges which do not include the initial resistance value range, of the M1 resistance value ranges used to store the first-kind data, may be different from the M2 resistance value ranges used to store the second-kind data.

The above non-volatile memory device may further comprise a read circuit, wherein the read circuit may selectively execute a first read mode for reading the first-kind data using a first-kind threshold group including (M1−1) thresholds, or a second read mode for reading the second-kind data using a second-kind threshold group including (M2−1) thresholds, wherein the first-kind threshold group includes a first threshold which is equal to or smaller than a lower limit of the initial resistance value range and is equal to or larger than an upper limit of one of the plurality of changeable resistance value ranges, corresponding to a largest resistance value, and the thresholds included in the second-kind threshold group may be equal to or smaller than one of the plurality of changeable resistance value ranges, corresponding to a largest resistance value.

The above non-volatile memory device may further comprise a read circuit, wherein the read circuit may selectively execute a first read mode for reading the first-kind data using a first-kind threshold group including (M1−1) thresholds, or a second read mode for reading the second-kind data using a second-kind threshold group including (M2−1) thresholds, wherein the first-kind threshold group includes a first threshold which is equal to or larger than an upper limit of the initial resistance value range and is equal to or smaller than a lower limit of one of the plurality of changeable resistance value ranges, corresponding to a smallest resistance value, and the thresholds included in the second-kind threshold group may be equal to or larger than an upper limit of one of the plurality of changeable resistance value ranges, corresponding to the smallest resistance value.

In the above non-volatile memory device, the read circuit may include a driver for applying a read voltage to a selected memory cell; a constant current source for flowing a constant current through the memory cell at a predetermined current amount; a counter circuit for counting time that passes from when the driver stops application of the read voltage until a voltage of the memory cell becomes smaller than a predetermined determination voltage; and a comparator circuit for comparing the time counted by the counter circuit to predetermined determination time; wherein between a mode for reading the first-kind data and a mode for reading the second-kind data, at least one of the read voltage, the predetermined current amount, the predetermined determination voltage, and the predetermined determination time may be different.

In the above non-volatile memory device, the memory cell array may include a first write address area and a second write address area, the first-kind data may be stored in the first write address area, and the second-kind data may be stored in the second write address area.

In the above non-volatile memory device, the memory cell array may have a characteristic in which a memory cell which changes from the initial state to the variable state by application of an electric stress for causing the memory cell to change from the initial state to the variable state, and a memory cell maintained in the initial state, despite the application of the electric stress, occur randomly, and the first-kind data may be data generated by an event that the memory cell which changes from the initial state to the variable state occurs randomly.

In the above non-volatile memory device, each of the plurality of memory cells may include a variable resistance element including a first electrode, a second electrode, and a variable resistance layer provided between the first electrode and the second electrode, and the variable resistance layer of the variable resistance element included in the memory cell in the initial state may insulate the first electrode and the second electrode from each other.

A data storing method of Reference embodiment 1 comprises preparing a non-volatile memory device that includes a memory cell array including a plurality of memory cells, wherein the plurality of memory cells include a memory cell in an initial state, which does not change, unless a forming stress is applied thereto, to a variable state, in which a resistance value reversibly changes between a plurality of changeable resistance value ranges in accordance with an electric signal applied thereto; and applying the forming stress to the memory cell in the initial state, to store data in the memory cell array on the basis of whether each of the plurality of memory cells is in the initial state or the variable state.

In the above data storing method, in the step of preparing the non-volatile memory device, each of the plurality of memory cells may be in the initial state; and the step of applying the forming stress may include applying the forming stress to the plurality of memory cells in the initial state to change a part of the plurality of memory cells in the initial state to the variable state.

In this configuration, even in the case where proper random data cannot be generated when the forming stress is applied once, the proper random data can be generated by additionally applying the forming stress.

In the above data storing method, the plurality of changeable resistance value ranges may include a first resistance value range which is smaller in resistance value than the initial resistance value range and a second resistance value range which does not overlap with the first resistance value range and is smaller in resistance value than the first resistance value range, and the memory cell in the variable state may have a characteristic in which the resistance value changes from the second resistance value range to the first resistance value range by application of a first electric signal and changes from the first resistance value range to the second resistance value range by application of a second electric signal, the method further comprising: after the step of applying the forming stress, applying an auxiliary stress which is smaller in magnitude than the second electric signal and has the same polarity as that of the second electric signal, to the memory cell in the variable state.

In the above data storing method, the plurality of changeable resistance value ranges may include a second resistance value range which is larger in resistance value than the initial resistance value range and a first resistance value range which does not overlap with the second resistance value range and is larger in resistance value than the second resistance value range; and wherein the memory cell in the variable state may have a characteristic in which the resistance value changes from the second resistance value range to the first resistance value range by application of a first electric signal and changes from the first resistance value range to the second resistance value range by application of a second electric signal, the method further comprising: after the step of applying the forming stress, applying an auxiliary stress which is smaller in magnitude than the first electric signal and has the same polarity as that of the first electric signal, to the memory cell in the variable state.

The above data storing method may further comprise: after the step of applying the auxiliary stress, determining whether or not a resistance value of a memory cell selected from among the plurality of memory cells is within the first resistance value range; and applying the second electric signal, the first electric signal, and the auxiliary stress in this order to the selected memory cell, when it is determined that the resistance value of the selected memory cell is not within the first resistance value range, in the step of determining.

The above data storing method may further comprise: after the step of applying the auxiliary stress, determining whether or not a resistance value of a memory cell selected from among the plurality of memory cells is within the second resistance value range; and applying the first electric signal, the second electric signal, and the auxiliary stress in this order to the selected memory cell, when it is determined that the resistance value of the selected memory cell is not within the second resistance value range, in the step of determining.

In the above data storing method, the first electric signal may be different in polarity from the second electric signal; and the forming stress may have the same polarity as that of the first electric signal.

In the above data storing method, the part of the memory cells may be randomly selected from the plurality of memory cells in the initial state in accordance with the forming stress.

In the above data storing method, the plurality of changeable resistance value ranges may include a first resistance value range which is smaller in resistance value than the initial resistance value range and a second resistance value range which does not overlap with the first resistance value range and is smaller in resistance value than the first resistance value range; and wherein the memory cell in the variable state may have a characteristic in which the resistance value changes from the second resistance value range to the first resistance value range by application of a first electric signal and changes from the first resistance value range to the second resistance value range by application of a second electric signal, the method further comprising: after the step of applying the forming stress, applying the second electric signal to the memory cell in the variable state.

In the above data storing method, the plurality of changeable resistance value ranges may include a second resistance value range which is larger in resistance value than the initial resistance value range and a first resistance value range which does not overlap with the second resistance value range and is larger in resistance value than the second resistance value range; and the memory cell in the variable state may have a characteristic in which the resistance value changes from the second resistance value range to the first resistance value range by application of a first electric signal and changes from the first resistance value range to the second resistance value range by application of a second electric signal, the method further comprising: after the step of applying the forming stress, applying the first electric signal to the memory cell in the variable state.

The plurality of changeable resistance value ranges may include a first resistance value range which is smaller in resistance value than the initial resistance value range and a second resistance value range which does not overlap with the first resistance value range and is smaller in resistance value than the first resistance value range, the method further comprising: after the step of applying the forming stress, comparing first data read on the basis of a first threshold to second data read on the basis of a second threshold, the first threshold being equal to or smaller than a lower limit of the initial resistance value range and being equal to or larger than the largest of upper limits of the plurality of changeable resistance value ranges, the second threshold being equal to or smaller than the largest of lower limits of the plurality of changeable resistance value ranges and being equal to or larger than the smallest of upper limits of the plurality of changeable resistance value ranges; and additionally applying the first electric signal to the memory cell in the changeable resistance value range which is smaller than the second threshold, when the number of memory cells which are assigned different values between the first data and the second data are less than a predetermined number.

In the above data storing method, the plurality of changeable resistance value ranges may include a second resistance value range which is larger in resistance value than the initial resistance value range and a first resistance value range which does not overlap with the second resistance value range and is larger in resistance value than the second resistance value range, the method further comprising: after the step of applying the forming stress, comparing first data read on the basis of a first threshold, to second data read on the basis of a second threshold, the first threshold being equal to or larger than an upper limit of the initial resistance value range and being equal to or smaller than the smallest of lower limits of the plurality of changeable resistance value ranges, the second thresholds being equal to or larger than the smallest of upper limits of the plurality of changeable resistance value ranges and being equal to or smaller than the largest of lower limits of the plurality of changeable resistance value ranges; and additionally applying the second electric signal to the memory cell in the changeable resistance value range which is larger than the second threshold, when the number of memory cells which are assigned different values between the first data and the second data are less than a predetermined number.

The above data storing method may further comprise changing the resistance value of the memory cell in the variable state between the plurality of changeable resistance value ranges in accordance with an electric signal applied thereto.

In the above data storing method, in the step of preparing the non-volatile memory device, the memory cell array may includes a plurality of first memory cells, which are the plurality of memory cells, and a plurality of second memory cells, and wherein the data may be a first-kind data, the data storing method further comprising: applying the electric signal to the second memory cell in the variable state, to store second-kind data in the memory cell array not on the basis of whether or not the resistance value of each of the plurality of second memory cells is within the initial resistance value range but on the basis of whether or not the resistance value of each of the plurality of second memory cells is within at least one of the changeable resistance value ranges.

In the above data storing method, in the step of applying the forming stress, the first-kind data may be stored in a first write address area of the memory cell array; and in the step of applying the electric signal, the second-kind data may be stored in a second write address area of the memory cell array.

In the above data storing method, the step of applying the forming stress may includes: setting a first write address area in the memory cell array, and storing the first-kind data in the first write address area; and applying the forming stress to a region which is different from the first write address area of the memory cell array, to form a second write address area including the plurality of second memory cells in the variable state; and wherein in the step of applying the electric signal, the second-kind data is stored in the second write address area of the memory cell array.

In the above data storing method, each of the plurality of memory cells includes a variable resistance element including a first electrode, a second electrode, and a variable resistance layer located between the first electrode and the second electrode; and the variable resistance layer of the variable resistance element included in the memory cell in the initial state may insulate the first electrode and the second electrode from each other.

A data write circuit of a non-volatile memory device of Reference embodiment 1, including a memory cell array that includes a plurality of memory cells, the plurality of memory cells including: a memory cell in a variable state, in which a resistance value reversibly changes between a plurality of changeable resistance value ranges in accordance with an electric signal applied thereto; and a memory cell in an initial state, which does not change to the variable state unless a forming stress for changing the memory cell in the initial state to the variable state is applied thereto, a resistance value of the memory in the initial state being within an initial resistance value range which does not overlap with the plurality of changeable resistance value ranges, The above data write circuit may apply the forming stress to the plurality of memory cells in the initial state to change a part of the plurality of memory cells in the initial state to the variable state.

In the above data write circuit, the plurality of changeable resistance value ranges may include a first resistance value range which is smaller in resistance value than the initial resistance value range and a second resistance value range which does not overlap with the first resistance value range and is smaller in resistance value than the first resistance value range, and the memory cell in the variable state has a characteristic in which the resistance value changes from the second resistance value range to the first resistance value range by application of a first electric signal and changes from the first resistance value range to the second resistance value range by application of a second electric signal, and the data write circuit may, after application of the forming stress, apply an auxiliary stress as an electric stress which is smaller in magnitude than the second electric signal and has the same polarity as that of the second electric signal, to the memory cell containing data.

In the above data write circuit, the plurality of changeable resistance value ranges may include a second resistance value range which is larger in resistance value than the initial resistance value range and a first resistance value range which does not overlap with the second resistance value range and is larger in resistance value than the second resistance value range, and the memory cell in the variable state has a characteristic in which the resistance value changes from the second resistance value range to the first resistance value range by application of a first electric signal and changes from the first resistance value range to the second resistance value range by application of a second electric signal, and the data write circuit may, after application of the forming stress, apply an auxiliary stress as an electric stress which is smaller in magnitude than the first electric signal and has the same polarity as that of the first electric signal, to the memory cell containing data.

The above data write circuit may, after application of the auxiliary stress, determine whether or not the resistance value of the memory cell selected from among the memory cells containing the data is within the first resistance value range, and apply the second electric signal, the first electric signal, and the auxiliary stress in this order to the selected memory cell, when the data write circuit determines that the resistance value of the selected memory cell is not within the first resistance value range.

The above data write circuit of the non-volatile memory device may, after application of the auxiliary stress, determine whether or not the resistance value of the memory cell selected from among the memory cells containing the data is within the second resistance value range; and apply the first electric signal, the second electric signal, and the auxiliary stress in this order to the selected memory cell, when the data write circuit determines that the resistance value of the selected memory cell is not within the second resistance value range.

In the above data write circuit of the non-volatile memory device, the first electric signal may be different in polarity from the second electric signal, and the forming stress may have the same polarity as that of the first electric signal.

In the above data write circuit of the non-volatile memory device, a part of the memory cells may be selected randomly such that the data may be generated to form random data and stored in the memory cell array.

In the above data write circuit of the non-volatile memory device, the plurality of changeable resistance value ranges may include a first resistance value range which is smaller in resistance value than the initial resistance value range and a second resistance value range which does not overlap with the first resistance value range and is smaller in resistance value than the first resistance value range, and the memory cell in the variable state has a characteristic in which the resistance value changes from the second resistance value range to the first resistance value range by application of a first electric signal and changes from the first resistance value range to the second resistance value range by application of a second electric signal, and the data write circuit may, after application of the forming stress, apply the second electric signal to the memory cell containing data.

In the above data write circuit of the non-volatile memory device, the plurality of changeable resistance value ranges may include a second resistance value range which is larger in resistance value than the initial resistance value range and a first resistance value range which does not overlap with the second resistance value range and is larger in resistance value than the second resistance value range, and the memory cell in the variable state has a characteristic in which the resistance value changes from the second resistance value range to the first resistance value range by application of a first electric signal and changes from the first resistance value range to the second resistance value range by application of a second electric signal, and the data write circuit may, after application of the forming stress, apply the first electric signal to the memory cell containing data.

In the above data write circuit of the non-volatile memory device, the plurality of changeable resistance value ranges may include a first resistance value range which is smaller in resistance value than the initial resistance value range and a second resistance value range which does not overlap with the first resistance value range and is smaller in resistance value than the first resistance value range, and the data write circuit may, after application of the forming stress, compare first data read using a first threshold which is equal to or smaller than a lower limit of the initial resistance value range and is equal to or larger than an upper limit of one of the plurality of changeable resistance value ranges, corresponding to a largest resistance value, to second data read using a second threshold which is equal to or smaller than a lower limit of one of the plurality of changeable resistance value ranges, corresponding to the largest resistance value and is equal to or larger than an upper limit of one of the plurality of changeable resistance value ranges, corresponding to a smallest resistance value, and additionally apply the first electric signal to the memory cell in the changeable resistance value range which is smaller than the second threshold such that the resistance value is within the changeable resistance value range which is larger than the second threshold, when the memory cells which are different in resistance value between the first data and the second data are less than a predetermined number.

In the above data write circuit of the non-volatile memory device, the plurality of changeable resistance value ranges may include a second resistance value range which is larger in resistance value than the initial resistance value range and a first resistance value range which does not overlap with the second resistance value range and is larger in resistance value than the second resistance value range, and the data write circuit may, after application of the forming stress, compare first data read using a first threshold which is equal to or larger than an upper limit of the initial resistance value range and is equal to or smaller than a lower limit of one of the plurality of changeable resistance value ranges, corresponding to a smallest resistance value, to second data read using a second threshold which is equal to or larger than an upper limit of one of the plurality of changeable resistance value ranges, corresponding to the smallest resistance value and is equal to or smaller than a lower limit of one of the plurality of changeable resistance value ranges, corresponding to a largest resistance value, and additionally apply the second electric signal to the memory cell in the changeable resistance value range which is larger than the second threshold such that the resistance value is within the changeable resistance value range which is smaller than the second threshold, when the memory cells which are different in resistance value between the first data and the second data are less than a predetermined number.

The above data write circuit of the non-volatile memory device may selectively execute a first write mode for changing the memory cell from the initial state to the variable state by applying the forming stress to the memory cell in the initial state, or a second write mode for changing the resistance value of the memory cell between the plurality of changeable resistance value ranges by applying one of a plurality of different electric signals to the memory cell in the variable state.

The above data write circuit of the non-volatile memory device may be operative to apply the first electric signal or the second electric signal to the memory cell in the variable state, wherein in application of the forming stress, the data write circuit may store first-kind data on the basis of whether or not the resistance value of each of the memory cells is within the initial resistance value range, and wherein in application of the first electric signal or the second electric signal, the data write circuit may store second-kind data without utilizing whether or not the resistance value of each of the memory cells is within the initial resistance value range and on the basis of whether or not the resistance value of each of the memory cells is within at least one of the changeable resistance value ranges.

In the above data write circuit of the non-volatile memory device, the data write circuit may store the first-kind data in a first write address area of the memory cell array, in application of the forming stress, and may store the second-kind data in a second write address area of the memory cell array, in application of the first electric signal or the second electric signal.

The above data write circuit of the non-volatile memory device may, in application of the forming stress, set a first write address area in the memory cell array, and store the first-kind data in the first write address area, or apply the forming stress to a region which is different from the first write address area of the memory cell array, to form a second write address area including a plurality of memory cells in the variable state; and wherein in application of the first electric signal or the second electric signal, the data write circuit may store the second-kind data in the second write address area of the memory cell array.

In the above data write circuit of the non-volatile memory device, each of the plurality of memory cells may include a variable resistance element including a first electrode, a second electrode, and a variable resistance layer provided between the first electrode and the second electrode, and the variable resistance layer of the variable resistance element included in the memory cell in the initial state may insulate the first electrode and the second electrode from each other.

In the non-volatile memory device, the above data storing method of the non-volatile memory device, and the above data write circuit of the non-volatile memory device, the variable resistance layer of the variable resistance element may include a layer comprising an insulator.

In the non-volatile memory device, the above data storing method of the non-volatile memory device, and the above data write circuit of the non-volatile memory device, the variable resistance layer of the variable resistance element included in the memory cell in the variable state may include a conductive path penetrating the layer comprising the insulator.

In the non-volatile memory device, the above data storing method of the non-volatile memory device, and the above data write circuit of the non-volatile memory device, the variable resistance layer may contain a metal oxide.

In the non-volatile memory device, the above data storing method of the non-volatile memory device, and the above data write circuit of the non-volatile memory device, the variable resistance layer may include a layer comprising an oxygen-deficient metal oxide.

In the non-volatile memory device, the above data storing method of the non-volatile memory device, and the above data write circuit of the non-volatile memory device, the metal oxide may include at least one of a transition metal oxide and an aluminum oxide.

In the non-volatile memory device, the above data storing method of the non-volatile memory device, and the above data write circuit of the non-volatile memory device, the metal oxide may be at least one of a tantalum oxide, a hafnium oxide, and a zirconium oxide.

[Device Configuration]

Figure 2:
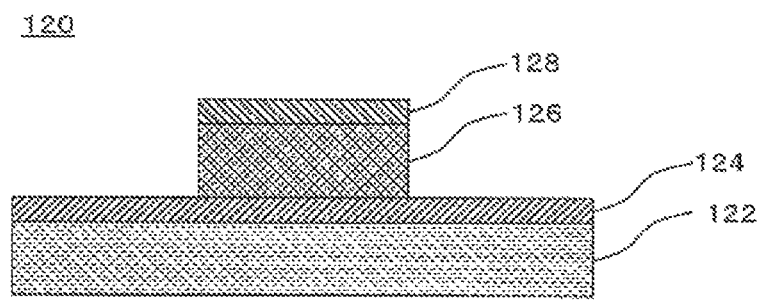
FIG. 2 is a cross-sectional view showing the exemplary schematic configuration of a memory cell included in the non-volatile memory device according to Reference embodiment 1.
Figure 3:
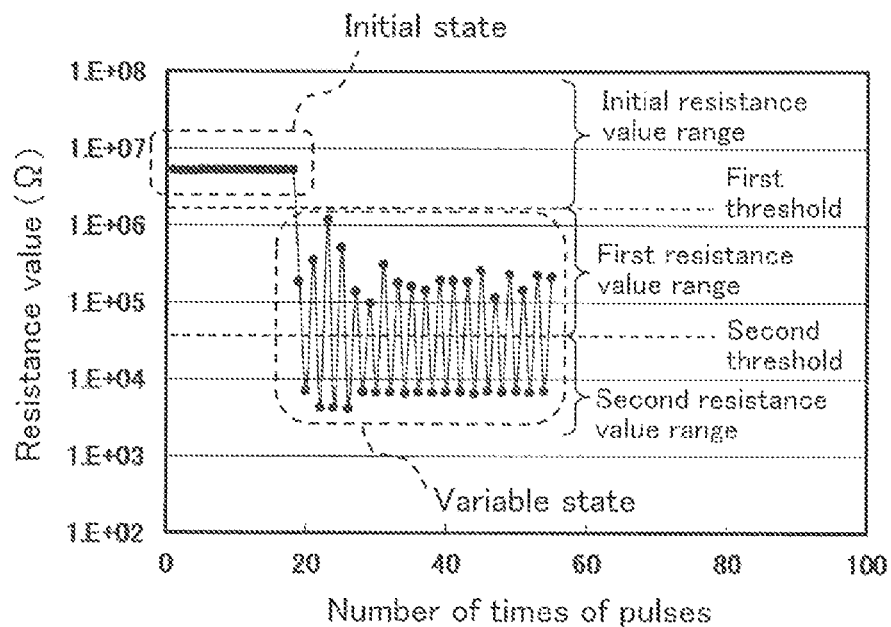
FIG. 3 is a graph showing the exemplary resistance value range of the memory cell included in the non-volatile memory device according to Reference embodiment 1.

FIG. 1 is a block diagram showing the exemplary schematic configuration of a non-volatile memory device according to Reference embodiment 1. FIG. 2 is a cross-sectional view showing the exemplary schematic configuration of a memory cell included in the non-volatile memory device according to Reference embodiment 1. FIG. 3 is a graph showing the exemplary resistance value range of the memory cell included in the non-volatile memory device according to Reference embodiment 1.

In the example of FIG. 1, a non-volatile memory device 100 of the present embodiment includes a memory cell array 90, a write circuit 92, and a read circuit 94. One or both of the write circuit 92 and the read circuit 94 may be omitted.

The memory cell array 90 may be configured such that a plurality of memory cells 91 are arranged in array.

In the example of FIG. 2, a variable resistance element 120 included in the memory cell 91 includes a base layer 122, a first electrode 124, a variable resistance layer 126, and a second electrode 128.

As exemplarily shown in FIG. 3, the memory cell 91 has at least a variable state and an initial state. The variable state refers to a state in which a resistance value is allowed to reversibly change between a plurality of changeable resistance value ranges in accordance with an electric signal applied to the memory cell 91. The initial state refers to a state in which the resistance value is within an initial resistance value range which does not overlap with the changeable resistance value ranges. The memory cell in the initial state does not change to the variable state unless a forming stress as an electric stress for changing the memory cell in the initial state to the variable state is applied to the memory cell in the initial state. For example, the forming stress may be a cumulative stress. In that case, when the amount of cumulative stress exceeds a specified amount, the memory cell changes from the initial state to the variable state.

The plurality of memory cells 91 included in the memory cell array 90 include the memory cell in the variable state and the memory cell in the initial state. In the memory cell array 90, data is stored on the basis of whether each of the memory cells 91 is in the initial state or the variable state.

After manufacturing, the memory cell 91 does not reversibly change between the plurality of changeable resistance value ranges, unless the memory cell 91 goes through a forming process. The forming process refers to a process in which a particular electric stress is applied to the memory cell to reversibly change the resistance value of the memory cell between the plurality of changeable resistance value ranges. For example, the electric stress applied for performing the forming process may be an electric pulse with a specified voltage and a duration, or a combination of a plurality of electric pulses.

The initial resistance value range and the changeable resistance value ranges may be set so that the resistance value of the memory cell 91, just after manufacturing, is within the initial resistance value range and is not within the changeable resistance value ranges. The initial resistance value range and the changeable resistance value ranges may be set so that the resistance value of the memory cell 91 which has changed to the variable state is within the changeable resistance value range and is not within the initial resistance value range. It is well known that the memory cell including the non-volatile memory element of the variable resistance element has such a characteristic. The memory cell 91 having such a characteristic can be manufactured using known various materials.

The initial state of the memory cell 91 includes a state in which the memory cell 91 is subjected to an electric stress which is not a forming stress as an electric stress for changing the memory cell 91 to the variable state. The initial state of the memory cell 91 includes a state in which the resistance value corresponding to a state of just after manufacturing has changed because the memory cell 91 is subjected to an electric stress or the like, which is not the forming stress.

The read circuit 94 is operative to read data stored in the memory cell 91, by determining whether the selected memory cell 91 is in the initial state or the variable state.

In the exemplary configuration of the element of FIG. 3, the material of the first electrode 124 is TaN (tantalum nitride), the material of the second electrode 128 is Ir (iridium), the material of the variable resistance layer 126 is tantalum oxide, the thickness of the entire variable resistance layer 126 is equal to or smaller than 50 nm, and the variable resistance layer 126 has a stacked-layer structure including two layers which are different in oxygen concentration. The layer which is in contact with the first electrode 124 is the layer which is lower in oxygen concentration. When the composition of this layer is expressed as $TaO_x$, $0<x<2.5$. The layer which is in contact with the second electrode 128 is the layer which is higher in oxygen concentration. When the composition of this layer is expressed as $TaO_y$, $y \geq 2.1$ and its thickness is about 5.5 nm. The area of the surface of the first electrode 124 and the surface of the variable resistance layer 126, which surfaces are in contact with each other, and the area of the surface of the second electrode 128 and the surface of the variable resistance layer 126, which surfaces are in contact with each other, are each equal to or smaller than 0.25 $\mu m^2$. The forming stress with a voltage of +3.5V and a pulse width of 5 $\mu Sec$ is cumulatively applied. A LR (low-resistance) state writing pulse (pulse used for changing the resistance value of the element from a first resistance value range to a second resistance value range: second electric signal) has a voltage of −2.4V and a pulse with of 50 nSec. A HR (high-resistance) state writing pulse (pulse used for changing the resistance value of the element from the second resistance value range to the first resistance value range: first electric signal) has a voltage of +1.8V and a pulse with of 50 nSec. The voltage is defined as a positive voltage in a case where a positive voltage is applied to the second electrode 128 on the basis of the first electrode 124.

In other example, the material of the first electrode 124 and the second electrode 128 may be platinum (Pt), the material of the variable resistance layer 126 may be hafnium oxide, the thickness of the variable resistance layer 126 may be 30 nm, and an element region may have a circular shape with a diameter of 3 $\mu m$. In a case where the variable resistance layer 126 comprises $HfO_{1.6}$, its initial resistance value is about several MΩ, a high-resistance value range is about 1000 to 3000Ω, and a low-resistance value range is about 100 to 300Ω. In this case, for example, the forming stress with a voltage of 2 to 3 V and a pulse width of 100 nSec is cumulatively applied. The LR state writing pulse has a voltage of +1.0V and a pulse with of 100 nSec. The HR state writing pulse has a voltage of −1.3V and a pulse with of 100 nSec.

In the example of FIG. 3, the lower limit of the initial resistance value range is equal to or larger than the upper limits of all of the changeable resistance value ranges. Specifically, the lower limit of the initial resistance value range may be equal to or larger than the upper limit of one of the plurality of changeable resistance value ranges, corresponding to a largest resistance value. More specifically, the lower limit of the initial resistance value range may be equal to the upper limit of the first resistance value range of two changeable resistance value ranges, corresponding to a largest resistance value.

In the example of FIG. 3, a first threshold is a value which is equal to or smaller than the lower limit of the initial resistance value range and is equal to or larger than the upper limit of one of the plurality of changeable resistance value ranges, corresponding to a largest resistance value. Specifically, the first threshold may be a value which is equal to the lower limit of the initial resistance value range and may be equal to the upper limit of one of the plurality of changeable resistance value ranges, corresponding to the largest resistance value. More specifically, the first threshold may be equal to the upper limit of the first resistance value range of two changeable resistance value ranges, corresponding to a largest resistance value. Note that the resistance value which is equal in value to the first threshold may belong to the initial resistance value range, or to one of the plurality of changeable resistance value ranges, corresponding to the largest resistance value.

In the example of FIG. 3, a second threshold is a value which is equal to or smaller than the lower limit of one of the plurality of changeable resistance value ranges, corresponding to a largest resistance value and is equal to or larger than the upper limit of one of the plurality of changeable resistance value ranges, corresponding to a smallest resistance value. Specifically, the second threshold may be a value which is equal to or smaller than the lower limit of the first resistance value range of two changeable resistance value ranges, corresponding to a largest resistance value, and which is equal to or larger than the upper limit of a second resistance value range of two changeable resistance value ranges, corresponding to a smallest resistance value. More specifically, the second threshold may be equal to the lower limit of the first resistance value range and to the upper limit of the second resistance value range. Note that the resistance value which is equal in value to the second threshold may belong to a resistance value range including the resistance value which is larger than the second threshold of the plurality of changeable resistance value ranges or to a resistance value range including the resistance value which is smaller than the second threshold of the plurality of changeable resistance value ranges.

Depending on the configuration of the memory cell 91, the resistance value of the memory cell 91, just after manufacturing, is in some cases smaller than the changeable resistance value ranges. Specifically, for example, in a case where the memory cell 91 includes the variable resistance element including the variable resistance layer comprising iron oxide, such a characteristic is realized. More specifically, the resistivity of the iron oxide is higher in the order of $Fe_3O_4$, FeO, and $Fe_2O_3$. In the exemplary element configuration, the material of the first electrode 124 may be Pt (platinum), the material of the second electrode 128 may be Pt (platinum), the material of the variable resistance layer 126 may be $Fe_3O_4$, and the thickness of the entire variable resistance layer 126 may be equal to or smaller than 50 nm. When the area of the surface of the first electrode 124 and the surface of the variable resistance layer 126, which surfaces are in contact with each other, and the area of the surface of the second electrode 128 and the surface of the variable resistance layer 126, which surfaces are in contact with each other, are each equal to or smaller than 0.25 $\mu m^2$, the initial resistance value is a very low resistance value which is approximately 200Ω. When a pulse which has a pulse width of 10 μSec, has the same polarity as that of the first electric signal, and has a voltage with an absolute value of 3.5V, is applied to the memory cell in the initial state, predetermined number of times, the memory cell changes to a state (high-resistance state of 2K to 8K Ω) in which the resistance value is larger than the initial resistance value. This may be due to the fact that oxidization proceeds in a region of the interface between the second electrode 128 and the variable resistance layer 126, and thereby an insulative resistive layer comprising $Fe_2O_3$ is formed there. After that, when the second electric signal having a voltage with an absolute value of 2.4V is applied to the memory cell, the resistance value changes to the second resistance value range of 300Ω to 500Ω, while when the first electric signal having a voltage with an absolute value of 2.4V and being opposite in polarity to the second electric signal is applied to the memory cell, the resistance value changes to the first resistance value range of 2KΩ to 8KΩ.

In other example, the material of the first electrode 124 and the second electrode 128 may be platinum (Pt), the material of the variable resistance layer 126 may be hafnium oxide, the thickness of the variable resistance layer 126 may be equal to 30 nm, and an element region may have a circular shape with a diameter of 3 μm. In a case where the variable resistance layer 126 comprises $HfO_{0.9}$, and the does not cause resistance change in the initial state, the memory cell changes to the variable state, when a pulse with a voltage of 4V and a long pulse width of 100 μSec, is applied to the memory cell as the forming stress. The memory cell in the variable state changes to a low-resistance value range of about 30 to 90Ω by application of the LR state writing pulse with a voltage of −1.3V and a pulse width of 100 nSec, and changes to a high-resistance value range of about 100 to 300Ω by application of the HR state writing pulse with a voltage of +2.0V and a pulse width of 100 nSec.

In this configuration, the upper limit of the initial resistance value range may be equal to or smaller than the lower limits of all of the changeable resistance value ranges. Specifically, the upper limit of the initial resistance value range may be equal to or smaller than the lower limit of one of the changeable resistance value ranges, corresponding to a smallest resistance value. More specifically, the upper limit of the initial resistance value range may be equal to the lower limit of the second resistance value range which is one of the two changeable resistance value ranges, corresponding to a smallest resistance value.

The first threshold may be a value which is equal to or larger than the upper limit of the initial resistance value range, and is equal to or smaller than the lower limit of one of the plurality of changeable resistance value ranges, corresponding to a smallest resistance value. Specifically, the first threshold may be a value which is equal to the upper limit of the initial resistance value range, and is equal to the lower limit of one of the plurality of changeable resistance value ranges, corresponding to the smallest resistance value. More specifically, the first threshold may be equal to the lower limit of the second resistance value range of two changeable resistance value ranges, corresponding to a smallest resistance value.

The second threshold may be a value which is equal to or larger than the upper limit of one of the plurality of changeable resistance value ranges, corresponding to a smallest resistance value and is equal to or smaller than the lower limit of one of the plurality of changeable resistance value ranges, corresponding to a largest resistance value. Specifically, the second threshold may be a value which is equal to or larger than the upper limit of the second resistance value range of two changeable resistance value ranges, corresponding to a smallest resistance value, and which is equal to or smaller than the lower limit of a first resistance value range of two changeable resistance value ranges, corresponding to a largest resistance value. More specifically, the second threshold may be equal to the lower limit of the first resistance value range and to the upper limit of the second resistance value range.

Note that the upper limit and lower limit of adjacent resistance value ranges need not coincide with each other, and a specified margin may be set between the adjacent resistance value ranges.

The read circuit 94 may be operative to read the stored data, by selectively executing a first read mode for determining whether or not the resistance value of the selected memory cell 91 is larger than the first threshold, or a second read mode for determining whether or not the resistance value of the selected memory cell 91 is larger than the second threshold.

The stored data may include first-kind data and second-kind data, the first-kind data may be stored on the basis of whether or not the resistance value of the memory cell 91 is within the initial resistance value range, and the second-kind data may be stored without utilizing whether or not the resistance value of the memory cell 91 is within the initial resistance value range and on the basis of whether or not the resistance value of the memory cell 91 is within at least one of the changeable resistance value ranges.

In this case, the memory cell array 90 may include a first write address area and a second write address area, the first-kind data may be stored in the first write address area, and the second-kind data may be stored in the second write address area. The first write address area and the second write address area may not be necessarily separated from each other as physical regions. For example, the memory cell 91 corresponding to each address may be allocated to the first write address area or the second write address area, according to a particular rule.

The second write address area is a region composed of, for example, a plurality of memory cells in the variable state. Therefore, by applying the forming stress to the plurality of memory cells included in a particular region, of the memory cell array 90 (e.g., memory cell array 90, just after manufacturing) including the plurality of memory cells in the initial state, the second write address area can be formed. That is, by applying the forming stress, the second write address area for writing the second-kind data, can be formed, in addition to the storage of the first-kind data. Also, by selectively applying the forming stress to the plurality of memory cells included in the memory cell array 90, the first write address area and the second write address area can be set. This makes it possible to flexibly choose the capacitive allocation and layout of the address areas. By applying the forming stress to a portion of the first write address area, this region can be changed into the second write address area.

By placing the first write address area or the second write address area on the same memory cell array 90, the confidentiality of the information can be improved, even when the information is transmitted and received between the first write address area and the second write address area, for example.

In the example of FIG. 3, specifically, for example, the first-kind data may be stored on the basis of whether or not the resistance value of the memory cell 91 is within the initial resistance value range, and the second-kind data may be stored on the basis of whether or not the resistance value of the memory cell 91 is within the second resistance value range.

Although in the example of FIG. 3, the number of changeable resistance value ranges is two, the number of changeable resistance value ranges may be three or more. In other words, the memory cell 91 may be a multi-valued memory.

When N is an integer which is equal to or larger than 3, the memory cell 91 in the variable state may change between (N–1) changeable resistance value ranges in accordance with an electric signal applied thereto, and in the memory cell array 90, multi-valued data may be stored, on the basis of which of N resistance value ranges including the initial resistance value range and the (N–1) changeable resistance value ranges, the resistance value of the memory cell 91 is within. In the example of FIG. 3, N=3. N may be an integer which is equal to or larger than 4.

When N is an integer which is equal to or larger than 3, M1 is a positive integer which is equal to or smaller than N, and M2 is a positive integer which is equal to or smaller than (N–1), the first-kind data may be stored on the basis of which of M1 resistance value ranges which do not overlap with each other and include the initial resistance value range, the resistance value of the memory cell 91 is within, the second-kind data may be stored on the basis of which of M2 resistance value ranges which do not overlap with each other and do not include the initial resistance value range, the resistance value of the memory cell 91 is within, and (M1–1) resistance value ranges which do not include the initial resistance value range, of the M1 resistance value ranges used to store the first-kind data, may be identical to one of the M2 resistance value ranges used to store the second-kind data.

When N is an integer which is equal to or larger than 3, M1 is a positive integer which is equal to or smaller than N, and M2 is a positive integer which is equal to or smaller than (N–1), the first-kind data may be stored on the basis of which of M1 resistance value ranges which do not overlap with each other and include the initial resistance value range, the resistance value of the memory cell 91 is within, the second-kind data may be stored on the basis of which of M2 resistance value ranges which do not overlap with each other and do not include the initial resistance value range, the resistance value of the memory cell 91 is within, and at least one of (M1–1) resistance value ranges which do not include the initial resistance value range, of the M1 resistance value ranges used to store the first-kind data, may be different from the M2 resistance value ranges used to store the second-kind data.

The read circuit 94 may selectively execute a first read mode for reading the first-kind data using a first-kind threshold group including (M1–1) thresholds, or a second read mode for reading the second-kind data using a second-kind threshold group including (M2–1) thresholds, wherein the first-kind threshold group includes a first threshold which is equal to or smaller than the lower limit of the initial resistance value range and is equal to or larger than the upper limit of one of the plurality of changeable resistance value ranges, corresponding to a largest resistance value, and the thresholds included in the second-kind threshold group may be equal to or smaller than the lower limit of one of the plurality of changeable resistance value ranges, corresponding to a largest resistance value. In the example of FIG. 3, the threshold belonging to the first-kind threshold group is the first threshold, while the threshold belonging to the second-kind threshold group is the second threshold.

In the variable resistance element of FIG. 3, for example, the initial resistance value range may be set equal to or larger than $2\times10^6\Omega$, and smaller than $1.0\times10^7\Omega$, and the changeable resistance value ranges may be set equal to or larger than $5\times10^4\Omega$, and smaller than $2\times10^6\Omega$, and equal to or larger than $5\times10^3\Omega$, and smaller than $5\times10^4\Omega$. In this case, the first threshold is $2\times10^6\Omega$, and the second threshold is $5\times10^4\Omega$.

[Configuration of Variable Resistance Element]

The variable resistance element 120 has a structure in which the variable resistance layer 126 is provided between the first electrode 124 and the second electrode 128. The variable resistance layer 126 may comprise, for example, a metal oxide, more specifically, for example, a transition metal oxide. The variable resistance element 120 of the memory cell 91 in the variable state has a characteristic in which the resistance value between the first electrode 124 and the second electrode 128 reversibly changes between the plurality of changeable resistance value ranges by application of the electric signal between the first electrode 124 and the second electrode 128.

The variable resistance layer 126 of the variable resistance element 120 of the memory cell 91 in the initial state may insulate the first electrode 124 and the second electrode 128 from each other. The insulation may be specifically such that the resistance value is equal to or larger than $2M\Omega$. The variable resistance layer 126 of the variable resistance element 120 may include a layer comprising an insulator. The insulator may be, specifically, a material having a resistivity of 30 $\Omega\cdot$m or larger. Since the variable resistance layer 126 of the variable resistance element 120 comprises the insulator, the resistance characteristic of the memory cell in the initial state can be maintained steadily.

The variable resistance element in the initial state refers to the element in the initial resistance value range, in which the memory cell does not change to the variable state unless a forming stress as an electric stress for changing the memory cell in the initial state to the variable state is applied to the memory cell in the initial state and in which its resistance value does not overlap with the changeable resistance value ranges. The variable resistance element in the initial state does not easily change to the variable state unless the forming stress is applied thereto. This allows the data to be retained steadily, on the basis of a difference between the initial state and the variable state. The initial resistance value range of the variable resistance element in the initial state can be adjusted to some extent depending on the material, size, shape, manufacturing conditions, and the like of the variable resistance element in the initial state, differently from the variable resistance element in the variable state in which its resistance value changes by application of the electric signal. Especially, in a case where the variable resistance layer 126 has a stacked-layer structure, the initial resistance value range of the variable resistance element in the initial state can be adjusted as desired, depending on the thickness and oxygen concentration during the deposition, of the layer which is higher in oxygen concentration.

For example, the initial resistance value range may be defined as a range of the resistance value read by application to the variable resistance element in the initial state a voltage which is smaller in magnitude than the forming stress and the electric signal for changing the resistance value of the element in the variable state between the plurality of changeable resistance value ranges.

The forming stress is decided depending on the amount of the amplitude, pulse width, cumulative application time, and the like of the voltage applied to the memory cell 91, and their values are different for each of the memory cells 91 within the memory cell array 90. For example, the cumulative application time refers to a total of the pulse width of the electric pulse applied for the resistance state to change from the initial state to the variable state. Therefore, the specific values of parameters defining the electric stress which is required at minimum as the forming stress, are values of the voltage, pulse width, cumulative application time, and the like of the electric stress applied to allow the element of each target memory cell 91 to change to the variable state, are not absolute fixed values and have non-uniformity.

In general, the forming stress is larger in magnitude than the electric signal applied to reversibly change the resistance value of the memory cell in the variable state, between the plurality of changeable resistance value ranges. Specifically, the forming stress may be larger in magnitude than the electric signal applied to change the resistance value of the memory cell in the variable state, in at least any one of the absolute value, pulse width, and cumulative application time of the voltage.

The variable resistance element which changes the resistance value by application of the electric signal with the same polarity, which is different in voltage, pulse width and the like, to the element in the variable state, will be referred to as a unipolar variable resistance element. More specifically, for example, when the electric signal (electric pulse) with a voltage of +2V and a pulse width of 1 μs is applied in a direction in which a current flows from the second electrode 128 to the first electrode 124, the resistance value of the variable resistance element changes to a particular high-resistance level (first resistance value range: also will be referred to as HR level), while when the electric signal with a voltage of +4V and a pulse width of 50 ns is applied in a direction in which a current flows from the second electrode 128 to the first electrode 124, in the same manner, the resistance value of the variable resistance element changes to a particular low-resistance level (second resistance value range: also will be referred to as LR level). The variable resistance element which reversibly changes the resistance value by application of the electric signal with the same polarity in the above described manner, will be referred to as the unipolar variable resistance element.

By comparison, the variable resistance element which changes the resistance value by application of the electric signal with a different polarity, to the element in the variable state, will be referred to as a bipolar variable resistance element. More specifically, for example, when the electric signal with a voltage of +2V and a pulse width of 50 ns is applied in a direction in which a current flows from the second electrode 128 to the first electrode 124, the resistance value of the variable resistance element changes to a particular high-resistance level (first resistance value range: also will be referred to as HR level), while when the electric signal with a voltage of +2V and a pulse width of 50 ns is applied in a direction in which a current flows from the first electrode 124 to the second electrode 128, the resistance value of the variable resistance element changes to a particular low-resistance level (second resistance value range: also will be referred to as LR level). The variable resistance element which reversibly changes the resistance value by application of the electric signal with an opposite polarity in the above described manner, will be referred to as the bipolar variable resistance element.

Of course, to enable the bipolar variable resistance element to operate steadily, for example, the pulse width and the absolute value of the voltage may be made different, between the electric signal applied in a case where the element is changed to the HR level (also referred to as writing HR state to the element) and the electric signal applied in a case where the element is changed to the LR level (also referred to as writing LR state to the element), as well as the polarity.

The variable resistance layer 126 may comprise a metal oxide. The variable resistance layer 126 may include a layer comprising an oxygen-deficient metal oxide. The metal oxide constituting the variable resistance layer 126 may be at least one of a transition metal oxide and an aluminum oxide, or may be at least one of a tantalum oxide, an iron oxide, a hafnium oxide and a zirconium oxide.

As the material of the variable resistance layer of the unipolar variable resistance element, a titanium (Ti) oxide, a nickel (Ni) oxide, an aluminum (Al) oxide, etc., may be used. By comparison, as the material of the variable resistance layer of the bipolar variable resistance element, a tantalum (Ta) oxide, a hafnium (Hf) oxide, an aluminum (Al) oxide, an iron (Fe) oxide, etc., may be used.

Even when the oxide of the same material is used, both of the bipolar variable resistance element and the unipolar variable resistance element may be sometimes obtained depending on a combination with the electrode material, the stacked-layer structure of the oxide, etc. When the tantalum oxide is used as the material of the variable resistance layer, the variable resistance element is allowed to have a good characteristic. Therefore, this will be described in detail in the present embodiment.

As the material of the first electrode 124 and the material of the second electrode 128, for example, iridium (Ir), platinum (Pt), tungsten (W), copper (Cu), aluminum (Al), a titanium nitride (TiN), a tantalum nitride (TaN), a titanium aluminum nitride (TiAlN), etc., may be used. Although in the example of FIG. 2, the first electrode 124 has a larger area than the second electrode 128, the present disclosure is not limited to this. For example, the first electrode 124 and the second electrode 128 may be allowed to suitably have optimal shapes, depending on semiconductor process steps, for example, use of the first electrode 124 as a portion of a wire. Likewise, the base layer 122 may be suitably omitted or modified, depending on the semiconductor process steps.

The variable resistance layer 126 may be configured such that at least two layers, i.e., a first variable resistance layer connected to the first electrode 124 and a second variable resistance layer connected to the second electrode 128 are stacked together.

The first variable resistance layer may comprise an oxygen-deficient first metal oxide, while the second variable resistance layer may comprise an oxygen-deficient second metal oxide which is lower in oxygen atomic percentage than the first metal oxide. The second variable resistance layer may be a layer comprising the insulator. A minute localized region in which the degree of oxygen deficiency reversibly changes in response to the electric pulse applied, is formed in the second variable resistance layer. It is considered that the localized region includes a filament comprising oxygen vacancy sites. The localized region may be a conductive path penetrating the second variable resistance layer. The insulator may comprise a metal oxide, and the conductive path may comprise an oxygen-deficient metal oxide which is lower in oxygen atomic percentage than the insulator.

The term "degree of oxygen deficiency" refers to a ratio of an amount of oxygen which is deficient with respect to an amount of oxygen constituting an oxide having a stoichiometric composition (stoichiometric composition corresponding to a largest resistance value in a case where there exist plural stoichiometric compositions) of each metal oxide. A metal oxide having a stoichiometric composition is more stable and has a larger resistance value than a metal oxide having another composition.

For example, in a case where the metal is tantalum (Ta), a tantalum oxide having a stoichiometric composition according to the above definition is $Ta_2O_5$, and therefore is expressed as $TaO_{2.5}$. The degree of oxygen deficiency of $TaO_{2.5}$ is 0%. The degree of oxygen deficiency of $TaO_{1.5}$, is $(2.5-1.5)/2.5=40\%$. An oxygen excess metal oxide has a negative value in degree of oxygen deficiency. In the present specification, the degree of oxygen deficiency is meant to include a positive value, 0 and a negative value unless otherwise noted.

An oxide which is lower in degree of oxygen deficiency is closer to the oxide having a stoichiometric composition and therefore has a larger resistance value, while an oxide which is higher in degree of oxygen deficiency is closer to the metal constituting the oxide and therefore has a smaller resistance value.

The term "oxygen content atomic percentage" refers to a ratio of the number of oxygen atoms to the total number of atoms. For example, the oxygen content atomic percentage of $Ta_2O_5$ is the ratio of the number of oxygen atoms to the total number of atoms (O/(Ta+O)) and is 71.4 atm %. Therefore, the oxygen content atomic percentage of the oxygen-deficient tantalum oxide is higher than 0 and lower than 71.4 atm %. For example, in a case where the metal constituting the first metal oxide and the metal constituting the second metal oxide are of the same kind, there is a correspondence between the oxygen content atomic percentage and the degree of oxygen deficiency. Specifically, when the oxygen content atomic percentage of the second metal oxide is higher than the oxygen content atomic percentage of the first metal oxide, the degree of oxygen deficiency of the second metal oxide is lower than the degree of oxygen deficiency of the first metal oxide.

As the metal constituting the variable resistance layer, a metal other than tantalum may be used. As the metal constituting the variable resistance layer, at least either a transition metal or aluminum (Al) may be used. As the transition metal, tantalum (Ta), titanium (Ti), hafnium (Hf), zirconium (Zr), niobium (Nb), tungsten (W), nickel (Ni), iron (Fe), etc., may be used. Since the transition metal can assume plural oxidized states, different resistance states can be implemented by the redox reaction.

When x of $HfO_x$ of the composition of the first metal oxide is equal to or larger than 0.9 and equal to or less than 1.6, and y of $HfO_y$ of the composition of the second metal oxide is larger than x, in a case where the hafnium oxide is used, the resistance value of the variable resistance layer is allowed to change stably and at a high speed. In this case, the thickness of the second metal oxide may be set to 3 to 4 nm.

When x of $ZrO_x$ of the composition of the first metal oxide is equal to or larger than 0.9 and equal to or less than 1.4, and y of $ZrO_y$ of the composition of the second metal oxide is larger than x, in a case where the zirconium oxide is used, the resistance value of the variable resistance layer is allowed to change stably and at a high speed. In this case, the thickness of the second metal oxide may be set to 1 to 5 nm.

The first metal constituting the first metal oxide and the second metal constituting the second metal oxide may be different metals. In this case, the second metal oxide may be lower in degree of oxygen deficiency than the first metal oxide, i.e., higher in resistance than the first metal oxide. In such a configuration, a larger portion of a voltage applied between the first electrode 124 and the second electrode 128 to cause resistance change is fed to the second metal oxide, and the redox reaction taking place within the second metal oxide is facilitated.

In a case where the first metal constituting the first metal oxide which will become a first variable resistance layer and the second metal constituting the second metal oxide which will become a second variable resistance layer are materials which are different from each other, the standard electrode potential of the second metal may be lower than the standard electrode potential of the first metal. The standard electrode potential is a characteristic in which as its value is larger, the corresponding material is less easily oxidized. This allows the redox reaction to take place more easily in the second metal oxide which is relatively lower in standard electrode potential. It is estimated that in a resistance changing phenomenon, the redox reaction takes place in the minute localized region formed within the second metal oxide which is higher in resistance, the filament (conductive path) changes, and thereby its resistance value (degree of oxygen deficiency) changes.

For example, a stable resistance changing operation is attained by using an oxygen-deficient tantalum oxide ($TaO_x$) as the first metal oxide and by using a titanium oxide ($TiO_2$) as the second metal oxide. Titanium (standard electrode potential=−1.63 eV) has a lower standard electrode potential than tantalum (standard electrode potential=−0.6 eV). By using as the second metal oxide an oxide of a metal having a lower standard electrode potential than the metal of the first metal oxide, the redox reaction easily takes place within the second metal oxide. As another combination, an aluminum oxide ($Al_2O_3$) may be used as the second metal oxide which will become the high-resistance layer. For example, an oxygen-deficient tantalum oxide ($TaO_x$) may be used as the first metal oxide, and the aluminum oxide ($Al_2O_3$) may be used as the second metal oxide.

It is estimated that in a resistance changing phenomenon in the variable resistance layer having the stacked-layer structure, the redox reaction takes place in the minute localized region formed within the second metal oxide which is higher in resistance, the filament (conductive path) in the localized region changes, and thereby its resistance value changes.

Specifically, when a positive voltage is applied to the second electrode 128 connected to the second metal oxide on the basis of the first electrode 124, oxygen ions within the variable resistance layer are drawn toward the second metal oxide. Thereby, an oxidization reaction proceeds in the minute localized region formed within the second metal oxide, and the degree of oxygen deficiency reduces. This may result in a situation in which connection of the filament in the localized region does not easily occur, and the resistance value increases.

Conversely, when a negative voltage is applied to the second electrode 128 connected to the second metal oxide on the basis of the first electrode 124, the oxygen ions within the second metal oxide are forced to migrate toward the first metal oxide. Thereby, the reduction reaction proceeds in the minute localized region formed within the second metal oxide, and the degree of oxygen deficiency increases. This may result in a situation in which connection of the filament in the localized region easily occurs, and the resistance value decreases.

Figure 4:
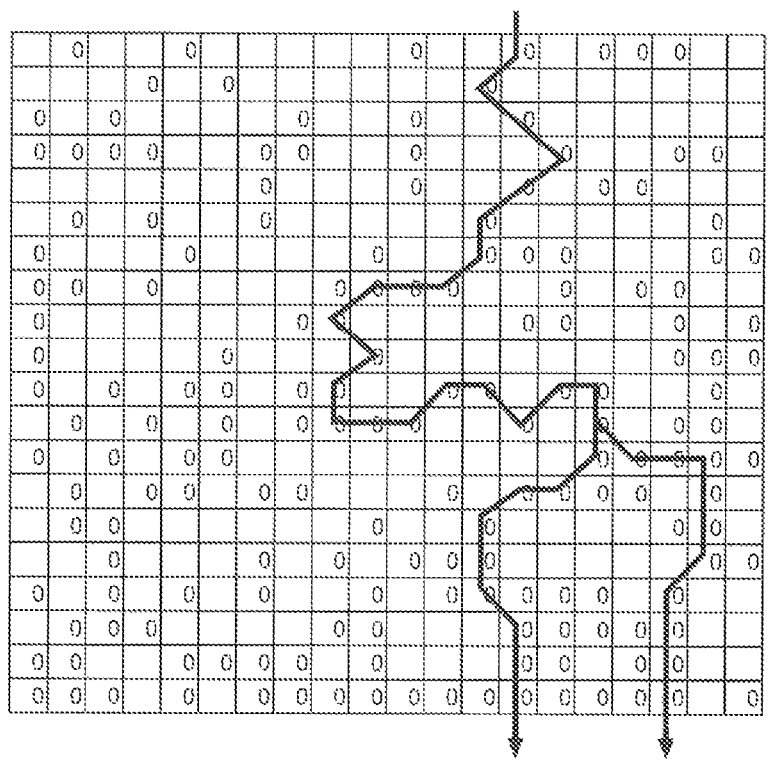
FIG. 4 is a view showing the exemplary simulation of formation of a filament in a variable resistance layer, which simulation is conducted by using a percolation model.

FIG. 4 is a view showing the exemplary simulation of formation of the filament in the variable resistance layer (e.g., localized region) which simulation is conducted using a percolation model. In this example, the oxygen vacancy sites (hereinafter will be simply referred to as "vacancy sites"), or the like, in the variable resistance layer, are connected, thereby forming the filament (conductive path). The percolation model refers to a model based on a theory that a probability with which the vacancy sites or the like distributed randomly in the variable resistance layer are connected increases if the density of the vacancy sites or the like exceeds a threshold. The term "vacancy" means that oxygen is deficient in the metal oxide, for example. The "density of the vacancy sites" corresponds to the degree of oxygen deficiency. That is, as the degree of oxygen deficiency increases, the density of the vacancy sites increases, too.

In the simulation of FIG. 4, the oxygen ion sites of the variable resistance layer are approximately assumed as regions (sites) separated in lattice, and the filament formed by the vacancy sites probabilistically is found by the simulation. In FIG. 4, the sites containing "0" represent the vacancy sites formed in the variable resistance layer. On the other hand, the sites which are blank represent the sites occupied by the oxygen ions and mean high-resistance regions. The cluster of the vacancy sites (cluster of the vacancy sites connected to each other within a range of one site in upward and downward, rightward and leftward, and oblique directions) indicated by arrows, represent the filament formed in the variable resistance layer, i.e., path through which a current flows, when a voltage is applied in the upward and downward direction in FIG. 4. As shown in FIG. 4, the filament through which a current flows between the lower surface and upper surface of the variable resistance layer is formed by the cluster of the vacancy sites connecting the upper end to the lower end of the vacancy sites distributed randomly. Based on this percolation model, the number and shape of filaments are probabilistic. The distribution of the number and shape of filament becomes the non-uniformity of the resistance value of the variable resistance layer.

A forming operation corresponds to the operation for changing the density of the vacancy sites within the metal oxide, in a portion of the variable resistance layer, to form the filament. Specifically, by application of the electric stress, the filament connecting the vacancy sites which were non-dense in the initial state, is formed. In a case where the variable resistance element including the variable resistance layer comprising the metal oxide is formed, the vacancy sites within the variable resistance layer are placed randomly for each memory cell. Therefore, it is estimated that even when a specified electric stress is applied to each of the memory cells, the maximum distance or the like between the vacancy sites, which become barrier in the formation of the filament (connection of the vacancies), becomes non-uniform randomly among the memory cells, and thereby the amount of stress for causing the forming to occur becomes non-uniform randomly among the memory cells. It is also estimated that as a result of the above, when a specified electric stress is applied to the plurality of memory cells in the initial state, the memory cells for which the forming completes occur randomly.

Regarding the material in which the filament path is formed by connecting the oxygen vacancy sites and the like, occurrence of the forming (change from initial state to variable state) can be explained by using a similar mechanism. From this, it is estimated that for example, even when the metal contained in the metal oxide is different, the number and shape of the filaments which occur by the forming are probabilistic, in the same manner. Therefore, it is decided probabilistically, i.e., randomly, whether or not the forming occurs when a specified electric stress is applied to the memory cell in the initial state.

The second electrode 128 connected to the second metal oxide which is lower in degree of oxygen deficiency may comprise, for example, a material which is higher in standard electrode potential than the metal constituting the second metal oxide and the material constituting the first electrode 124, such as platinum (Pt), iridium (Ir), and palladium (Pd). The first electrode 124 connected to the first metal oxide which is higher in degree of oxygen deficiency may comprise for example, a material which is lower in standard electrode potential than the metal constituting the first metal oxide, such as tungsten (W), nickel (Ni), tantalum (Ta), titanium (Ti), aluminum (Al), a tantalum nitride (TaN), and a titanium nitride (TiN). The standard electrode potential is a characteristic in which as its value is larger, the corresponding material is less easily oxidized.

When the standard electrode potential of the second electrode 128 is V2, the standard electrode potential of the metal constituting the second metal oxide is Vr2, the standard electrode potential of the metal constituting the first metal oxide is Vr1, and the standard electrode potential of the first electrode 124 is V1, Vr2<V2 and V1<V2 may be satisfied. Furthermore, V2>Vr2 and Vr1≥V1 may be satisfied.

By the above described configuration, the redox reaction takes place selectively in a region of the second metal oxide which is in the vicinity of the interface between the second electrode 128 and the second metal oxide, and hence a stable resistance changing phenomenon is attained.

More suitably, the variable resistance layer 126 has at least a stacked-layer structure in which a first variable resistance layer having a composition expressed as $TaO_x$ (0≤x<2.5) and a second variable resistance layer having a composition expressed as $TaO_y$ (x<y<2.5) are stacked together. Of course, other layer, for example, a third variable resistance layer or the like comprising a metal oxide which is other than the tantalum oxide, may be placed suitably.

$TaO_x$ may satisfy 0.8≤x<1.9. $TaO_y$ may satisfy 2.1≤y<2.5. The thickness of the second tantalum containing layer may be 1 nm or larger and 8 nm or smaller. By stacking together the layers which are different in degree of oxygen deficiency, the direction of resistance change in the bipolar type can be decided. For example, the second variable resistance layer is placed closer to the second electrode 128, and the first variable resistance layer is placed closer to the first electrode 124. In this configuration, the variable resistance element changes to the HR state by application of a voltage in the direction in which a current flows from the second electrode 128 to the first electrode 124, and changes to the LR state by application of a voltage in an opposite direction. Of course, when the second variable resistance layer is placed in contact with the first electrode 124 and the first variable resistance layer is placed in contact with the second electrode 128, the relation between the resistance change and the direction of voltage application is reversed.

[Characteristic of Variable Resistance Element]

Figure 5:
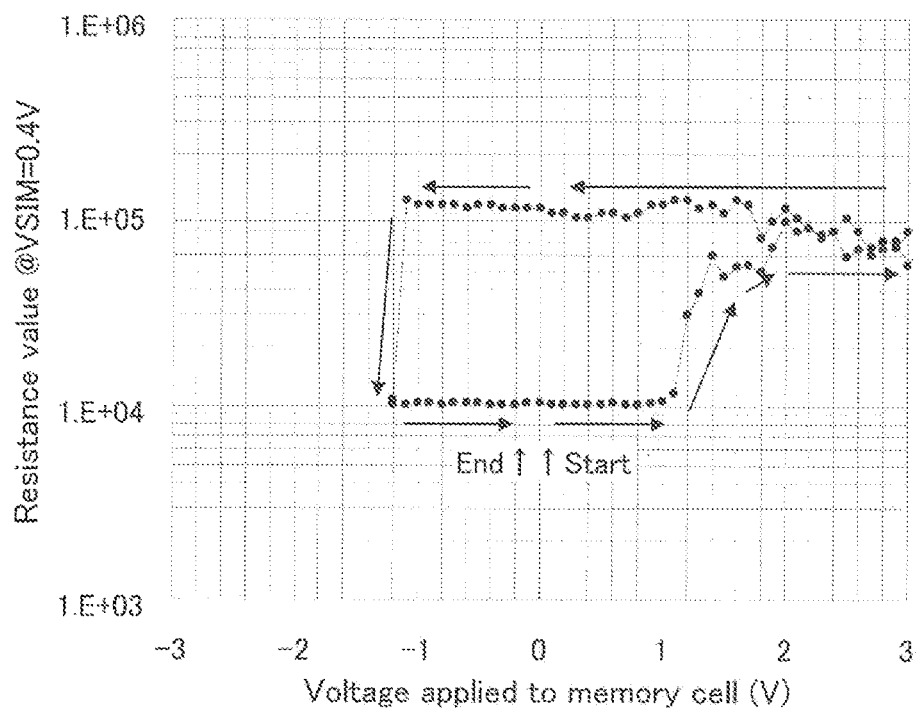
FIG. 5 is a view showing the exemplary characteristic of a bipolar variable resistance element in a variable state.

FIG. 5 is a view showing the exemplary characteristic of the bipolar variable resistance element in the variable state. In the configuration of the element of FIG. 5, the material of the first electrode 124 is TaN, the material of the second electrode 128 is Ir, the variable resistance layer 126 has at least a stacked-layer structure in which the first tantalum-containing layer having a composition represented by $TaO_x$ (0<x<2.5) and the second tantalum-containing layer having a composition represented by $TaO_y$ (x<y) are stacked together, the first tantalum-containing layer is placed in contact with the first electrode 124 and the second-tantalum containing layer is placed in contact with the second electrode 128. The bipolar variable resistance element is fabricated such that $TaO_x$ satisfies 0.8≤x≤1.9 and $TaO_y$ satisfies 2.1≤y≤2.5. The thickness of the second tantalum-containing layer is 8 nm or smaller, and the thickness of the entire variable resistance layer 126 is 50 nm or smaller. The area of the surface of the first tantalum-containing layer and the surface of the electrode, which surfaces are in contact, and the area of the surface of the second tantalum-containing layer and the surface of the electrode, which surfaces are in contact, are equal to those of the variable resistance element used in the measurement of FIG. 3.

In FIG. 5, a horizontal axis indicates the voltage of the electric signal applied, and a vertical axis indicates the resistance value (resistance value calculated from the current in the case where a read voltage $V_R$ is applied) of the variable resistance element after the electric signal is applied to the variable resistance element. When a voltage level is gradually increased toward a positive side from a start position of FIG. 5, the resistance value increases gradually from a time point when the applied voltage exceeds +1.1V, and reaches about 100 kΩ when the applied voltage is +2.0V. Conversely, when the voltage level is gradually decreased toward a negative side, the resistance value decreases to about 10 kΩ when the applied voltage exceeds −1.1V, and returns to the resistance value at the start. In this case, the variable resistance layer 126 is configured such that the second variable resistance layer is placed closer to the second electrode 128, and the first variable resistance layer is placed closer to the first electrode 124. Positive application is defined as application of the electric signal in which a current flows from the second electrode 128 to the first electrode 124. In the positive application, the variable resistance element 120 changes to the HR level. Negative application is defined as application of the electric signal in which a current flows in an opposite direction. In the negative application, the variable resistance element 120 changes to the LR level. When the voltage for changing the variable resistance element 120 from LR to HR is the HR state writing voltage ($V_H$), and the voltage for changing the variable resistance element 120 from HR to LR is the LR state writing voltage ($V_L$), the variable resistance element 120 can change between the LR state and the HR state adequately, using a common power supply voltage, if the absolute value $|V_H|=|V_L|$=about 2.0V.

Figure 6:
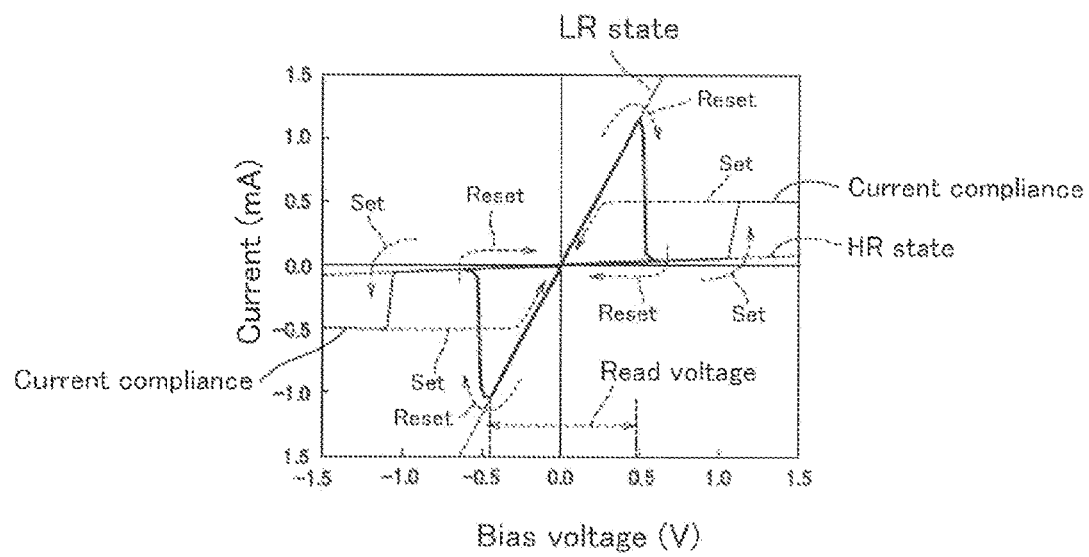
FIG. 6 is a view showing the exemplary characteristic of a unipolar variable resistance element in a variable state.

FIG. 6 is a schematic view showing the exemplary characteristic of the unipolar variable resistance element in a variable state, disclosed in IEDM Technical Digest. 13-15 Dec. 2004, p587. As described in this document, it is known that the variable resistance element including the variable resistance layer comprising NiO, $TiO_2$, $HfO_2$, or $ZrO_2$ has a unipolar characteristic and the variable resistance layer comprising this transition metal oxide is an insulator just after manufacturing and changes to the variable state by formation of the conductive path by the process for applying the forming stress.

Depending on a combination of the material of the variable resistance layer and the electrode, impurities doped on a variable resistance material, etc., an element which causes resistance change in a unipolar manner symmetrically at a positive voltage side and a negative voltage side, can be attained. FIG. 6 exemplarily shows the characteristic of such an element.

In the example of FIG. 6, when the absolute value of a bias voltage exceeds 0.5V, the element shifts to a reset state, i.e., HR level, while when the absolute value of the bias voltage exceeds 1.0V, the element shifts to a set state, i.e., LR level. This element is allowed to reversibly change between two resistance states by application of electric signals with the same polarity and with different voltages. Alternatively, the unipolar variable resistance element having a characteristic of FIG. 6, may be used as the bipolar variable resistance element by performing control such that the variable resistance element changes to the HR state by application of a positive electric signal of a voltage which is +0.5V or larger and smaller than +1V, and changes to the LR state by application of a negative electric signal of a voltage which is −1V or smaller (absolute value is 1V or larger). In the present disclosure, both of the bipolar variable resistance element and the unipolar variable resistance element may be used.

The variable resistance element may be used as a multi-valued memory which reversibly changes the resistance value between three or more changeable resistance value ranges, depending a combination of the voltage (absolute value), pulse width, the number of times, and the like of the electric signal applied thereto. For example, the variable resistance element including the variable resistance layer comprising the tantalum oxide has a good characteristic and may be applicable to the multi-valued memory.

Figure 7:
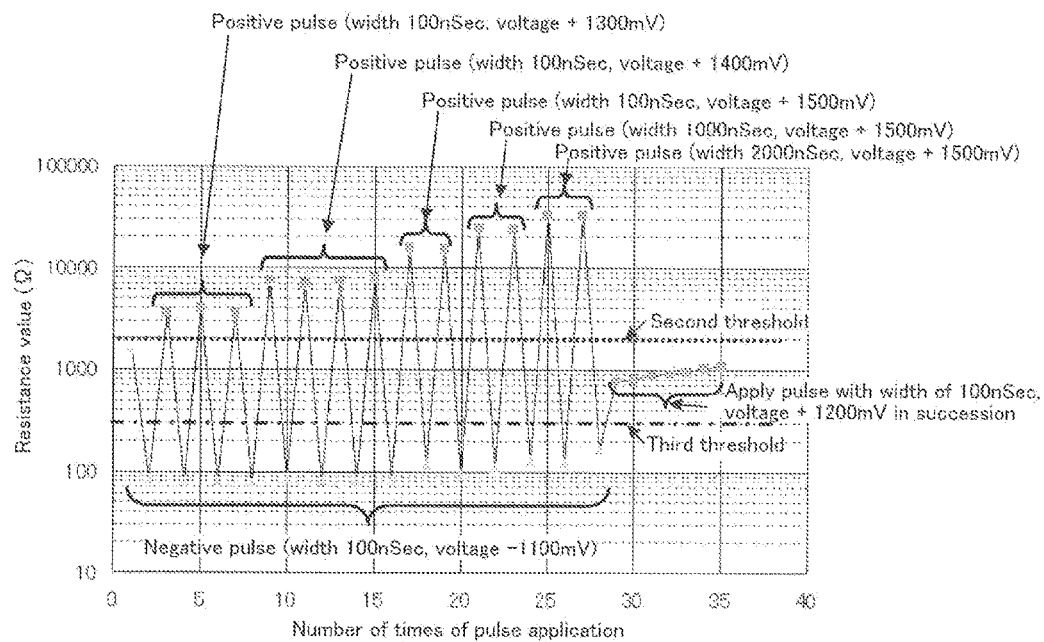
FIG. 7 is a view showing the exemplary resistance changing characteristic of the variable resistance element.

FIG. 7 is a view showing the exemplary resistance changing characteristic of the variable resistance element. A horizontal axis indicates the number of times of application of the pulse (electric signal), and a vertical axis indicates the resistance value read after the application of the electric signal (as described above, the resistance value is calculated from the current in the case where the read voltage $V_R$ is applied). Triangles (▲) indicate the resistance values read after a negative pulse (electric signal) is applied, while rectangles (■) indicate the resistance values read after a positive pulse (electric signal) is applied.

In the configuration of the element of FIG. 7, the material of the first electrode 124 is a tantalum nitride (TaN), the material of the second electrode 128 is platinum (Pt), the material of the variable resistance layer 126 is the tantalum oxides of the stacked-layer structure, the thickness of the variable resistance layer 126 is 50 nm or less, the area of the surface of the first electrode 124 and the surface of the variable resistance layer 126, which surfaces are in contact with each other, and the area of the surface of the second electrode 128 and the surface of the variable resistance layer 126, which surfaces are in contact with each other, are each equal to or smaller than 0.25 μm². The layer placed in contact with the first electrode 124, of the layers of the variable resistance layer 126, is the layer which is lower in oxygen concentration, and satisfies 0<x<2.5 when its composition is expressed as $TaO_x$. On the other hand, the layer placed in contact with the second electrode 128, of the layers of the variable resistance layer 126, is the layer which is higher in oxygen concentration, satisfies y≥2.1 when its composition is expressed as $TaO_y$, and has a thickness of about 5 nm.

As can be seen from FIG. 7, when the pulse voltage is increased from 1300 mV to 1500 mV, the resistance value read after application of the positive pulse increases gradually. In a case where the pulse voltage is fixed to 1500 mV, the resistance value read after application of the positive pulse increases gradually, when the pulse width is changed as 100 nSec, 1000 nSec, and 2000 nSec. In a case where the pulse voltage is applied plural times in succession, in a state in which the pulse voltage is fixed to a relatively small value, 1200 mV, the resistance value read after application of the positive pulse increases gradually. It can be found that the resistance value can be finely adjusted by using the voltage pulse with a relatively small magnitude, on the basis of such a characteristic. In other words, the variable resistance element having a characteristic of FIG. 7 is allowed to set the resistance value in any one of three or more changeable resistance value ranges, with high controllability.

When a sense amplifier which determines the resistance value using the second threshold, of FIG. 7, is used, it determines that the resistance values of all of the memory cells 91 to which the data is written by application of the positive pulse of +1300 mV or larger are larger than the second threshold, and outputs 0 of binary data (when the resistance value which is larger than the threshold is defined as digital data 0). On the other hand, when the resistance value of the memory cell 91 to which the data is written by application of a negative pulse and the resistance value of the memory cell 91 to which the data is written by application of the positive pulse of +1200 mV and 100 ns are smaller than the second threshold, the sense amplifier outputs 1 of binary data (when the resistance value which is smaller than the threshold is defined as digital data 1) for these memory cells 91. Note that the cell having a resistance value which perfectly coincides with the value of the threshold may be allocated to 1 or 0.

When the sense amplifier which determines the resistance value using the third threshold, of FIG. 7, is used, it determines that the resistance values of all of the memory cells 91 to which the data is written by application of the positive pulse of +1200 mV or larger are larger than the third threshold, and outputs 0 of the binary data. On the other hand, only the resistance value of memory cell 91 to which the data is written by application of a negative pulse is smaller than the third threshold, and therefore, the sense amplifier outputs 1 of the binary data.

By combining two kinds of outputs of the sense amplifier as described above, the element of FIG. 7 can be used as a three-valued memory.

The resistance change of the variable resistance element (ReRAM element) which occurred by the event that the conductive path electrically connecting the second electrode 128 to the first electrode 124 was generated within the variable resistance layer 126 was observed by cross-sectional analysis. It was found out that the conductive path had a diameter of 30 to 10 nm or less, and was smaller than the width of the wire manufactured by semiconductor process steps for a miniaturized structure in the state of the art. In other words, the variable resistance element as described above can maintain the stable resistance changing characteristic as well, even when it is manufactured by semiconductor process steps for a super miniaturized structure, which is recognized as a limit of processing using lithography.

The process step for forming the variable resistance layer of the variable resistance element (ReRAM element) need not a high-temperature treatment which exceeds several hundreds degrees C. Because of this, the characteristic of C-MOS transistor will not be degraded by a heating process step. Specifically, the variable resistance element has a feature in which it is highly compatible with the semiconductor process steps, and the reliability of resistance change is not degraded even when further miniaturization of the semiconductor process steps progresses, as compared to a memory element including a floating gate transistor such as a flash memory. Therefore, for example, even in a case where a logic circuit such as a controller and the variable resistance element are mounted on the same chip, the variable resistance element can be formed while lessening the effects on the characteristic of the logic circuit. In addition, the variable resistance element can be formed using the same process step as that for the logic circuit, manufacturing cost can be reduced.

[Operation Modes and Commands]

In the present embodiment, the non-volatile memory device 100 may have four or more operation modes. In this case, the non-volatile memory device 100 may receive one selected from among four or more commands externally input and selectively execute one of the four or more operation modes.

The non-volatile memory device 100 may selectively execute writing and reading of data on the basis of whether the memory cell 91 is in the initial state or the variable state (first mode), or writing and reading of data without utilizing whether or not the resistance value of the memory cell 91 is within the initial resistance value range and on the basis of whether or not the resistance value of the memory cell 91 is within at least one of the changeable resistance value ranges (second mode).

For example, in the example of FIG. 3, it is supposed that the electric stress for changing the memory cell 91 in the initial state to the variable state is the forming stress, the electric signal for changing the resistance value of the memory cell 91 from the first resistance value range to the second resistance value range is the LR state writing pulse, and the electric signal for changing the resistance value of the memory cell 91 from the second resistance value range to the first resistance value range is the HR state writing pulse.

In this case, a mode in which the write circuit 92 operates to apply the forming stress to the memory cell 91 selected with respect to input data "1", and not to apply the electric stress to the memory cell 91 selected with respect to input data "0" will be referred to as a special write mode (first write mode). The command input from outside the non-volatile memory device 100 to execute the special write mode will be referred to as a special write command (first write command).

A mode in which the read circuit 94 operates to read the data by determination using the first threshold will be referred to as a special read mode (first read mode). The command input from outside the non-volatile memory device 100 to execute the special read mode will be referred to as a special read command (first read command).

A mode in which the write circuit 92 operates to apply the LR state writing pulse (second electric signal) to the memory cell 91 selected with respect to input data "1", and to apply the HR state writing pulse (first electric signal) to the memory cell 91 selected with respect to input data "0", will be referred to as a normal write mode (second write mode). The command input from outside the non-volatile memory device 100 to execute the normal write mode will be referred to as a normal write command (second write command).

A mode in which the read circuit 94 operates to read the data by determination using the second threshold will be referred to as a normal read mode (second read mode). The command input from outside the non-volatile memory device 100 to execute the normal read mode will be referred to as a normal read command (second read command).

[Specific Example of Limitation of Access to Data]

In this configuration, for example, the normal write command and the normal read mode are widely published, in manual or the like of the non-volatile memory device 100. On the other hand, the special write command and the special read mode are owned only by the manufacturer of the non-volatile memory device 100, i.e., kept secret.

In this case, the manufacturer of the non-volatile memory device 100 writes a password in a particular region of the memory cell array 90 using the special write command. When a particular user inputs a password from outside the non-volatile memory device 100, for example, a controller (not shown) of the non-volatile memory device 100 compares the received password to the password read from the particular region in the special read mode and permits writing in the normal write mode and reading in the normal read mode when there is a coincidence between them.

In this configuration, for example, charged (paid) content data can be stored in the non-volatile memory device 100 in the normal write mode, and ID information, serial information of each content, etc., of the non-volatile memory device 100 can be stored in the special write mode. This allows only the particular user which preliminarily knows the ID information, serial information of each content, etc., of the non-volatile memory device 100 to access the charged content stored in the non-volatile memory device 100, which is access limitation. Also, for example, it becomes difficult for a third party which does not know the method of the special write mode and is not permitted to access the data to create a password unset state by rewriting the data in the non-volatile memory device 100.

When the non-volatile memory device 100 is sealed by resin or the like, the wire or the like may be damaged (broken) even if an attempt is made to bring a probe into contact with the wire inside the non-volatile memory device 100. Therefore, it is impossible to perform analysis by measuring an electric resistance. So long as the user does not leak the ID information and the command corresponding to the special read command, unauthorized (impermissible) access to the data inside the non-volatile memory device 100 will not take place.

In the flash memory used in the prior art, as miniaturization progresses, the reliability of the data storage in the case where this is used as the multi-valued memory is reduced. Especially, if an error occurs in the data bit string of the parameter (e.g., cipher key data or serial number) used for the encryption or authentication, the data created by the encryption using this parameter cannot be read at all. In some cases, the main body of the non-volatile memory device 100 cannot be accessed, which is a very serious damage. For this reason, it is required that the data of the parameter used for the encryption or authentication be stored with a very high reliability.

Regarding this, the non-volatile memory device 100 including the memory cell using the variable resistance element is able to ensure a high reliability even when miniaturization progresses. Especially, in the case of the variable resistance element in which the filament is formed in the variable resistance layer and thereby resistance change occurs, the localized region in which the filament is formed is much smaller than an element size. This makes it possible to lessen negative effects on the resistance changing characteristic even when miniaturization progresses in terms of the element size. Therefore, for example, the data of the parameter used for the encryption or authentication, etc., can be stored with a high reliability.

Or, the controller circuit for executing at least one of the encryption and the authentication and the non-volatile memory device (memory main body section) may be mounted on the same chip. In this configuration, in a case where the data of the encryption parameter or the like is transmitted and received between the controller circuit for executing at least one of the encryption and the authentication and the non-volatile memory device, it becomes possible to reduce a risk of a leakage of the encryption parameter or the like due to steal-reading of a signal waveform. Because of the characteristic of the variable resistance element, it is substantially impossible to determine the resistance state by physical analysis. As a result, the encryption parameter or the like are not stolen physically.

In a case where the flash memory used in the prior art is mounted along with the controller circuit on the same chip, the manufacturing process steps of the flash memory require a semiconductor process step which is different from C-MOS process used for the logic circuit. This increases the number of process steps and hence manufacturing cost. In addition, since the manufacturing process steps of the flash memory require a high-temperature thermal treatment, the semiconductive characteristic of the C-MOS process used for the logic circuit is negatively affected, and it becomes possible to ensure performance of the transistor characteristic due to many restrictions.

On the other hand, the non-volatile memory device 100 comprising the memory array including memory cells including the variable resistance elements, does not require a high-temperature thermal treatment, in the manufacturing process steps, which do not negatively affect the semiconductive characteristic of the C-MOS process. Therefore, in the case where the controller circuit and the non-volatile memory device (memory main body section) are mounted on the same chip, the confidentiality of the encryption parameters can be improved, without degrading the characteristic of the logic circuit such as the controller circuit, or increasing the cost of the manufacturing process steps.

Although in the above examples, the two special operation modes and the two special commands and the two normal operation modes and the two normal commands are set, the number and combination of the operation modes and the commands are not limited to this. In a case where the resistance value of the memory cell in the variable state is allowed to have seven levels, like the example of FIG. 7, 3-bit data may be written using eight levels in the special write mode including the initial state, or 2-bit data may be written using four levels in the normal write mode which does not include the initial state. Thus, the combination of the resistance value levels used for write may be suitably selected depending on a used system.

[Randomness of Change to Variable State by Application of Forming Stress]

The process step for changing the resistance value of the element in the initial state from the initial resistance value range to a particular changeable resistance value range is referred to as a forming process step or forming write. As described above, the voltage and pulse width of the electric signal for changing the element to the HR state to store "0" in the normal write mode are $V_H$ and $TP_H$, respectively, while the voltage and pulse width of the electric signal for changing the element to the LR state to store "1" in the normal write mode are $V_L$ and $TP_L$, respectively. The voltage and pulse width of the electric stress used for the forming write are $V_F$ and $TP_F$, respectively. In this case, when $|V_F|>|V_H|$ and $|V_F|>|V_L|$ are condition 1 and $TP_F>TP_H$ and $TP_F>TP_L$ are condition 2, at least one of the condition 1 and the condition 2 may be satisfied. In other words, the forming process cannot be executed under the write condition in the normal write mode.

Regarding the pulse width, when a specified forming process step is not completed after application of the electric stress is performed once, even in the state in which $TP_F>TP_H$ and $TP_F>TP_L$ are satisfied, the electric stress may be applied plural times to complete the forming process step. In this case, the electric stress may be applied repeatedly. During the repeated application of the electric stress, the applied voltage may be increased gradually with a specified increase amount. During the repeated application of the electric stress, the pulse width may be increased gradually with a specified increase amount or a specified increase rate.

It is supposed that to complete the forming for all of the memory cells, for example, in the state in which all of the memory cells within the memory cell array are in the initial state, it is necessary to apply the electric stress of 10000 units in normalized cumulative application time. In this case, if the application of the electric stress is halted at a stage in which the electric stress of 150 units has been applied to all of the memory cells, these memory cells do not change to the variable state, of course. However, from an experiment, it was revealed that even in the above case, the memory cells which change from the initial state to the variable state may occur randomly within the memory cell array.

Specifically, the memory cell array may have a characteristic in which a memory cell which changes from the initial state to the variable state by application of the electric stress for causing the memory cell to change from the initial state to the variable state, and a memory cell maintained in the initial state despite the application of the electric stress, occur randomly. In this case, the data (first-kind data) written in the special write mode, may be data generated by an event that the memory cells which change from the initial state to the variable state occur randomly.

Figure 8:
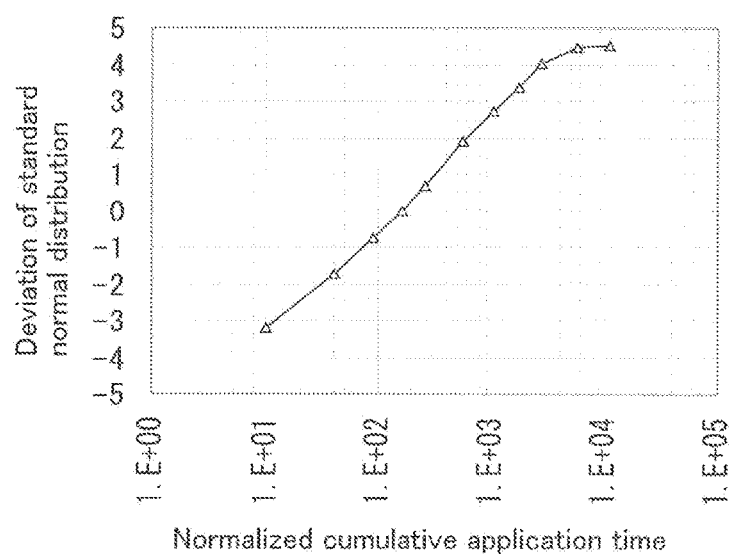
FIG. 8 is a view showing plots of the relation between a normalized cumulative application time and a deviation of a standard normal distribution of the memory cells which have changed to the variable state.

FIG. 8 is a view showing plots of the relation between a normalized cumulative application time and a deviation of a standard normal distribution of the memory cells which have changed to the variable state. In the configuration of the element, the material of the first electrode 124 is a tantalum nitride (TaN), the material of the second electrode 128 is iridium (Ir), the material of the variable resistance layer 126 is the tantalum oxides of the stacked-layer structure, the thickness of the variable resistance layer 126 is 50 nm, the area of the surface of the first electrode 124 and the surface of the variable resistance layer 126, which surfaces are in contact with each other, and the area of the surface of the second electrode 128 and the surface of the variable resistance layer 126, which surfaces are in contact with each other, are each equal to or smaller than 0.25 μm². The layer placed in contact with the first electrode 124, of the layers of the variable resistance layer 126, is the layer which is lower in oxygen concentration, and satisfies $0<x<2.5$ when its composition is expressed as $TaO_x$. On the other hand, the layer placed in contact with the second electrode 128, of the layers of the variable resistance layer 126, is the layer which is higher in oxygen concentration, satisfies $y \geq 2.1$ when its composition is expressed as $TaO_y$, and has a thickness of about 5.5 nm. The forming stress has a voltage of 3.5V and a shortest pulse width of 10 μSec. The number of memory cells is 256 kilobits. The cumulative application time of FIG. 8 is normalized time with a specified coefficient based on the shortest pulse width.

As shown in FIG. 8, the normal distribution of the cumulative bit number in which the forming is complete is substantially linear with respect to the cumulative application time. This implies that the change from the initial state to the variable state is a phenomenon which occurs very randomly. By using the randomness of the change to the variable state, it becomes possible to create the ID information which is unique and random for each non-volatile memory device.

In the example of FIG. 8, when the application of the electric stress in the special write mode is stopped at a time point when the normalized cumulative application time reaches 150, almost half memory cells have changed to the variable state and almost half memory cells have not changed to the variable state. The memory cells having changed to the variable state are random in location. In the special write mode, a part of the memory cells in the memory cell array are selected randomly, and thereby the data is generated to form random data and stored in the memory cell array. The data (first-kind data) written in the special write mode is the data which is unique and random for each non-volatile memory device.

The reason why the memory cell which has changed to the variable state and the memory cell which has not changed to the variable state, occur randomly among the elements, may be, for example, random occurrence of the memory cell for which the forming stress is completed, as well as the non-uniform process step or shape of the variable resistance element. As described above, the vacancy sites in the metal oxide are placed randomly for each of the memory cells and connected to each other to form the filament by the forming. For this reason, even when a specified electric stress is applied to the plurality of memory cells in the initial state, the memory cells for which the forming is completed occur non-uniformly statistically (e.g., in standard normal distribution manner). From this, it may be considered that even when a uniform stress is applied to the plurality of memory cells in the special write mode, the electric stress may be adjusted so that the element formed with the filament and the element which is not formed with the filament, occur probabilistically. It is estimated that the same mechanism is applied to the material formed with the filament path by connecting the oxygen vacancy sites or the like to each other.

In general, to generate the random ID information, random values generated using a particular function inside the device are used. However, if the function is the same and the input initial value is the same, the same values are output depending on the number of times of computation. If the function formula and the initial value leak, the random values generated inside the device are predicted, for example, the cipher key or the like generated based on the random values is estimated, which may lead to a security accident.

When the random values are generated on the basis of the change of the variable resistance element from the initial state to the variable state, which is a random phenomenon unique to the variable resistance element, the formula for generating the random values in an unpredictable manner can be established. If the random data written in the special write mode is used as the initial value of the function for obtaining the above stated random values, the degree of the randomness can be improved, which is an advantage.

For example, in the specific example of the above stated limitation of the access to the data, by writing the ID information and the serial information as the random data in the special write mode, the ID information and the serial information can be set and stored in an unpredictable manner. The ID information and the serial information written in the special write mode, are limited in utilization in such a manner that they are read in the special read mode and provided to a particular user to allow the particular user to utilize the content.

Example 1

Figure 9:
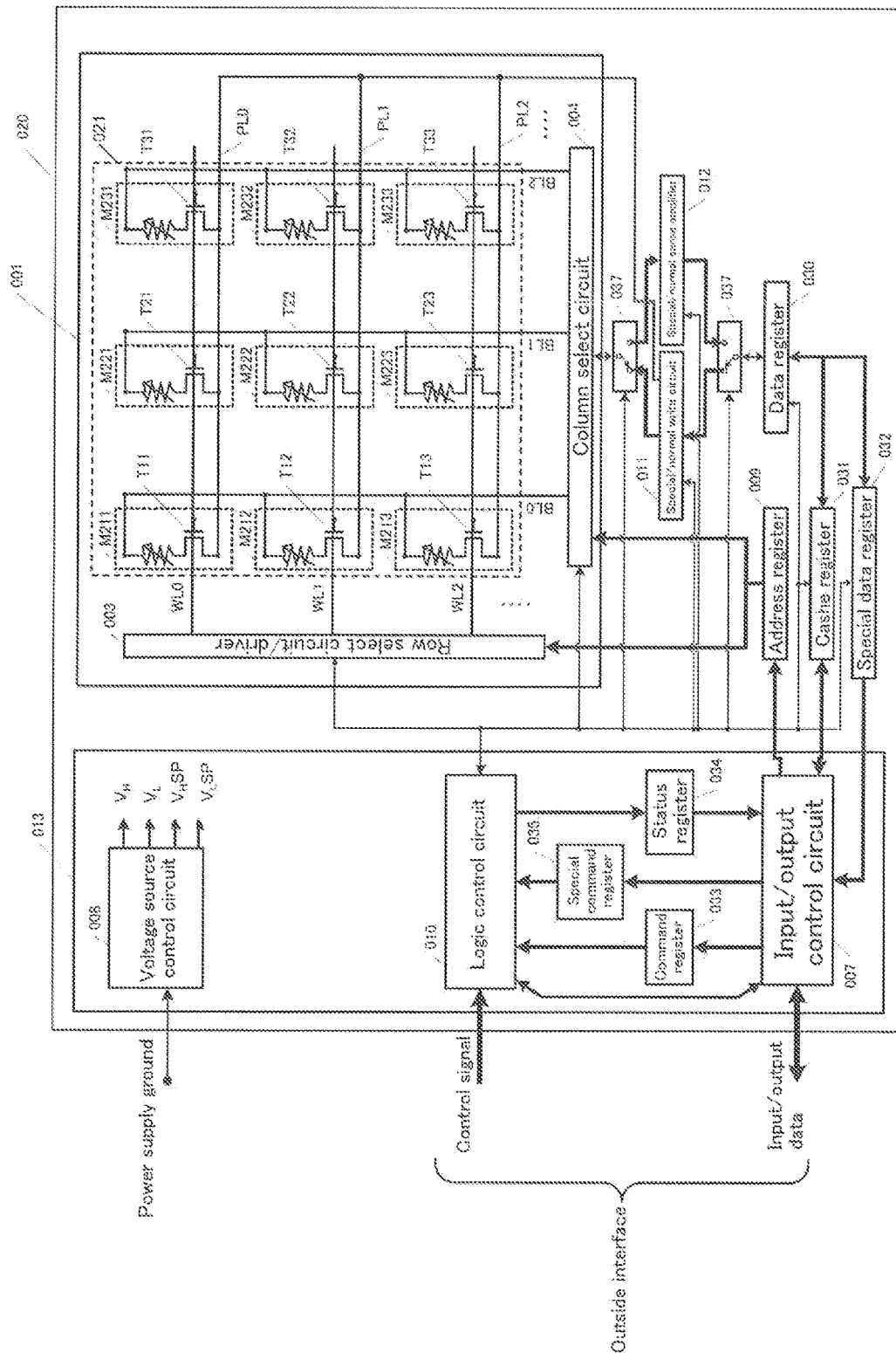
FIG. 9 is a block diagram showing the exemplary schematic configuration of a non-volatile memory device according to Reference example 1 of Reference embodiment 1.

FIG. 9 is a block diagram showing the exemplary schematic configuration of a non-volatile memory device according to Example 1 of Reference embodiment 1. The configuration of FIG. 9 is merely exemplary, and the specific configuration of the non-volatile memory device according to Reference embodiment 1 is not limited to the configuration of FIG. 9, of course.

As shown in FIG. 9, the non-volatile memory device 020 of Example 1 includes a memory main body section 001 on a semiconductor substrate. The memory main body section 001 includes a memory cell array 021, a row select circuit/driver 003, and a column select circuit 004.

The memory cell array 021 includes a plurality of first wires (in the example of FIG. 9, WL0, WL1, WL2, . . . . Hereinafter, these will be referred to as word lines WL0, WL1, WL2, . . . for easier explanation) formed on the semiconductor substrate such that they extend in parallel with each other in a first direction within a first plane, a plurality of second wires (in the example of FIG. 9, BL0, BL1, BL2, . . . . Hereinafter, these will be referred to as bit lines BL0, BL1, BL2, . . . for easier explanation formed within a second plane parallel to the first plane such that they extend in parallel with each other in a second direction and three-dimensionally cross the first wires, respectively, and memory cells M211, M212, M213, M221, M222, M223, M231, M232, M233 (hereinafter will be referred to as "memory cells M211, M212, . . . " provided at three-dimensional cross-points of the word lines WL0, WL1, WL2, . . . and the bit lines BL0, BL1, BL2, . . . .

Each of the memory cells M211, M212, . . . includes the variable resistance element 120 (see FIG. 2). The word lines WL0, WL1, WL2, . . . are connected to the control terminals (also referred to as gates) of transistors T11, T12, T13, T21, T22, T23, T31, T32, T33, . . . (hereinafter will be referred to as "transistors T11, T12, . . . " included in the memory cells M211, M212, . . . , respectively, and the bit lines BL0, BL1, BL2, . . . are connected to one ends of the variable resistance elements 120 of the memory cells M211, M212, . . . , respectively. The other ends of the variable resistance elements 120 included in the memory cells M211, M212, . . . , respectively, are connected to the first main terminals of the transistors T11, T12, . . . included in the memory cells M211, M212, . . . , respectively.

The variable resistance element 120 operates as the non-volatile memory element within the memory cell. In the example of FIG. 9, 1T1R memory device is shown, in which each of the memory cells includes one transistor and one variable resistance element.

The memory array further includes a plurality of plate lines PL0, PL1, PL2, . . . arranged in parallel with the word lines WL0, WL1, WL2, . . . , respectively. The plate lines PL0, PL1, PL2, . . . are connected to the second main terminals of the transistors T11, T12, . . . included in the memory cells M211, M212, . . . , respectively. Which of the first main terminal and the second main terminal of each of the transistors T11, T12, . . . becomes a source or a drain is not particularly limited, but may be suitably set depending on specific operation. Specifically, this may be decided depending on the direction of a current flowing through the transistor, positive/negative of charges of major carrier, etc.

The configuration of the variable resistance element 120 may be the same as that of Reference embodiment 1 and will not be described in detail repeatedly.

In the example of FIG. 9, n-channel MOS transistor is used as the select transistor of the memory array. The first main terminals of the transistors T11, T12, T13, . . . are connected to the bit line BL0 via the variable resistance elements, respectively, the first main terminals of the transistors T21, T22, T23, . . . are connected to the bit line BL1 via the variable resistance elements, respectively, and the first main terminals of the transistors T31, T32, T33, . . . are connected to the bit line BL2 via the variable resistance elements, respectively.

The gates of the transistors T11, T21, T31, . . . are connected to the word line WL0, the gates of the transistors T12, T22, T32, . . . are connected to the word line WL1, and the gates of the transistors T13, T23, T33, . . . are connected to the word line WL2.

The second main terminals of the transistors T11, T21, T31, . . . are connected to the plate line PL0, the second main terminals of the transistors T12, T22, T32, . . . are connected to the plate line PL1, and the second main terminals of the transistors T13, T23, T33, . . . are connected to the plate line PL2.

Although in the example of FIG. 9, the plate lines are shown to be connected form single lines on the respective rows, they may be separated into a plurality of blocks.

The non-volatile memory device 020 further includes a special/normal write circuit 011, a special/normal sense amplifier 012, a switching circuit 037, a voltage source control circuit 008, a logic control circuit 010, a command register 033, a status register 034, a special command register 035, an input/output control circuit 007, an address register 009, a Cashe register 031, a special data register 032, and a data register 030.

The special/normal write circuit 011 (hereinafter will be simply referred to as write circuit) writes information to one or more memory cells selected by the row select circuit/driver 003 and the column select circuit 004.

The special/normal sense amplifier 012 (hereinafter will be simply referred to as sense amplifier) detects the resistance value of the selected memory cell, and determines whether the detected resistance value corresponds to one of at least two values (e.g., data "1" and data "0").

The switching circuit 037 performs switching between a write operation performed by connecting the memory cell selected by the column select circuit to the write circuit 011 and a read operation performed by connecting the memory cell selected by the column select circuit to the sense amplifier 012.

The voltage source control circuit 008 generates a plurality of voltage sources required to write data to the memory cell.

The logic control circuit 010 causes the input/output control circuit 007 to obtain the control command, the address information and the input data, in response to control signals input externally. The logic control circuit 010 causes the input/output control circuit 007 to control the operation of the non-volatile memory device 020 based on the control commands stored in the command registers (special command register 035 and command register 033).

The input/output control circuit 007 obtains the input data via an input/output data bus, in response to the command based on the control signal from the logic control circuit 010, extracts the control command and the address information from the input data and holds the control command and the address information in the command register and the address register, respectively. In addition, the input/output control circuit 007 outputs to outside the data held in the status register 034, the Cashe register 031, etc., in response to the control commands stored in the command registers.

Typically, the control command is extracted from the input data obtained by the input/output control circuit 007, in response to the control signal input to the logic control circuit 010. Specifically, for example, the logic control circuit 010 generates a command input timing based on the input control signal, and generates the control command and the corresponding address information from the data (command data pattern) input to the input/output control circuit 007 based on this command input timing. The control command refers to the normal write command, the special write command, the normal read command, the special read command, etc. The special write command is a command data pattern which is different from the normal write command. The special read command is a command data pattern which is different from the normal read command. Note that the special write command and the special read command may be commands which are not published to general users.

The command register 033 temporarily stores the control command. For example, the normal write command or the normal read command may be stored in the command register 033.

The status register 034 temporarily stores status information indicating the internal state of the memory device which is known to outside, in response to the command based on the control signal from the logic control circuit 010.

The special command register 035 temporarily stores the special write command or the special read command.

The address register 009 outputs a row address signal to the row select circuit/driver 003, and outputs a column address signal to the column select circuit 004, based on an address signal held by the address register 009. The address signal is defined as a signal indicating the address of a particular memory cell selected from the plurality of memory cells M211, M212, . . . .

The row address signal is a signal indicating the row address of the address indicated by the address signal, while the column address signal is a signal indicating the column address of the address indicated by the address signal. In the example of FIG. 9, the column select circuit 0004 selects one bit line corresponding to the column address, and the row select circuit selects one word line corresponding to the row address. Hereinafter, a case where a single memory cell is selected from the shown memory cell group will be exemplarily described, but the present disclosure is not limited to this. For example, if BL0 and BL1 are selected when WL0 is selected, two cells are selected simultaneously, and simultaneous access to the plurality of cells is enabled by configuring the write circuit 011 and the sense amplifier 012 such that the data is simultaneously written to or read from BL0 and BL1 in parallel. Those skilled in the art can easily practice such modification or similar alternation.

The Cashe register 031 buffers specified data to be written based on the control signal and the input data, under control of the input/output control circuit 007, when the control command code which is obtained from the control signal and the input data and temporarily stored in the command register 033 indicates the "normal write mode", or when the control command code which is obtained from the control signal and the input data and temporarily stored in the special command register 035 indicates the "special write mode".

The special data register 032 receives the data read by the sense amplifier 012 set in the special mode, from the memory cell selected in each read cycle, via the data register 030, when the control command code which is obtained from the control signal and the input data and temporarily stored in the command register 033 indicates "special read mode".

The data register 030 takes data in each write cycle from the Cashe register 031 and temporarily stores the data.

The control command is obtained from the control signal and the input data and temporarily stored in the command register 033. When the stored control command indicates the "normal read mode", the sense amplifier 012 set in the normal mode, reads the data from the memory cell selected in each read cycle, and the read data is sequentially temporarily stored in the data register 030. The data register 030 outputs the temporarily stored data to the Cashe register 031. The Cashe register 031 buffers the read data with a specified volume and outputs the read data to the device under control of the input/output control circuit 007.

In the example of FIG. 9, the controller 013 is operative to include the voltage source control circuit 008, the logic control circuit 010, the input/output control circuit 007, the command register 033, the status register 034, and the special command register 035. The controller 013 and the memory main body section 001 may be mounted on the same chip. This can reduce a risk of steal-reading of the information transmitted and received between the controller 013 and the memory main body section 001.

The logic control circuit 010 causes the switching circuit 037 to form a connection to the write circuit 011, in a data write cycle. The input/output control circuit 007 stores the input data in the Cashe register 031, takes out only the data required in each write cycle from the Cashe register 031 in response to the command from the logic control circuit 010, and sequentially sends the data to the data register 030. The write circuit 011 executes specified writing to the selected memory cell, in accordance with the information of the data in the data register 030 in each write cycle, in response to the command from the logic control circuit 010. The logic control circuit 010 causes the switching circuit 037 to form a connection to the sense amplifier 012, in a data read cycle. The sense amplifier 012 reads the resistance value with a specified condition from the selected memory cell in each read cycle, in response to the command from the logic control circuit 010, perform decoding into the original data, and sends the original data to the data register 030. The Cashe register 031 stores the data output in each read cycle in response to the command from the logic control circuit 010, and sequentially outputs the data to outside the non-volatile memory device 020 under control of the input/output control circuit 007.

When receiving the normal write command, the input/output control circuit 007 holds the normal write command in the command register 033. The input/output control circuit 007 holds in the address register 009, the write address extracted from the data input via the input/output data bus in the same manner. Then, the normal write circuit 011 suitably applies the electric signal to each of the memory cells based on the setting in each register, in response to the command from the logic control circuit 010, to write specified data to the memory array.

When receiving the normal read command, the input/output control circuit 007 holds the normal read command in the command register 033. The input/output control circuit 007 holds in the address register 009, the read address extracted from the data input via the input/output data bus in the same manner. Then, the sense amplifier 012 set in the normal mode, reads the specified data from the memory array, based on the setting in each register, in response to the command from the logic control circuit 010, and stores the read data in the Cashe register 031 via the data register 030. When the data with a required data volume has been stored in the Cashe register 031, the input/output control circuit 007 sequentially outputs the data stored in the Cashe register 031 to outside. Although an example in which the data is stored in the Cashe data register 030 and then output to outside, for example, has been described, the Cashe data register 030 may be omitted.

When receiving the command for checking the internal operation state of the non-volatile memory device 020, the logic control circuit 010 researches the internal state, and holds the code indicating the internal operation state corresponding to the received content, in the status register 034. Then, the input/output control circuit 007 outputs the status code held in the status register 034 to outside.

As described above, the command data pattern of the special write command is set different from the command data pattern of the normal write command. Likewise, the command data pattern of the special read command is set different from the command data pattern of the normal read command. In the access using the special commands, access to a particular address area, under a particular write condition, a particular read condition, etc., which cannot be executed using the normal commands, may be permitted. By making the command patterns different from each other in this way, for example, the user who knows only the normal commands, is not permitted (unauthorized) to access the data stored using the special commands.

When receiving the special write command, the input/output control circuit 007 holds the special write command in the special command register 035. The input/output control circuit 007 holds in the address register 009, the write address which is extracted from the data input via the input/output data bus in the same manner and the normal user is not permitted to access. Then, the special write circuit 011 suitably applies the forming stress to each of the memory cells based on the setting in each register, in response to the command from the logic control circuit 010, to write specified data to the memory array.

When receiving the special read command, the input/output control circuit 007 holds the special read command in the special command register 035. The input/output control circuit 007 holds in the address register 009, the read address which is extracted from the data input via the input/output data bus in the same manner and the normal user is unauthorized to access. Then, the sense amplifier 012 set in the special mode, reads the specified data from the memory array, based on the setting in each register, in response to the command from the logic control circuit 010, and stores the read data in the Cashe register 031 via the data register 030. When the data with a required data amount has been stored in the Cashe register 031, the input/output control circuit 007 sequentially outputs the data stored in the Cashe register 031 to outside.

Figure 10:
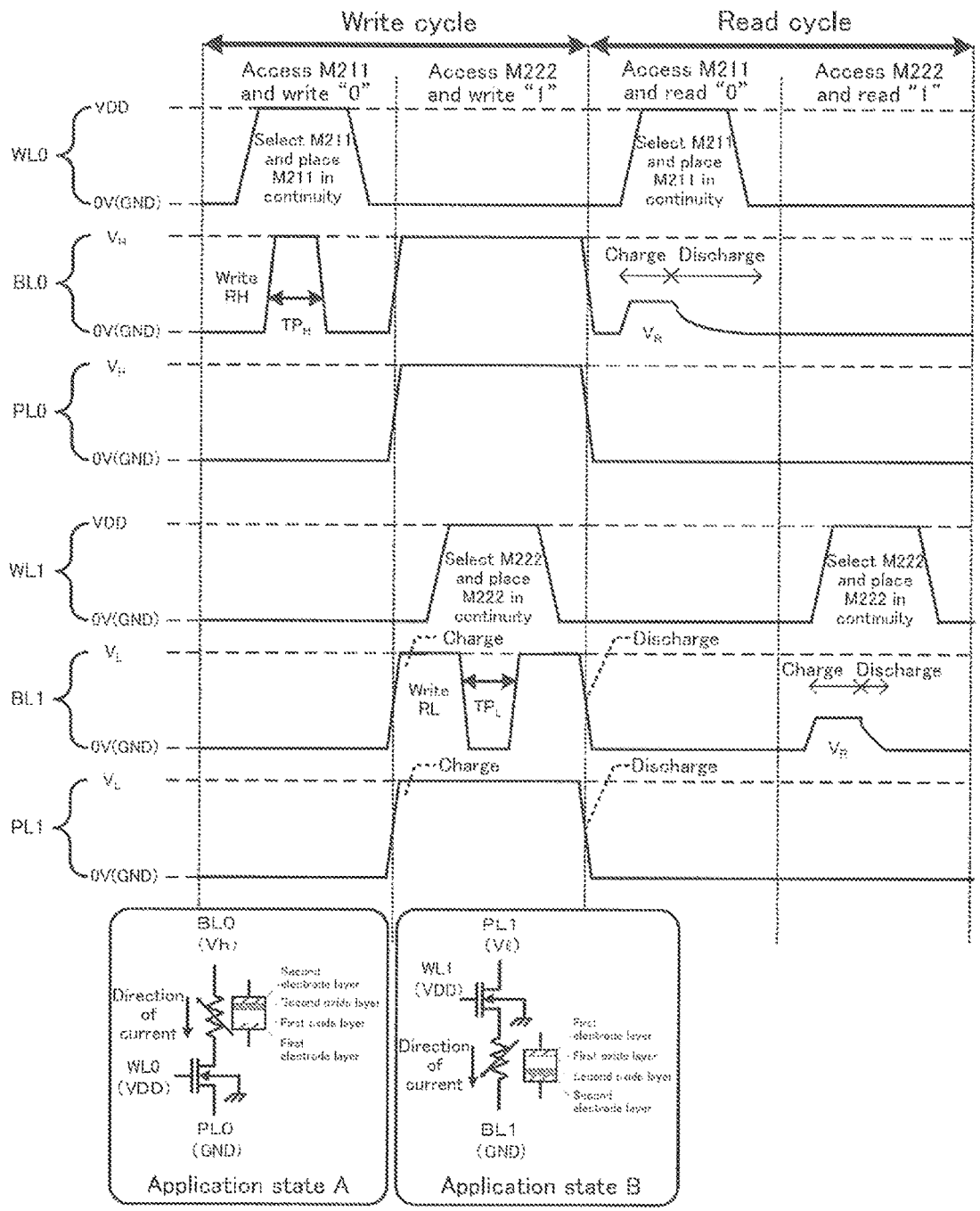
FIG. 10 is a timing chart showing the exemplary write cycle and the exemplary read cycle of the non-volatile memory device according to Reference example 1 of Reference embodiment 1.

FIG. 10 is a timing chart showing the exemplary write cycle and the exemplary read cycle of the non-volatile memory device according to Example 1 of Reference embodiment 1. Hereinafter, the exemplary signal control for one memory cell, in the write cycle and in the read cycle, will be described with reference to FIG. 10.

Now, a case where the bipolar variable resistance element which is more complex in signal line control is used will be exemplarily described. Based on this example, a case where the configuration including the unipolar variable resistance element is used can be easily designed. Specific control is not limited to the example described below, of course.

It is supposed that a case where the variable resistance layer is in the HR state is allocated to data "0" and a case where the variable resistance layer is in the LR state is allocated to data "1". For easier explanation, a case where the data is written to and read from the memory cells M211 and M222, will be exemplarily described.

In FIG. 10, $V_H$ indicates the pulse voltage (voltage at both ends of the memory cell) required to change the resistance value of the variable resistance element to the HR level, while $V_L$ indicates the pulse voltage (voltage at both ends of the memory cell) required to change the resistance value of the variable resistance element to the LR level. The voltage source control circuit 008 generates $V_H$ and $V_L$ based on the voltages input externally. In the example of FIG. 10, $V_H$ and $V_L$ are positive values. A case where in the bipolar variable resistance element, the HR state writing voltage and the LR state writing voltage are almost equal in absolute value, and the voltages at both ends of the memory cell can have an equal voltage amplitude, i.e., $V_H=V_L$ will be exemplarily described.

During the read, the read voltage $V_R$ which is smaller in absolute value than the write voltages ($V_H$ and $V_L$) is applied between the both ends of the memory cell. The write circuit 011 supplies one of the voltages $V_H$, $V_L$ and GND to the plate line according to an application direction. In response to a need for switching between the write mode, the read mode or the like, each bit line and each plate line is charged with one of the voltages $V_H$, $V_L$ and $V_R$ or discharged to GND.

As shown in FIG. 10, during the write cycle for the memory cell M211, the write circuit 011 pre-sets the voltage of the bit line BL0 and the voltage of the plate line PL0 to GND level. VDD is applied to the word line WL0, and the transistor T11 of the memory cell M211 is placed in a continuity state. The electric pulse with a pulse width of $TP_H$ and a voltage of $V_H$ is applied to the bit line BL0. Thereby, the HR state writing voltage ($V_H$) for writing the data "0" to the memory cell M211 is applied for the pulse width $TP_H$, so that the variable resistance element 120 of the memory cell M211 is changed to the HR state. By this operation, the data "0" is written to the memory cell M211. The application state in this case is shown as application state A in FIG. 10. It can be seen from FIG. 10, a current flows from the second electrode layer (second electrode 128) to the first electrode layer (first electrode 124).

As shown in FIG. 10, during the write cycle for the memory cell M222, the write circuit 011 initially pre-sets the voltages of all of the word lines to 0V and all of the bit lines and all of the plate lines, including the unselected bit lines and plate lines are charged with $V_L$ (=$V_H$). Then, VDD is applied to the word line WL1, and the transistor T22 is turned ON. The electric pulse with a pulse width of $TP_L$ and a voltage changing as $V_L \rightarrow 0 \rightarrow V_L$ is applied to the selected bit line. Thereby, the LR state writing voltage (-$V_L$) for writing the data "1" to the memory cell M222 is applied for the pulse width $TP_L$, so that the variable resistance element 120 of the memory cell M222 is changed to the LR state. By this operation, the data "1" is written to the memory cell M222. At the end of the cycle, the word line is discharged from VDD to 0V, and the select transistor T22 is turned OFF. Then, all of the bit lines and plate lines charged with $V_L$ are discharged to 0V. The application state in this cycle is shown as application state B in FIG. 10. It can be seen from FIG. 10, a current flows from the first electrode layer (first electrode 124) to the second electrode layer (second electrode 128).

As shown in FIG. 10, during the read cycle for the memory cell M211, VDD is applied to the word line WL0 to turn ON the transistor T11, and the column select circuit connects the memory cell M211 to the sense amplifier 012. According to that timing, the read voltage $V_R$ which is smaller in amplitude than the write pulses and does not cause the memory cell to change the resistance state is applied to the bit line BL0. The driver (driver 131 of FIG. 11) for driving the voltage of $V_R$ outputs the voltage for a specified period, and switching to a high impedance occurs. Then, the voltage of $V_R$ of the bit line BL0 is discharged according to the time constant decided by the resistance value, load capacitance (total of diffusion capacitance of wire and transistor, and a capacitance of capacitor, etc.) of the memory cell, etc. Since the resistance value of the memory cell M211 is set to HR in previous write, the discharge requires a relatively long time. Therefore, it is determined that the time required for the discharge is longer than a predetermined threshold, and the input/output control circuit 007 outputs the data "0" indicating the HR level.

As shown in FIG. 10, during the read cycle for the memory cell M222, VDD is applied to the word line WL1 to turn ON the transistor T22, and the column select circuit connects the memory cell M222 to the sense amplifier 012. According to that timing, the read voltage $V_R$ is applied to the bit line BL1. The driver for driving the voltage of $V_R$ outputs the voltage for a specified period, and switching to a high impedance occurs. Then, the voltage of $V_R$ of the bit line BL1 is discharged according to the time constant decided by the resistance value and load capacitance of the memory cell. Since the resistance value of the memory cell M222 is set to LR in previous write, the discharge is completed in a relatively short time. Therefore, it is determined that the time required for the discharge is shorter than a predetermined threshold, and the input/output control circuit 007 outputs the data "1" indicating the LR level.

In these read cycles, the write circuit 011 supplies 0V (ground level) to all of the plate lines and unselected bit lines.

In a case where the special write command is input to the non-volatile memory device 020, for example, at least one of the voltage, pulse width and cumulative application time of the electric stress output from the write circuit 010 during the write is set different from that in the normal write mode.

In the special write mode, in a case where masking is performed to maintain the variable resistance element in the initial state such that no electric stress is applied thereto, the voltage of the electric stress is set to $V_H\text{SP}(=0V)$, and the pulse width of the electric stress is set to $TP_H\text{SP}$ (=0 ns). It is supposed that the forming stress is a single electric pulse, the voltage of the forming stress is set to $V_L\text{SP}$, and the pulse width of the forming stress is set to $TP_L\text{SP}$. The voltage source control circuit 008 of FIG. 9 generates $V_H\text{SP}$ and $V_L\text{SP}$.

As described with reference to FIG. 7, in a case where the special write command is input and the variable resistance element is maintained in the initial state, the voltage level of $V_H$ may be changed into $V_H\text{SP}$, while when the special write command is input and the variable resistance element is changed to the variable state, the voltage level of $V_L$ may be changed into V$_L$SP. V$_H$SP, TP$_H$SP, V$_L$SP, and TP$_L$SP correspond to V$_H$, TP$_H$, V$_L$ and TP$_L$ corresponding to the normal write command, respectively. Some of these may be equal in value.

Next, the exemplary specific configuration and operation of the sense amplifier 012 in the special read mode and in the normal read mode will be described.

Figure 11:
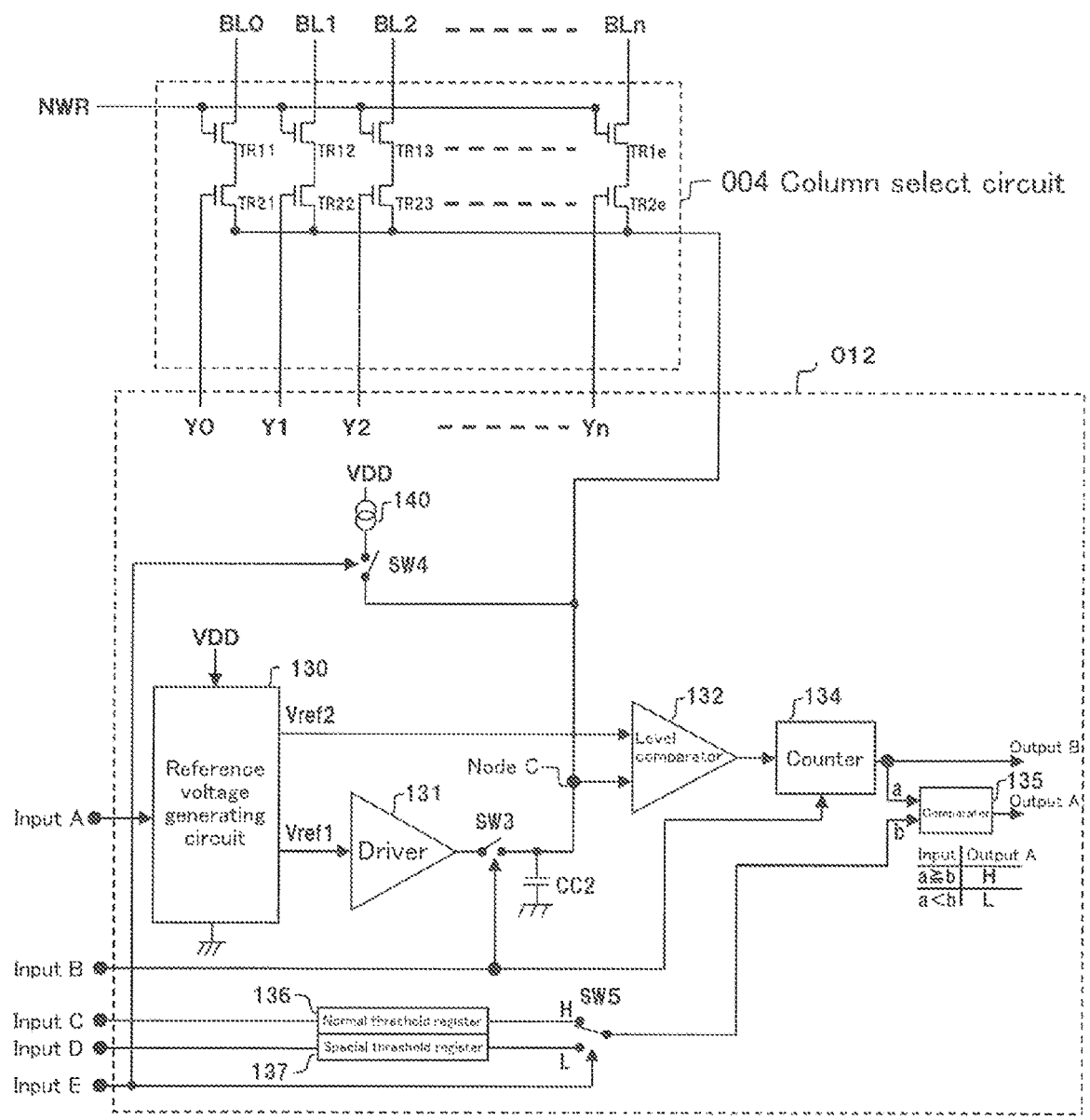
FIG. 11 is a block diagram showing the exemplary schematic configuration of a sense amplifier included in the non-volatile memory device according to Reference example 1 of Reference embodiment 1.
Figure 12:
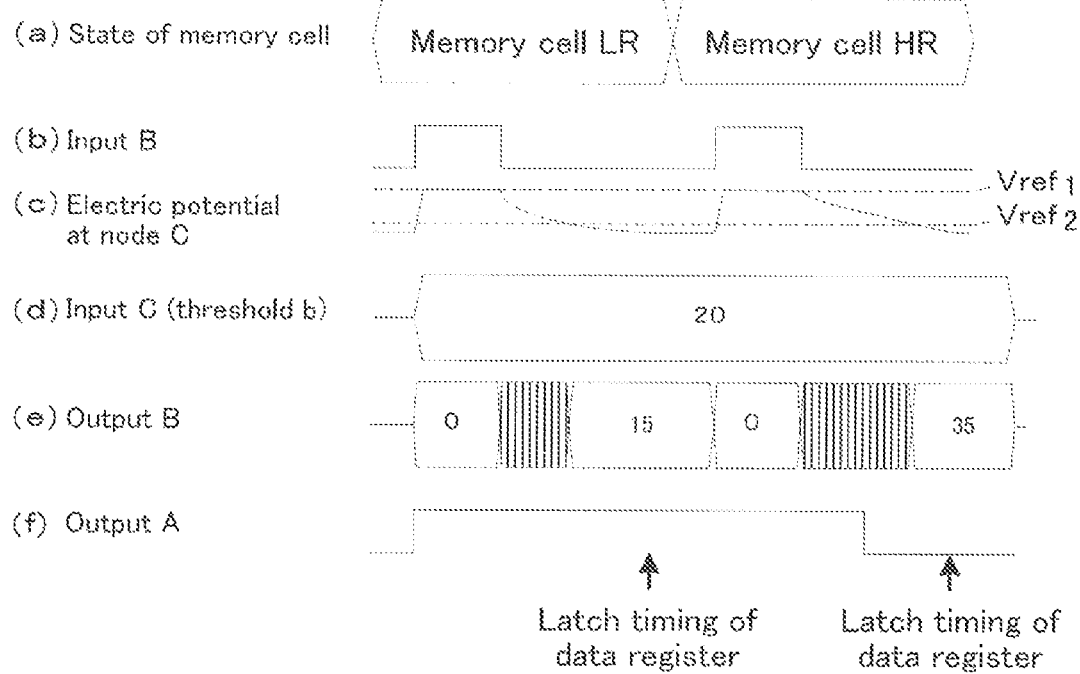
FIG. 12 is a timing chart showing the exemplary operation of major components of the sense amplifier included in the non-volatile memory device according to Reference example 1 of Reference embodiment 1.

FIG. 11 is a block diagram showing the exemplary schematic configuration of the sense amplifier included in the non-volatile memory device according to Example 1 of Reference embodiment 1. FIG. 12 is a timing chart showing the exemplary operation of major components of the sense amplifier included in the non-volatile memory device according to Example 1 of Reference embodiment 1.

In the example of FIG. 11, the column select circuit 004 surrounded by a broken line has been described above, and will not be described repeatedly. The switching circuit 037 of FIG. 9 selects the write circuit when NWR is Low and the sense amplifier rather than the write circuit, when NWR is High, although the switching circuit 037 not shown in FIG. 11.

In the example of FIG. 11, a reference voltage generating circuit 130 outputs a specified reference voltage in response to a command input from the logic control circuit 010 to an input A. Specifically, for example, the reference voltage generating circuit 130 creates a plurality of specified voltage levels by dividing a voltage using a ladder resistance or the like based on an electric potential difference between the power supply voltage VDD and the set voltage GND, chooses some of these specified voltage levels using a semiconductor switch or the like, and outputs Vref1 and Vref2. Vref1 and Vref2 satisfy the relationship of Vref1>Vref2. As the circuit for generating the reference voltages, there are many known configurations. In the present example, the known configuration may be used. Vref2 (determination voltage) may be made different between the special read mode and the normal read mode.

A switch control signal is input from the logic control circuit 010 to an input B. A switch 3 (SW3) is OFF when the switch control signal is 'L', and ON when the switch control signal is 'H'. When the switch 3 is OFF, the state of input from the reference voltage generating circuit 130 to a node C switches to HiZ (high impedance) state. When the switch 3 is ON, the driver 131 outputs the electric potential of Vref1 to the node C. Although the input/output voltage values are actually varied to some extent depending on a voltage drop of a transistor, a wire, etc., constituting the driver 131 and other circuits, it is assumed that the effects of the voltage drop or the like is negligible, for easier explanation.

The node C is connected to the selected memory cell included in the memory cell array 021 (FIG. 9). For example, it is assumed that the amount of information based on the resistance value of the memory cell M211 is read. Initially, all of the bit lines and all of the word lines are set to 0V. The logic control circuit 010 selects the bit line BL0 by changing NWR of FIG. 8 from Low level to High level, setting Y0 to High Level, and setting Y1 to Yn to Low level. In addition, the selected word line WL0 is set to High level, the unselected word lines except WL0 are set to Low level, and the read voltage of V$_R$=Vref1 is applied to the node C to which the selected bit line BL0 is connected.

Next, the application method to the node C and the reading method of the resistance value information will be described. As shown in FIG. 11, a capacitor CC2 is connected in parallel with the memory cell, between the node C and a ground. This capacitor may be realized by a wire capacitance, the diffusion capacitance of the transistor, etc., or may be added separately from the wire and the transistor.

In general, to increase a read speed, the capacitance of the capacitor CC2 may be reduced to a smallest possible level. As described above, when the switch control signal input to the input B is 'H', the electric potential at the node C becomes Vref1. Thereafter, when the switch control signal input to the input B becomes 'L', SW3 is turned OFF, and the state of input from the reference voltage generating circuit 130 to the node C becomes HiZ (high impedance) state. Thereafter, the capacitor CC2 starts discharge, and the electric potential at the node C is reduced gradually from Vref1 according to the time constant decided by the capacitance of the capacitor CC2 and the resistance value of the selected memory cell connected in parallel with the capacitor CC2.

Specifically, when the resistance value of the selected memory cell is small, a current flowing therethrough is increased, and therefore the electric potential is reduced at a higher pace. On the other hand, when the resistance value of the selected memory cell is large, a current flowing therethrough is reduced, and therefore the electric potential is reduced at a slower pace. This operation will be easily understood with reference to FIG. 12.

As can be seen from the state of the memory cell of FIG. 12(a), the former half indicates that the memory cell is in the LR state, and the latter half indicates that the memory cell is in the HR state. In these states, the input B changes to 'H' at the timing of FIG. 12(b) and the voltage of Vref1 is applied to the node C for the period of 'H' as shown in FIG. 12(c).

When the input B switches from 'H' to 'L', the switch circuit SW3 is OFF, and the state of input from the reference voltage generating circuit 130 to the node C switches to HiZ, and therefore the electric potential at the node C is reduced gradually (discharge). The time period that lapses until the electric potential at the node C becomes smaller than Vref2 is shorter when the memory cell is in the LR state and is longer when the memory cell is in the HR state.

A level comparator 132 of FIG. 11 compares the electric potential Vref2 output from the reference voltage generating circuit 130 to the electric potential at the node C. When the electric potential at the node C is higher than Vref2, the level comparator 132 outputs 'L', while when the electric potential at the node C is lower than Vref2, the level comparator 132 outputs 'H'. The time period that lapses from when the switching control signal has switched from 'H' to 'L' until the output of the level comparator 132 changes from 'L' to 'H' is shorter when the memory cell is in the LR state and is longer when the memory cell is in the HR state.

For the time period during which the control signal of the input B is 'H', a counter 134 is reset to zero. When the switch control signal is 'L', and the input from the level comparator 132 is 'L', the counter 134 is counted up according to the cycle of a clock (not shown) input to the counter 134. Note that the counter 134 may be limited to a predetermined upper limit value so that the count value does not overflow.

The operation of the counter 134 is shown in FIG. 12(e). As shown in FIG. 12(e), the counter 134 starts count up just after the input B has changed to 'L'. In the state in which the memory cell is in the LR state, the counter 134 stops count up when the count value reaches 15, while in the state in which the memory cell is in the HR state, the counter 134 stops count up when the count value reaches 35, and its count value is fixed to 35.

A threshold corresponding to the normal read mode is input to the input C of FIG. 11, and set in a normal threshold register 136. A threshold corresponding to the special read mode is input to the input D of FIG. 11, and set in a special threshold register 137.

A switching signal for switching between the special read mode and the normal read mode is input to an input E. When the switching signal High is input, SW5 is connected to 'H' terminal, while when the switching signal Low is input, SW5 is connected to 'L' terminal.

By this switching, the threshold held in proper one of the normal threshold register 136 and the special threshold register 137 is input to the input b of the comparator 135. In the normal read mode, for example, as shown in FIG. 9, the value of 20, which is the threshold used to determine whether the variable resistance element is in the HR state or in the LR state, is input.

The count value output from the counter 134 is input to the input a of the comparator 135. The comparator 135 compares the count value input to the input a to the threshold input to the input b. When the input a≥input b, the comparator 135 determines that the selected memory cell is in the HR state, and outputs 'L' (data "0") to the output A. On the other hand, when the input a<input b, the comparator 135 determines that the selected memory cell is in the LR state, and outputs 'H' (data "1") to the output A.

In the case of the threshold 20 of FIG. 12, 'H' is output to the output A when the selected memory cell is in the LR state, at data latch timing of the data register 30, and 'L' is output to the output A when the selected memory cell is in the HR state, at data latch timing of the data register 30. The output value is latched in the data register 30.

As described above, the sense amplifier 012 reads the resistance value information of the selected memory cell, by utilizing that the attenuation time of the voltage applied to the node C is different, according of the resistance value of the selected memory cell which is a read target. As a result, binary digital logic value corresponding to the resistance state of the memory cell is output to the output A. More specifically, the count value corresponding to the resistance value information is output to the output B by the resolution of the clock cycle.

In this configuration, comparison of the resistance value of each of the memory cells can be easily implemented with reference to the value of the output B. That is, the value of the output B correlates with the resistance value of the memory cell, is a numeric value which correlates with the resistance value of the memory cell, represents discharge time of the voltage between the both ends of the memory cell in terms of a physical amount, and is equivalent to the resistance value information of the memory cell. The output B is input to the write circuit 011 and to the logic control circuit 0101 and used in the processing flow of verify operation (see STEP 6 in first to fourth operation examples, STEP13 in third operation example, or STEP15 in fourth operation example).

The value of the input C and the hold value of the counter 134 are not limited to the values of FIG. 12. The value of the input C and the hold value of the counter 134 may be varied depending on the count clock frequency of the counter 134, the capacitance of the capacitor CC2, the set values of Vref1 and Vref2, the current amount (as will be described later) of a constant current source 140 and the state of SW4, non-uniformity of the resistance value of the memory cell, etc.

Next, a case where the range of the resistance value to be read is changed between the normal read mode and the special read mode will be exemplarily described.

As shown in FIG. 11, in the sense amplifier 012, the constant current source 140 is connected to the node C via the switch 4 (SW4). As the constant current source 140, there are many known configurations, including the use of a p-channel MOSFET, the use of a current mirror circuit, etc. In the present example, these known configurations may be suitably used.

SW4 is ON when the input E from the logic control circuit 010 is High and OFF when the input E from the logic control circuit 010 is Low. When SW4 is ON, a constant current is supplied to the node C. In this case, the above stated discharge time is longer. The difference in the discharge time will be described with reference to FIG. 13.

Figure 13:
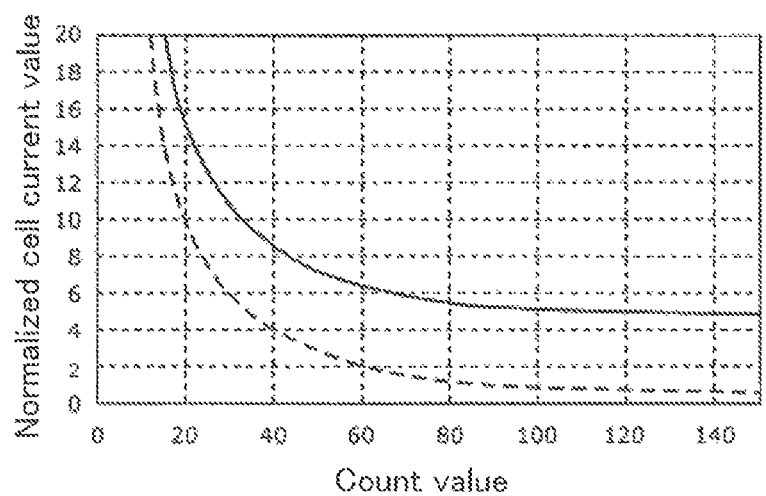
FIG. 13 is a graph showing a difference in discharge time in the non-volatile memory device according to Reference example 1 of Reference embodiment 1.

FIG. 13 is a graph showing the difference in discharge time in the non-volatile memory device according to Example 1 of Reference embodiment 1. In FIG. 13, a horizontal axis indicates the count value of the counter 134, and a vertical axis indicates a normalized cell current value. The normalized cell current value is the value of a DC current flowing when a specified voltage is applied to the memory cell, which is represented in a normalized form, and is a value corresponding to the inverse number of the resistance value of the memory cell. In other words, FIG. 13 indicates the correlation between the count value which is the resistance value information read by the sense amplifier 012 and an actual cell current amount.

This correlation is expressed as the function of cell current=$\alpha \times T^{\beta}$ (T=count value×clock cycle). In FIG. 13, a broken line indicates the characteristic in a case where SW4 is OFF, while a solid line indicates the characteristic in a case where SW4 is ON.

As can be seen from FIG. 13, in the characteristic indicated by the broken line, the range of about 10 to 1, of the cell current value, corresponds to the range of 20 to 100, of the count value. Also, in the characteristic indicated by the solid line, the range of about 15 to 5, of the cell current value, corresponds to the range of 20 to 100, of the count value.

As described above, whether the measurement range of the count value is a relatively low resistance value range or a relatively high resistance value range, can be selected using SW4. Specifically, when SW4 is turned ON, the characteristic indicated by the solid line is formed, which can correspond to a case where a cell current is relatively high, i.e., case where the resistance value of the memory cell is relatively small. This corresponds to the normal read mode (second read mode) for determining whether the resistance value is within the first resistance value range or the second resistance value range, in the case where the characteristic of the memory cell is that shown in FIG. 3.

On the other hand, when SW4 is turned OFF, the characteristic indicated by the broken line is formed, which can correspond to a case where a cell current is relatively low, i.e., case where the resistance value of the memory cell is relatively large. This corresponds to the special read mode (first read mode) for determining whether the resistance value is within the initial resistance value range or the first resistance value range, in the case where the characteristic of the memory cell is that shown in FIG. 3.

Note that the resolution of the read resistance value information can be adjusted, depending on the current amount of the constant current source 140, the frequency of the clock input to the counter 134, the magnitude of Vref1 and the magnitude of Vref2, the capacitance of the capacitor CC2, etc., as well as whether or not a current is supplied from the constant current source 140 (ON or OFF of SW4).

Specifically, the resolution of the read resistance value information can be increased when the frequency of the clock is increased.

The measurement range is shifted so that a larger resistance value can be read in a shorter time, by increasing the magnitude of Vref1 and the magnitude of Vref2, by reducing the current amount of the constant current source 140, by reducing the capacitance of the capacitor CC2, etc. Conversely, the measurement range is shifted so that a smaller resistance value can be read, by reducing the magnitude of Vref1 and the magnitude of Vref2, by increasing the current amount of the constant current source 140, by increasing the capacitance of the capacitor CC2, etc.

Vref1 corresponds to the read voltage applied to the memory cell. The resistance state is changed when Vref1 is set higher than a predetermined voltage. This must be taken into account when Vref1 is used to adjust the read range.

[First Exemplary Operation in Special Write Mode]

Hereinafter, the exemplary operation in the special write mode will be described using the variable resistance element of FIG. 3, as an example. It is supposed that the configuration of the non-volatile memory device is the configuration of Example 1, but a similar operation can be performed by using another device configuration.

The operation in the special write mode can be performed by using, for example, the row select circuit/driver 003, the column select circuit 004, the address register 009, the special/normal write circuit 011, the special/normal sense amplifier 012, the controller 013, the data register 030, the Cashe register 031, the special data register 032, and the switching circuit 037. These components are associated with each other to configure the data write circuit. The same applies to other exemplary operation.

Now, it is supposed as follows. When the electric signal with a voltage of +2.4V and a pulse width of 50 ns is applied to the second electrode 128 on the basis of the first electrode 124, the resistance value of the variable resistance element 120 changes from the LR level (second resistance value range) to the HR level (first resistance value range), while when the electric signal with a voltage of −2.4V and a pulse width of 50 ns is applied to the second electrode 128 on the basis of the first electrode 124, the resistance value of the variable resistance element 120 changes from the HR level to the LR level. In a case where the variable resistance element 120 is, for example, the bipolar variable resistance element, and has a characteristic in which the variable resistance element 120 reversibly changes between the HR state and the LR state by application of the electric signal of ±2.4V, for example, the electric stress with a voltage having an absolute value of 3V which is larger than 2.4V and with a pulse width of 1 μs, is applied to the variable resistance element 120. If the variable resistance element 120 does not change to the variable state even though this electric pulse is applied thereto, for example, the electric stress with a voltage which is increased by 0.1V in absolute value and with a pulse width which is five times larger, is newly applied to the variable resistance element 120. By repeating this processing, the electric stress is applied to the variable resistance element 120 for the cumulative application time required for each of the memory cells. Thus, the forming process step is completed.

Figure 14:
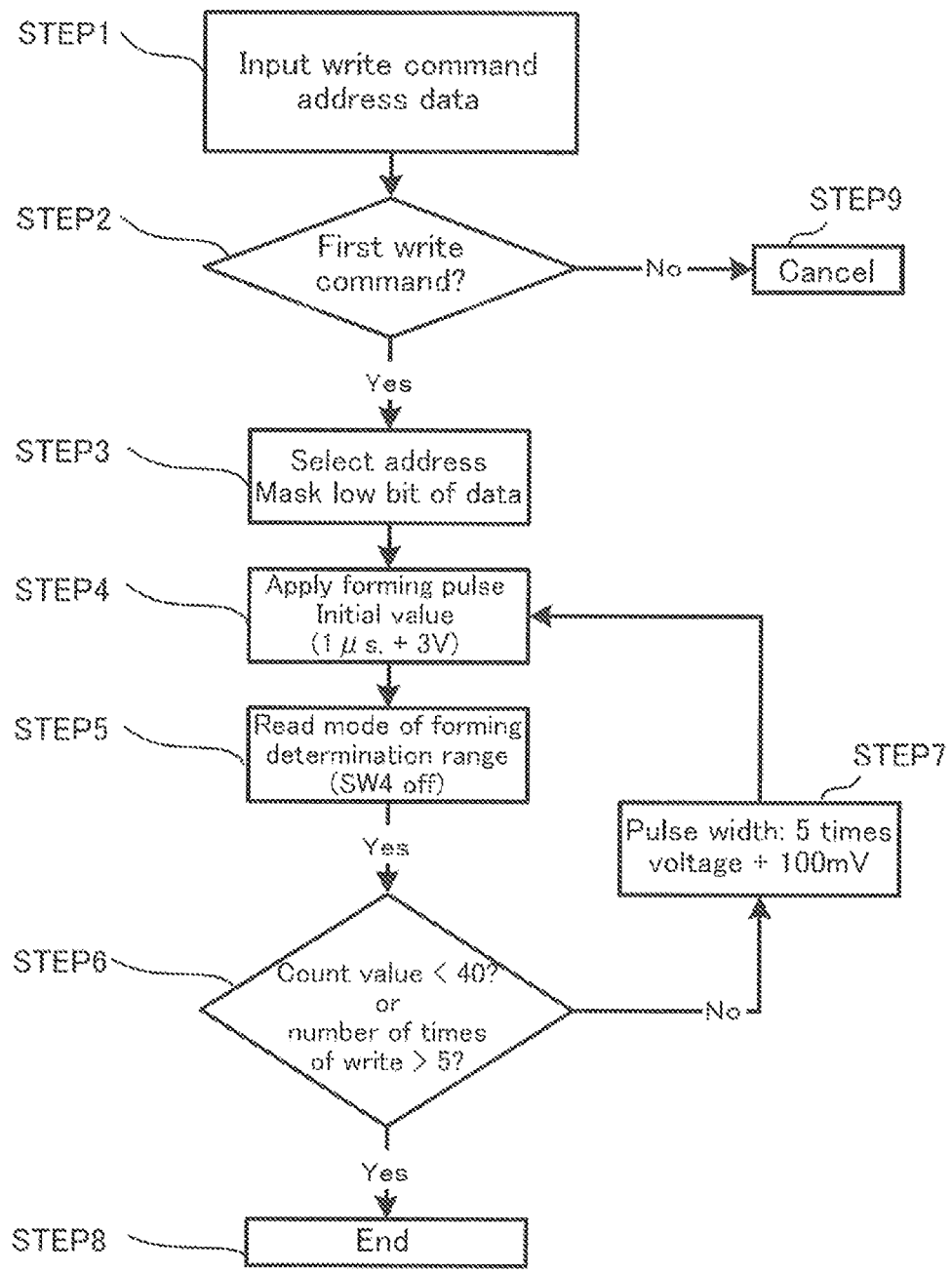
FIG. 14 is a flowchart showing the first exemplary operation of a special write mode of Reference embodiment 1.

FIG. 14 is a flowchart showing the first exemplary operation in the special write mode of Reference embodiment 1. In the example of FIG. 14, it is supposed that the input data is written to the memory cell 91, rather than an example in which the application of the electric stress is stopped and the random data is generated before all of the memory cells 91 change to the variable state as will be described later.

Firstly, the write command, the address to which the data is to be written, and the data to be written, are input from outside the non-volatile memory device 100 (STEP1).

Then, it is determined whether or not the write command input in STEP1 is the first write command (STEP2). If the result of the determination in STEP2 is NO, the processing is cancelled.

If the result of the determination in STEP2 is YES, the memory cell 91 corresponding to the address input in STEP1 is selected, and masking is performed to inhibit the electric stress from being applied to the memory cell (memory cell to which data "0" is to be written: memory cell should be maintained in the initial state) to which the data is to be written in Low logic, according to the input data (STEP 3).

Thereafter, the electric stress (forming pulse) is applied to the memory cell for which masking is not performed, of the selected memory cells, i.e., memory cell to which the data is to be written in High logic (memory cell to which data "1" is to be written: memory cell to be changed from the initial state to the variable state) (STEP 4). The initial value of the voltage of the applied electric stress is set to 3V, and the initial value of the pulse width of the applied electric stress is set to 1 μs.

Thereafter, the mode of the sense amplifier 012 is set to the read mode of the forming determination range (STEP 5). Specifically, SW4 of FIG. 11 is turned OFF and the measurement range is set to correspond to a high-resistance range.

Thereafter, it is determined whether or not the count value held in the counter 134 of the sense amplifier 012 is smaller than 40, and it is determined whether or not the number of times of application of the electric stress (forming pulse) exceeds five times (STEP 6). If one of the results of the determination in STEP6 is YES, the processing is terminated (End).

If the results of the determination in STEP6 are NO, the process returns to STEP S4, and the electric stress (forming pulse) with a voltage which is increased by 0.1V and with a pulse width which is five times larger, with respect to the electric stress (forming pulse) applied most recently, is applied to the variable resistance element 120. STEP4 to STEP 7 may be repeated until the memory cell to which the data is to be written in High logic is changed to the variable state. However, in the example of FIG. 14, the upper limit is set in the number of times of write, to prevent formation of an infinite loop in a case where the memory cell has a failure.

Although not shown, if a failure which exceeds the upper limit set in the number of times of write, occurs, an error log may be output and a proper processing may be performed. In a case where the above stated flow is executed in parallel with respect to a plurality of bits, the number of times of the application of the electric stress, which will result in YES of the result of the determination in STEP 6, is different for each bit. In that case, for the memory cell for which the result of the determination in STEP 6 is YES, masking is performed to inhibit the electric stress from being applied to the memory cell thereafter. At a time point when the results of the determination in STEP 6 are YES, for all of the memory cells subjected to parallel processing, the flow may be ended.

FIG. 15 is a table showing the exemplary result of reading of data in the special read mode from the memory cell to which the data is written in the special write mode of FIG. 14. FIG. 16 is a table showing the exemplary result of reading of data in the normal read mode from the memory cell to which the data is written in the special write mode of FIG. 14.

In the examples of FIGS. 15 and 16, the clock frequency, the read voltage, the determination voltage Vref2 and the determination time are set equal between the special read mode and the normal read mode, and SW4 of FIG. 11 is switched such that only the current amount of the constant current source 140 is made different between the special read mode and the normal read mode.

FIG. 15 shows the result of reading in the special read mode, from the memory cell after data expressed as 4 bits (16 numeric values expressed as 0 to F in a hexadecimal form) is written to the memory cell in the initial state. FIG. 16 shows the result of reading in the normal read mode, from the memory cell after the same data as that of FIG. 15 is written in the special write mode.

As the numeric values of the bits in the examples of FIGS. 15 and 16, the values held in the counter 134 of FIG. 11 are shown, without decoding into binary digital data. The terms in the hexadecimal form are results of determination that the value which is larger than 40 of the forming determination threshold is 0 and the value which is smaller than 40 of the forming determination threshold is 1. The maximum value of the counter 134 is 255, and a value larger than 255 is limited.

As shown in FIG. 15, in the case where the data is read from a memory cell group in the special read mode (read using the first threshold), all of the memory cells for which the forming is not completed indicate the maximum value of 255, and the memory cells for which the forming is completed indicate the values of 9 to 10. The terms in the hexadecimal form are identified as specified values of 0 to F.

By comparison, as shown in FIG. 16, in the case where the data is read from the same memory cell group in the normal read mode (read using the second threshold), reading of correct values cannot be performed, and a large part of data is zero. That is, the data is decoded as data which is completely different from the data originally written to the memory cell group (16 numeric values expressed as 0 to F in the hexadecimal form). The reason why the numeric values of the memory cells for which the forming is completed are significantly non-uniform is that the resistance values of the memory cells for which the forming is completed are significantly non-uniform unless some measures are taken, so that the memory cells in some cases change to the HR level or to the LR level. A should be understood from this, the data written using the special write command cannot be correctly decoded unless they are read using the special read command. In other words, by using the special write command and the special read command as the secret commands, the security of the data stored using the special write command can be improved.

Although in the above described example, the resistance value of the memory cell in the initial state is larger than the resistance value of the memory cell in the variable state, a similar operation can be performed by suitably changing the determination method, the polarity and voltage of the pulse applied, etc., even when the resistance value of the memory cell in the initial state is smaller than the resistance value of the memory cell in the variable state.

[Second Exemplary Operation in Special Write Mode]

Figure 17:
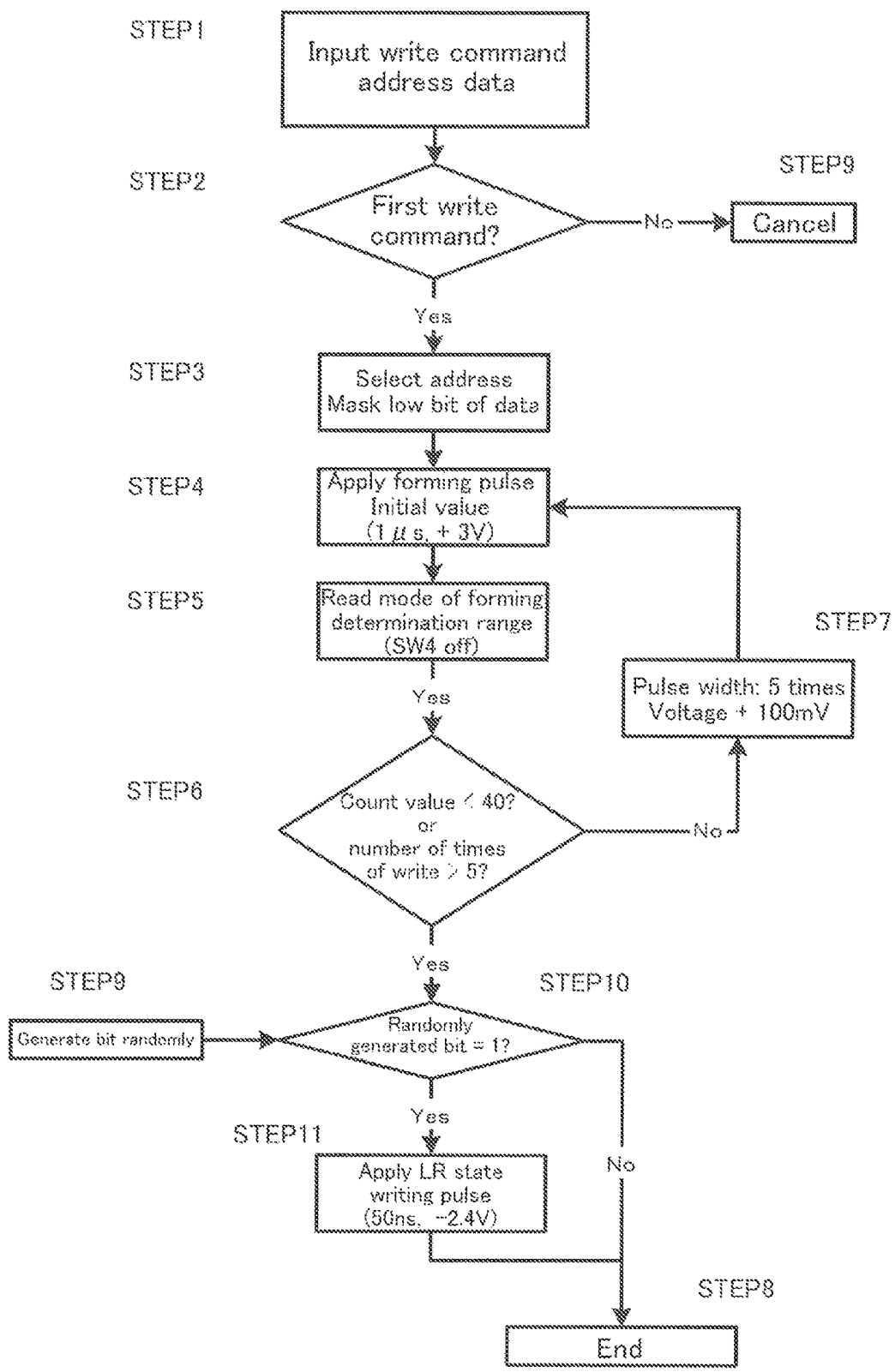
FIG. 17 is a flowchart showing the second exemplary operation of the special write mode of Reference embodiment 1.

FIG. 17 is a flowchart showing the second exemplary operation of the special write mode of Reference embodiment 1. In the second exemplary operation, in the special write mode, the resistance values of all of the memory cells which have changed from the initial state to the variable state are not retained in the HR level, but the resistance values of some of the memory cells are randomly set to the LR level. In this method, all of the resistance values of the memory cells which are read using the second read command, from the memory cells to which the data is written in the special write mode, are not zero, and thus it can look like some data is stored.

In the example of FIG. 17, the operation with the same STEP number as that of FIG. 4 (first exemplary operation) is the same as the operation of the first exemplary operation, and will not be described repeatedly.

Referring to FIG. 17, when the count value becomes smaller than 40 and the resistance value reaches the HR level, in STEP6, it is determined whether the random value generated in STEP9 is 0 or 1 (STEP10). When it is determined that the random value is 0, the process moves to STEP8 without any processing, and is terminated. When it is determined that the random value is 1, the LR state writing pulse (second electric signal) is applied to the memory cell to decrease the resistance value to the LR level (STEP11), and the process moves to STEP8, and is terminated.

With this operation, the resistance values of the memory cells which have changed to the variable state become LR level randomly. Therefore, even when these resistance values are read in the normal read mode, they are not recognized as a fixed data pattern in which all bits are 0, and thus the data can be kept secret with an improved level Depending on the input data, the memory cells to which the data "1" is written are very few in some cases. In that case, if STEP11 is performed, a risk of steal-reading of the secret data may be increased. In view of this, depending on the number of memory cells to which the data "1" is written, the processing of STEP11 may be limited.

Although in the above described example, the resistance value of the memory cell in the initial state is larger than the resistance value of the memory cell in the variable state, a similar operation can be performed by suitably changing the determination method, the polarity and voltage of the pulse applied, etc., even when the resistance value of the memory cell in the initial state is smaller than the resistance value of the memory cell in the variable state.

[Third Exemplary Operation in Special Write Mode]

Figure 18:
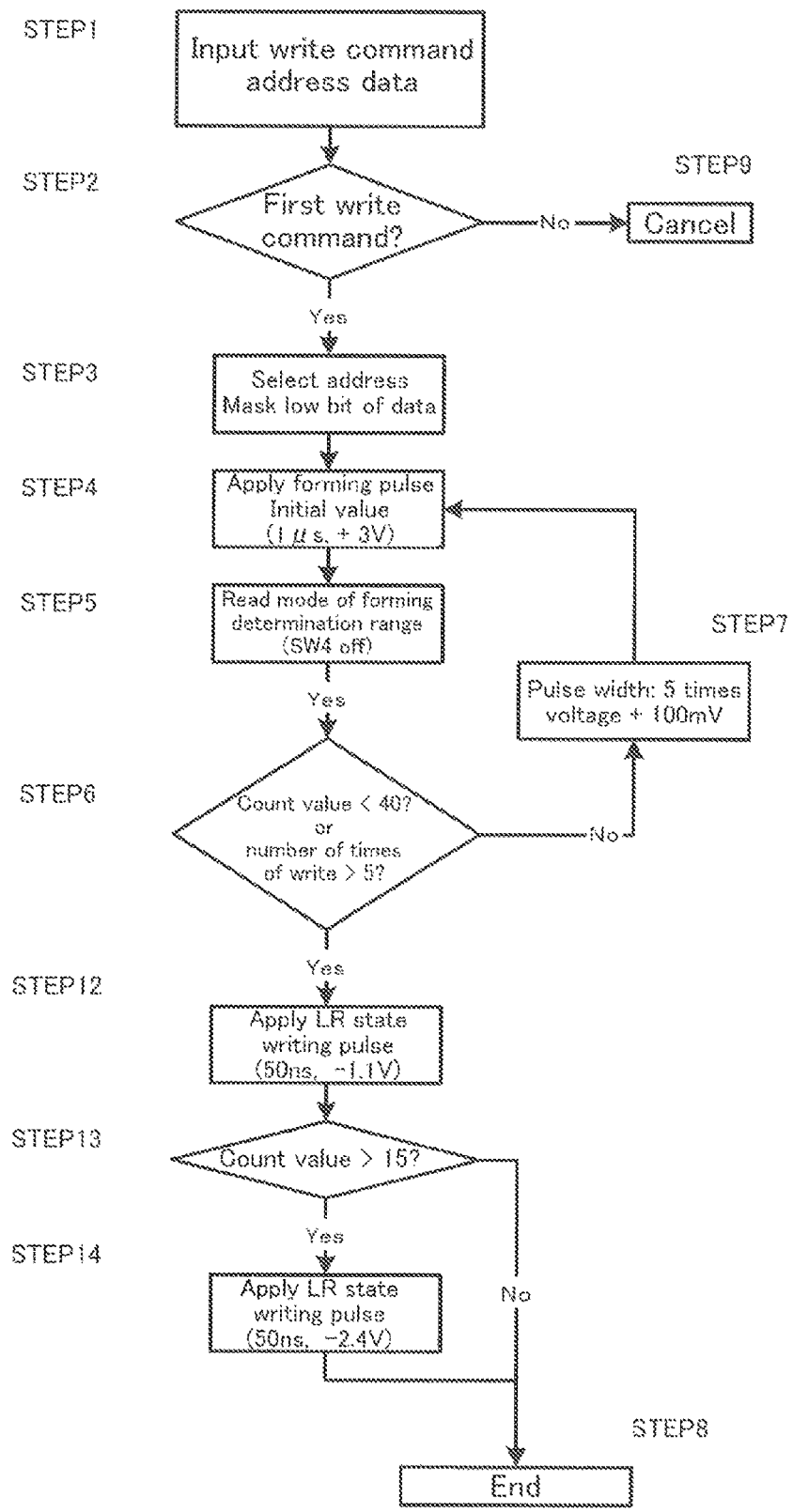
FIG. 18 is a flowchart showing the third exemplary operation of the special write mode of Reference embodiment 1.

FIG. 18 is a flowchart showing the third exemplary operation of the special write mode of Reference embodiment 1. In the third exemplary operation, the reliability of the write data can be improved.

In the example of FIG. 18, the operation with the same STEP number as that of FIG. 4 (first exemplary operation) are the same as the operation of the first exemplary operation, and will not be described repeatedly.

The electric stress (auxiliary stress) which is lower than the LR state writing pulse (e.g., absolute value of amplitude is smaller) and has the same polarity as that of the LR state writing pulse, is applied to the memory cell which is determined as having changed to the variable state in STEP6 of FIG. 18 (STEP12). Specifically, when the amplitude of the LR state writing pulse is −2.4V, the amplitude of the auxiliary stress may be set to almost half of −2.4V, i.e., −1.1V. The amplitude of the auxiliary stress may be decided in such a manner that the resistance change in the case where the voltage is increased gradually is measured as described with reference to FIG. 5, and the voltage at a stage which is just before the resistance change occurs, or an intermediate voltage at a stage in which slight resistance change occurs, is used as the auxiliary stress.

By applying the auxiliary stress, a state in which oxygen vacancy sites are more is formed in the variable resistance layer of the variable resistance element. In this state, a reduction reaction easily proceeds. In view of this, for example, in a case where the non-volatile memory device is left for a long period of time, a case where the resistance change occurs under a super-high temperature condition, etc., the directionality of the change can be preliminarily set so that the resistance is decreased easily, i.e., the resistance value is not within into the initial resistance value range unexpectedly.

In very rare cases, the application of the auxiliary stress may cause the memory cell which changes abnormally (resistance value becomes extremely large). In the third exemplary operation, the sense amplifier determines the resistance value again after STEP12 (STEP13). In this case, the threshold may be set smaller than that in STEP6, and may be a value which provides allowance with respect to the forming determination threshold of 40.

When it is determined that the abnormal change has occurred in STEP13, the LR state writing pulse is applied to the memory cell to forcibly change the resistance value to the LR level (STEP14). Since the memory cell which changes abnormally occurs randomly and very rarely, the secret data will not be read in the normal read mode even when the resistance value is set to the LR level.

The flow of FIG. 18 is merely exemplary and many modified examples may be designed. For example, before the flow is ended in STEP8, a flow may be added, in which the mode of the sense amplifier may be set to the read mode of the normal determination range to enable the determination using the second threshold of FIG. 3, the sense amplifier reads the data and verifies whether a bit number difference with the secret data is equal to or larger than a predetermined number, and the pulse of $V_H$ is applied to the memory cell having decreased to the LR level so that the memory cell is newly set to the HR level when the bit number difference is less than the predetermined number.

Although in the above described example, the resistance value of the memory cell in the initial state is larger than the resistance value of the memory cell in the variable state, a similar operation can be performed by suitably changing the determination method, the polarity and voltage of the pulse applied, etc., even when the resistance value of the memory cell in the initial state is smaller than the resistance value of the memory cell in the variable state.

[Fourth Exemplary Operation in Special Write Mode]

Figure 19:
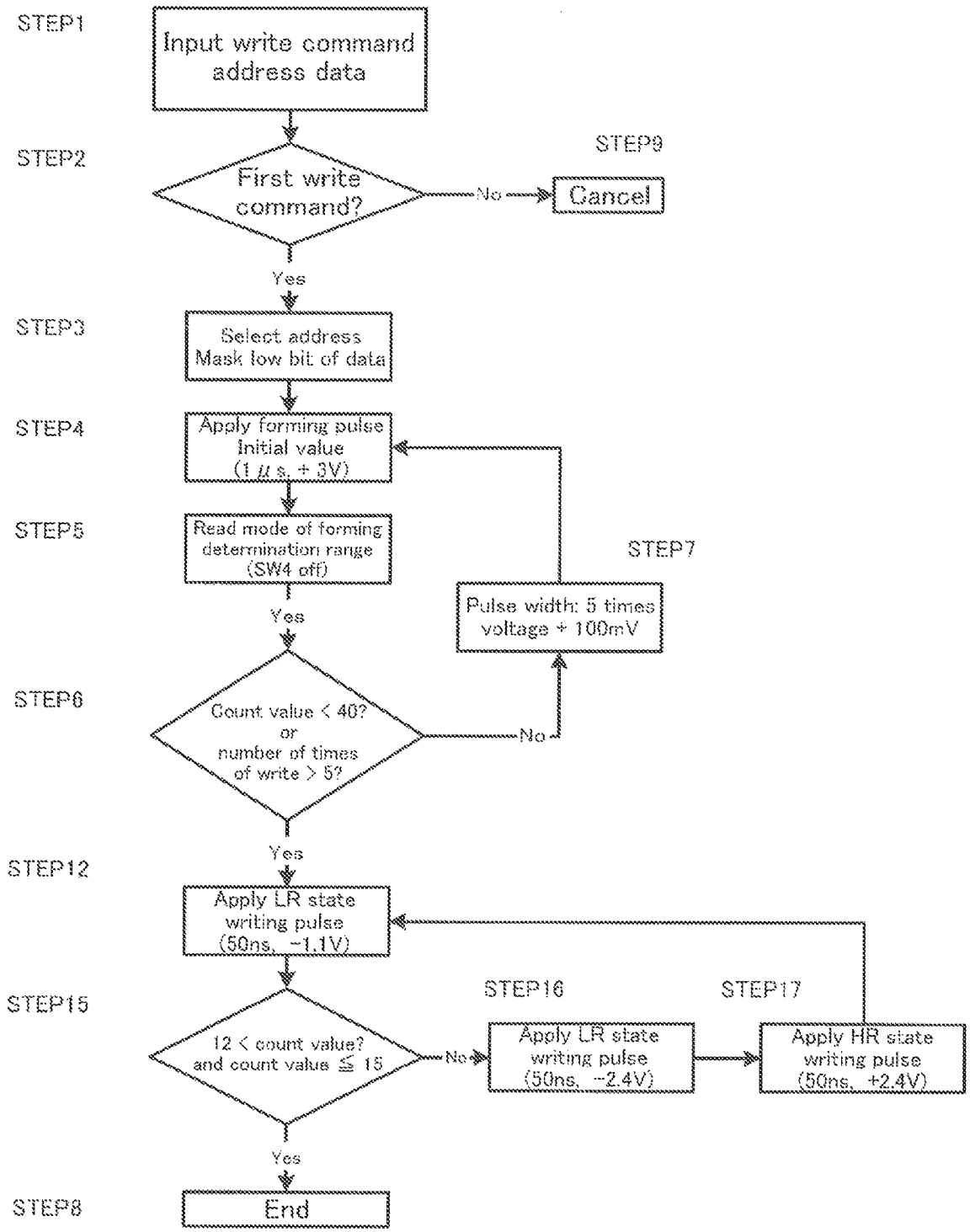
FIG. 19 is a flowchart showing the fourth exemplary operation of the special write mode of Reference embodiment 1.

FIG. 19 is a flowchart showing the fourth exemplary operation of the special write mode of Reference embodiment 1. In the fourth exemplary operation of FIG. 19, STEP13 and STEP14 of FIG. 18 are replaced by STEP15, STEP16, and STEP17, and the operation with the same STEP number as that of FIG. 18 (third exemplary operation) are the same as the operation of the third exemplary operation, and will not be described repeatedly.

After STEP12, it is determined that the resistance value of the memory cell is a desired HR level by the application of the auxiliary stress in STEP12 (STEP15). In other words, in STEP15, it is determined whether or not the count value is within the range of 12 to 15, in order to confirm that the resistance value is correctly set to the HR level, rather than the LR level and the initial resistance value range. If the result of the determination is NO, a negative pulse (LR state writing pulse) with a pulse width of 50 ns and an amplitude of −2.4V is applied to the memory cell to change the resistance value to the LR level (STEP16). After that, a positive pulse (HR state writing pulse) with a pulse width of 50 ns and an amplitude of +2.4V is applied to the memory cell to change the resistance value to the HR level (STEP17). Then, processing returns to STEP12.

Although not shown, error processing may be performed to prevent formation of an infinite loop in the flow of STEP12, STEP15, STEP16 and STEP17.

A method of storing the data on the basis of whether the memory cell is in the initial state or the variable state has an advantage that error detection of the data is less likely to take place. The reason is such that in many cases, there is a great difference between the resistance value of the memory cell in the initial state and the resistance value of the memory cell in the variable state.

The variable resistance element of the memory cell in the initial state has a characteristic which is equivalent to that of the insulator and is very stable against a degradation which progresses due to heat and over time. The memory cell which has changed once to the HR level corresponding to the initial resistance value range may change the resistance due to heat but gets close to the LR level, all the time, according to the fourth exemplary operation. Therefore, a detection window is not reduced, and the data can be retained with a very high reliability.

This is especially suitable for the retention of the data with high importance, which will result in serious damages if error occurs in read, such as key information of security, serial number information used for the authentication, etc.

Figure 20:
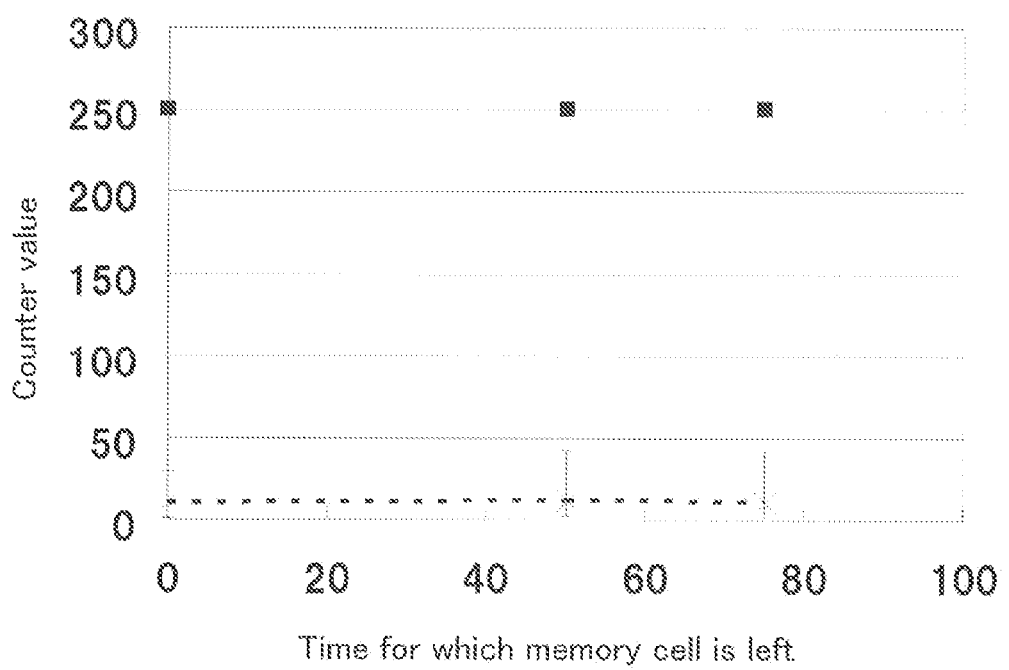
FIG. 20 is a graph showing shifting of a counter value in a state in which the memory cell in which the data is stored by using the fourth exemplary operation is left at 210 degrees C.

The data which is the basis for the above described effects is shown in FIG. 20. FIG. 20 is a graph showing shifting of a counter value in a state in which the memory cell in which the data is stored using the fourth exemplary operation is left at 210 degrees C. In the configuration of the element, the material of the first electrode 124 is TaN, the material of the second electrode 128 is Ir, the material of the variable resistance layer 126 is the tantalum oxides of the stacked-layer structure, the thickness of the variable resistance layer 126 is 50 nm, the area of the surface of the first electrode 124 and the surface of the variable resistance layer 126, which surfaces are in contact with each other, and the area of the surface of the second electrode 128 and the surface of the variable resistance layer 126, which surfaces are in contact with each other, are each equal to or smaller than 0.25 μm². The layer placed in contact with the first electrode 124, of the layers of the variable resistance layer 126, is the layer which is lower in oxygen concentration, and satisfies $0<x<2.5$ when its composition is expressed as $TaO_x$. On the other hand, the layer placed in contact with the second electrode 128, of the layers of the variable resistance layer 126, is the layer which is higher in oxygen concentration, satisfies $y≥2.1$ when its composition is expressed as $TaO_y$, and has a thickness of about 5.5 nm. As the select element for the variable resistance element, a memory cell (see the memory cell of FIG. 21) including a bidirectional diode is used. The forming stress has a voltage of +5.5V resulting from the addition of the ON-voltage of the diode, and a pulse width of 10 μSec or larger. The LR state writing pulse (pulse for changing the resistance value of the element from the first resistance value range to the second resistance value range: first electric signal) has a voltage of −4.5V and a pulse width of 50 nSec. The HR state writing pulse (pulse for changing the resistance value of the element from the second resistance value range to the first resistance value range: second electric signal) has a voltage of +4.5V and a pulse width of 50 nSec.

In FIG. 20, a horizontal axis indicates a passage time, and a vertical axis indicates a count value. The memory cell group in the initial state is indicated by a solid line and ■ points, while the memory cell group which has changed to the variable state is indicated by a broken line and X points. The count values of the memory cells in the initial state are uniform. The count values are all the upper limit 250 and constant. Regarding the memory cell group which has changed to the variable state, the maximum value and minimum value of each point are each indicated by a longitudinal bar. As can be seen from FIG. 20, a detection window is not substantially reduced, and the data can be stored with a very high reliability, even under a very high temperature of 210 degrees C. This stability can be attained as well under a low temperature.

Although in the above described example, the resistance value of the memory cell in the initial state is larger than the resistance value of the memory cell in the variable state, a similar operation can be performed by suitably changing the determination method, the polarity and voltage of the pulse applied, etc., even when the resistance value of the memory cell in the initial state is smaller than the resistance value of the memory cell in the variable state.

[Other Exemplary Operation in Special Write Mode]

For example, in a case where the normal read mode is widely published, and the special read mode is kept secret, as described above, a step of confirming that the data stored in the special write mode cannot be read in the normal read mode may be executed. Specifically, after the data is stored in the special write mode using the forming, the data (first data) may be read using the first threshold used in the special read mode, the data (second data) may be read using the second threshold used in the normal read mode, and additional write may be performed to prevent a situation in which the data read in the special read mode and the data read in the normal read mode are similar to or coincide with each other.

In a case where the initial resistance value range is larger than the plurality of changeable resistance value ranges, after executing the step of applying the forming stress, the step of comparing the first data read using a first threshold which is equal to or smaller than the lower limit of the initial resistance value range and is equal to or larger than the upper limit of one of the plurality of changeable resistance value ranges, corresponding to a largest resistance value, to the second data read using a second threshold which is equal to or smaller than the lower limit of one of the plurality of changeable resistance value ranges, corresponding to the largest resistance value and is equal to or larger than the upper limit of one of the plurality of changeable resistance value ranges, corresponding to a smallest resistance value, and the step of additionally applying the electric signal to the memory cells in the changeable resistance value range which is smaller than the second threshold, when the number of the memory cells which are different in resistance value between the first data and the second data is smaller than a predetermined number (e.g., equal to or larger than at least the half of the memory cells to which the data is to be written such that the resistance values is within the resistance value range which is smaller than the first threshold). The electric signal additionally applied is, for example, the first electric signal (HR state writing pulse) for shifting the memory cell in the changeable resistance value range which is smaller than the second threshold into the changeable resistance value range which is larger than the second threshold. However, this pulse is not limited to the first electric signal (HR state writing pulse). As the electric signal applied to the memory cell in the changeable resistance value range which is smaller than the second threshold such that the resistance value converges in the changeable resistance value range which is larger than the second threshold, a combination of the first electric signal and the second electric signal, or a combination of these electric signals and the auxiliary stress which is smaller in absolute value of voltage than the second electric signal, may be used. In that case, the pulse applied finally in the write flow is the first electric signal or the auxiliary stress.

Or, in a case where the initial resistance value range is smaller than the plurality of changeable resistance value ranges, after executing the step of applying the forming stress, the step of comparing the first data read using a first threshold which is equal to or larger than the upper limit of the initial resistance value range and is equal to or smaller than the lower limit of one of the plurality of changeable resistance value ranges, corresponding to a smallest resistance value, to the second data read using a second threshold which is equal to or larger than the upper limit of one of the plurality of changeable resistance value ranges, corresponding to the smallest resistance value and is equal to or smaller than the lower limit of one of the plurality of changeable resistance value ranges, corresponding to a largest resistance value, and the step of additionally applying the electric signal to the memory cells in the changeable resistance value range which is larger than the second threshold, when the number of the memory cells which are different in resistance value between the first data and the second data is smaller than a predetermined number (e.g., equal to or larger than at least the half of the memory cells to which the data is to be written such that the resistance values are within the resistance value range which is larger than the first threshold). The electric signal additionally applied is, for example, the second electric signal (LR state writing pulse) for shifting the memory cell in the changeable resistance value range which is larger than the second threshold into the changeable resistance value range which is smaller than the second threshold. However, this pulse is not limited to the second electric signal (LR state writing pulse). As the electric signal applied to the memory cell in the changeable resistance value range which is larger than the second threshold such that the resistance value converges in the changeable resistance value range which is smaller than the second threshold, a combination of the first electric signal and the second electric signal, or a combination of these electric signals and the auxiliary stress which is smaller in absolute value of voltage than the first electric signal, may be used. In that case, the pulse applied finally in the write flow is the second electric signal or the auxiliary stress.

Example 2

Figure 21:
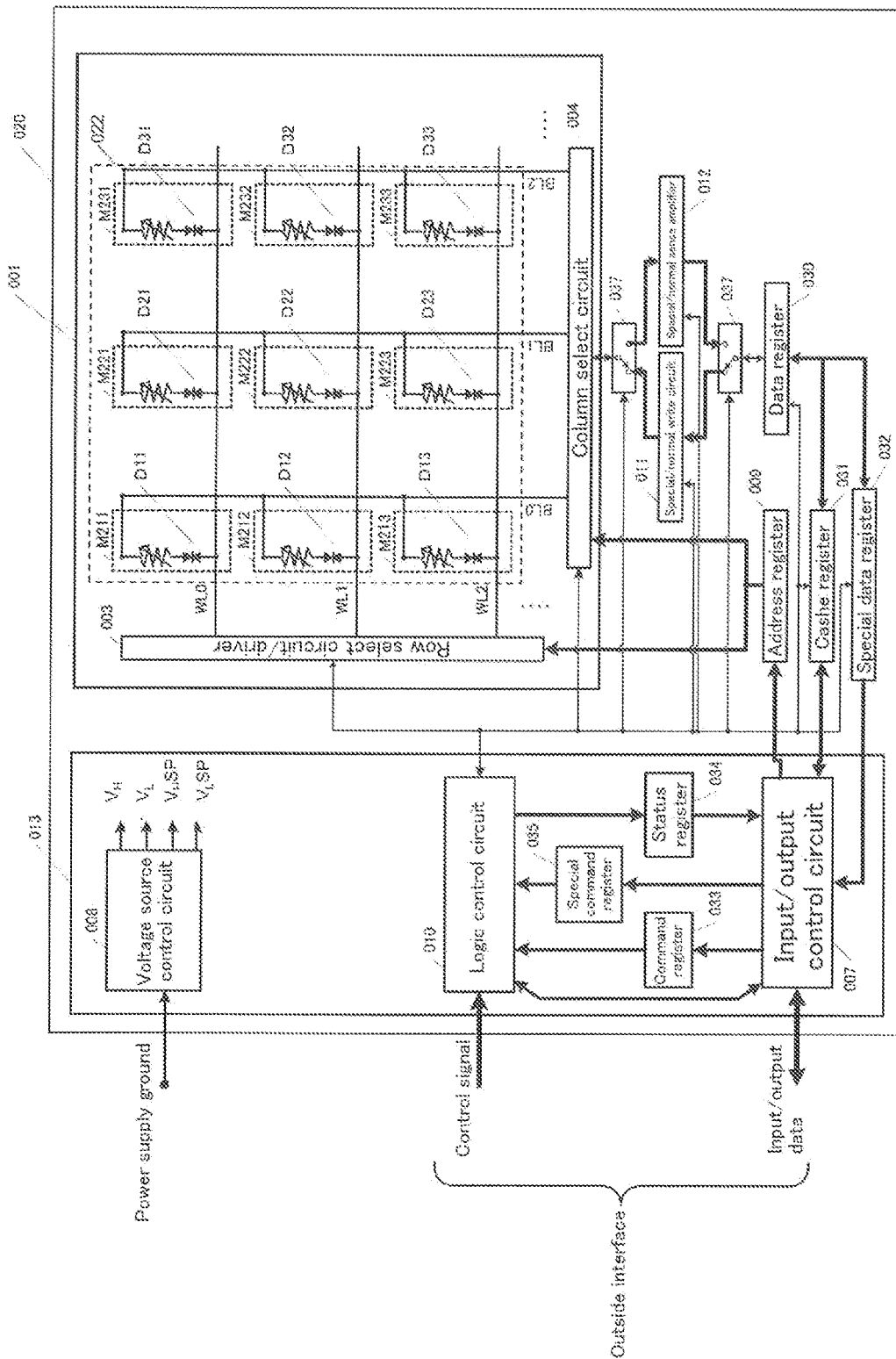
FIG. 21 is a block diagram showing the exemplary schematic configuration of a non-volatile memory device according to Reference example 2 of Reference embodiment 1.

FIG. 21 is a block diagram showing the exemplary schematic configuration of a non-volatile memory device according to Example 2 of Reference embodiment 1. Example 2 may be identical in configuration to Example 1 except the memory cell array. In FIG. 21, the same components as those of FIG. 9 are identified by the same reference symbols and names, and will not be described in detail, repeatedly.

In a memory cell array 022 of Example 2, the elements used to select the memory cells are two-terminal selecting elements instead of the transistors. With this change, the plate lines of Example 1 are omitted.

As the two terminal elements D11 to D33, non-linear elements such as diodes may be used. A semiconductor memory device including the memory cells M211 to M233 including the two-terminal selecting elements such that the memory cells M211 to M233 area arranged in array is referred to as a cross-point memory array. The cross-point memory array is a well-known art in a fuse memory, etc., and will not be described in detail.

Whether each of the memory cells M211 to M233 is in a continuity state or in a non-continuity state is switched depending on a voltage level between the both ends of the cell. For example, by application of a pulse with a voltage level of a sum of the ON-voltage of the two-terminal selecting element and the re-write voltage of the variable resistance element 120, the resistance state of the variable resistance element 120 changes. Also, by application of a pulse with a voltage level of a sum of the ON-voltage of the two-terminal selecting element and a read voltage which is smaller in magnitude than the re-write voltage of the variable resistance element 120, and detection of a current value at this time, the resistance state of the variable resistance element 120 is determined.

As the two-terminal selecting element used in the example of FIG. 21, the characteristic of FIG. 12, in which a current flows in one direction (forward direction) is well-known in general.

Figure 22:
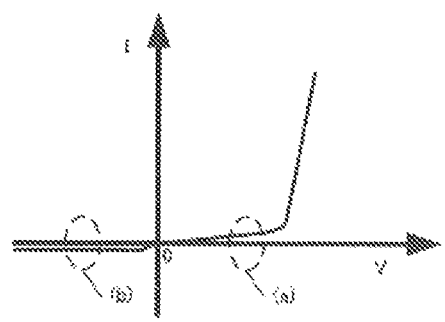
FIG. 22 is a view showing the exemplary voltage-current characteristic of a two-terminal selecting element used in Reference example 2 of Reference embodiment 1.

FIG. 22 is a view showing the exemplary voltage-current characteristic of the two-terminal selecting element used in Example 2 of Reference embodiment 1. In FIG. 22, a horizontal axis indicates a voltage and a vertical axis indicates a current. For example, regarding a general diode element which is commercially available, a minute current of about 100 μA to 1 mA flows under 0.2V, in the range of the forward bias as indicated by a broken line (a), although this is well-known and is not described in detail. On the other hand, in reverse bias, a current is almost constant and as small as about 10 nA to 1 μA until a break voltage is reached, as indicated by the broken line (b). Of course, the absolute amount of the current is varied depending on the size of the diode element, but the trends of the voltage-current characteristic in the forward bias and in the reverse bias are similar to each other. In the example of FIG. 21, by setting the electric potential difference between unselected word lines and unselected bit lines to an equipotential, or to the reverse bias, almost no current flows through the unselected memory cells which are other than the selected memory cell, so that only the selected memory cell becomes a write or read target. The two-terminal selecting element having the diode characteristic of FIG. 22, may be incorporated into, for example, a non-volatile memory device including the unipolar variable resistance element.

Figure 23:
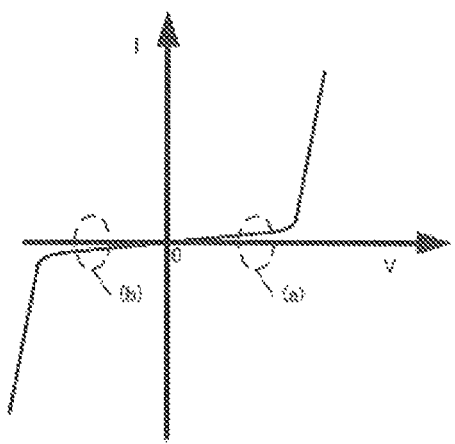
FIG. 23 is a view showing the exemplary voltage-current characteristic of a two-terminal selecting element used in Reference example 2 of Reference embodiment 1.

FIG. 23 is a view showing the exemplary voltage-current characteristic of the two-terminal selecting element used in Example 2 of Reference embodiment 1. In FIG. 23, a horizontal axis indicates a voltage and a vertical axis indicates a current. FIG. 23 shows the characteristic of a current limiting element (also referred to as bidirectional diode) which can flow a current bidirectionally. The structure and characteristic of the current limiting element are also well-known and will not be descried in detail. There are many known methods as the specific control method of selecting a particular memory cell using this current limiting element. In the present example, these known methods may be suitably used.

In the present example, the writing method and the reading method may be the same as those of Example 1, except that the voltage applied between the both ends of the memory cell is set to a voltage level which is equal to or larger than the voltage level of a sum of the ON-voltage of the two-terminal selecting element and the voltage applied to the variable resistance element 120. Example 2 may be modified as in Example 1.

Embodiment 1

According to Embodiment 1 of the present disclosure, there is provided an authentication system comprising: a host computer; and a non-volatile memory that includes a memory cell array including a plurality of memory cells, the plurality of memory cells including: a memory cell in a variable state, in which a resistance value reversibly changes between a plurality of changeable resistance value ranges in accordance with an electric signal applied; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data including first authentication data is stored on the basis of whether each of the plurality of memory cells is in the initial state or the variable state, wherein at least one of the host computer and the non-volatile memory stores second authentication data, and wherein at least one of the host computer and the non-volatile memory is operative to perform authentication on the basis of the first authentication data and the second authentication data.

According to Embodiment 1 of the present disclosure, there is provided an authentication method performed by using a host computer and a non-volatile memory, the plurality of memory cells including: a memory cell in a variable state, in which a resistance value reversibly changes between a plurality of changeable resistance value ranges in accordance with an electric signal applied thereto; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data including first authentication data is stored on the basis of whether each of the plurality of memory cells is in the initial state or the variable state, the authentification method comprising the steps of: (B) storing second authentication data in at least one of the host computer and the non-volatile memory, and (C) performing authentication on the basis of the first authentication data and the second authentication data.

In this configuration, it becomes possible to provide a safer authentication technique which employs a novel data storing method which is not provided in a prior art, in the non-volatile memory device.

The "non-volatile memory" may be a chip, a component, etc. The non-volatile memory may be configured as a non-volatile memory device including a write circuit and others (the same applies to the followings).

The phrase "data including first authentication data is stored on the basis of whether each of the plurality of memory cells is in the initial state or the variable state,"" means that the first authentication data is stored on the basis of whether each of the memory cells is in the initial state or the variable state (the same applies to the following description). The phrase "data including first authentication data is stored on the basis of whether each of the plurality of memory cells is in the initial state or the variable state," includes a case where only a portion of the data is stored on the basis of whether each of the memory cells is in the initial state or the variable state (the same applies to the above reference embodiments and the following description). The phrase "data including first authentication data is stored on the basis of whether each of the plurality of memory cells is in the initial state or the variable state," includes a case where only a portion of the first authentication data is stored on the basis of whether each of the memory cells is in the initial state or the variable state (the same applies to the following description).

In a case where the first authentication data includes two kinds of authentication data which are united together, one of the two kinds of authentication data may be stored as only the first-kind data rather than the second-kind data, while the other of the two kinds of authentication data may be stored as only the second-kind data rather than the first-kind data. For example, in a case where the first authentication data is authentication data (e.g., ID data) which is varied from customer to customer, and authentication data (e.g., non-reusable authentication data) which is generated, used and discarded for each transmission/reception such that these data are united together, the authentication data (e.g., ID data) which is varied from customer to customer, may be stored as only the first-kind data rather than the second-kind data, and the authentication data (e.g., non-reusable authentication data) which is generated, used and discarded for each transmission/reception may be stored as only the second-kind data rather than the first-kind data.

The phrase "at least one of the host computer and the non-volatile memory stores second authentication data" includes a case where the host computer contains the second authentication data, a case where the non-volatile memory contains the second authentication data, and a case where both of the host computer and the non-volatile memory contain the second authentication data. The phrase "stores second authentication data" includes a case where the second authentication data is temporarily retained" (the same applies to the followings). The term "temporarily retained" includes a case where the second authentication data is stored in a register, a volatile memory, etc. For example, a case where the host computer downloads the second authentication data via Internet and sends the second authentication data to the non-volatile memory is included in a case where the host computer temporarily retains the second authentication data.

The phrase "at least one of the host computer and the non-volatile memory is operative to perform authentication" includes a case where the host computer performs the authentication, the non-volatile memory performs the authentication, and a case where both of the host computer and the non-volatile memory perform the authentication (the same applies to the followings).

The term "authentication" means that the validity of a target is confirmed. The target exists outside an entity which performs the authentication, and the validity is confirmed when a degree of match (consistency) between information owned by the entity and information obtained from the target satisfies a specified condition.

In the above authentication system or the above authentication method, the changeable resistance value ranges may include a high-resistance value range and a low-resistance value range.

In the above authentication system or the above authentication method, the stored data may include: first-kind data stored on the basis of whether or not the resistance value of each of the plurality memory cells is within the initial resistance value range; and second-kind data stored without utilizing whether or not the resistance value of each of the plurality of memory cells is within the initial resistance value range and on the basis of whether or not the resistance value of each of the plurality of memory cells is within at least one of the changeable resistance value ranges, and the first authentication data may include first-kind authentication data stored as the first-kind data, and second-kind authentication data stored as the second-kind data.

[Device Configuration]

Figure 24:
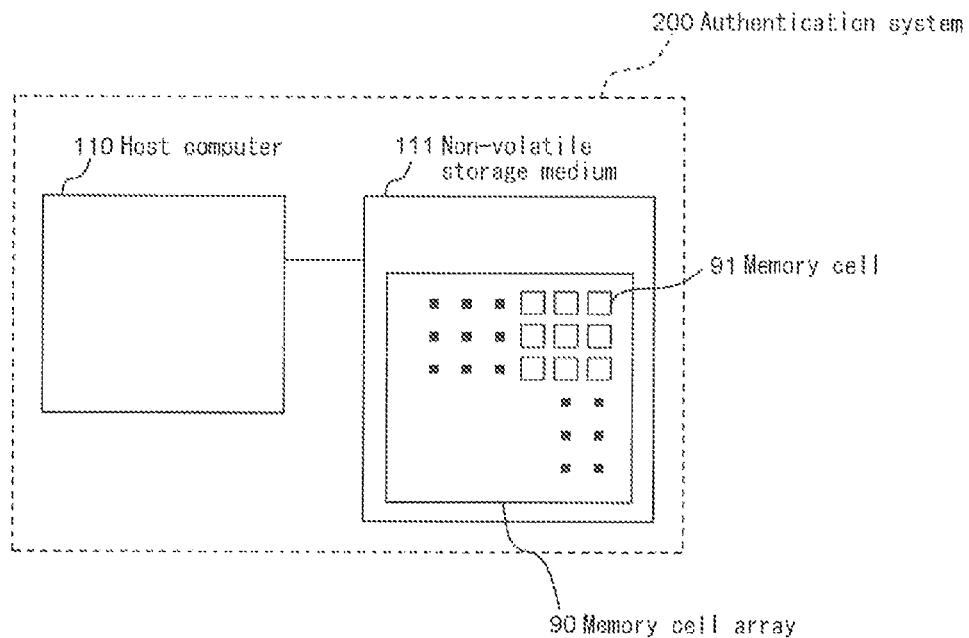
FIG. 24 is a block diagram showing the exemplary schematic configuration of an authentication system according to Embodiment 1.

FIG. 24 is a block diagram showing the exemplary schematic configuration of an authentication system according to Embodiment 1. Hereinafter, the authentication system 200 according to Embodiment 1 will be described with reference to the drawings. The terms described in reference embodiments are used to indicate the same meaning in the present embodiment (the same applies to other embodiments).

As exemplarily shown in FIG. 24, the authentication system 200 of the present embodiment includes a host computer 110 and a non-volatile memory 111.

The non-volatile memory 111 includes the memory cell array 90. The non-volatile memory 111 may be operative to store content data or the like used in the host computer 110, store information (information used for the authentication) for managing the use of the content data on another medium containing the content data, or store both of the content data and the information.

The configuration of the memory cell array 90 may be the same as that of Reference embodiment 1, except that the first-kind data is stored on the basis of whether or not the resistance value of each of the memory cells is within the initial resistance value range, and will not be described in detail repeatedly.

The non-volatile memory 111 may include a write circuit, a read circuit, a control circuit, etc., in addition to the memory cell array 90.

The host computer 110 may be, for example, a computer which uses the content data or the like stored in media including the non-volatile memory 111. Specifically, for example, the host computer 110 may be a medium reproduction device such as DVD, a personal computer connected to Internet, a portable terminal, a processor unit built-in electric appliance, a microcontroller, etc.

The first authentication data may be plaintext data or ciphertext data. In a case where the first authentication data is the ciphertext data, for example, a common key cryptosystem or a public key cryptosystem may be used.

At least one of the host computer 110 and the non-volatile memory 111 may contain second authentication data. The second authentication data may be the plaintext data or the ciphertext data. In a case where the second authentication data is the ciphertext data, for example, the common key cryptosystem or the public key cryptosystem may be used.

At least one of the host computer 110 and the non-volatile memory 111 is operative to perform the authentication on the basis of the first-authentication data and the second authentication data. In a case where the first authentication data is the ciphertext data, the authentication may be performed on the basis of decrypted first authentication data. Or, in a case where the second authentication data is the ciphertext data, the authentication may be performed on the basis of decrypted second authentication data.

For example, the authentication may be performed in such a manner that it is determined whether or not the host computer 110 is proper from the perspective of the non-volatile memory 111, or it is determined whether or not the non-volatile memory 111 is proper from the perspective of the host computer 110. Or, the authentication may be performed in such a manner that it is determined whether or not the medium which is directly or indirectly connected to the host computer 110 is proper, from the perspective of the host computer 110. In a case where the medium is indirectly connected to the host computer 110, another device may intervene between the host computer 110 and the medium. Another device may be, for example, another host computer. Or, the authentication may be performed in such a manner that it is determined whether or not the content data preserved on Internet is proper, from the perspective of the host computer 110. It may be determined whether or not the content data preserved on Internet is proper, based on whether or not the condition in which the content data is associated with the non-volatile memory 111 is satisfied.

A specific authentication method is not particularly limited. Specifically, for example, when a degree of match (consistency) between the first authentication data and the second authentication data satisfies a preset condition, it is considered that the authentication is succeeded in. Or, for example, only when there is a perfect degree of match between the first authentication data and the second authentication data, it is considered that the authentication is succeeded in.

Embodiment 1 may be modified as in the reference embodiments.

[Authentication Method]

Figure 25:
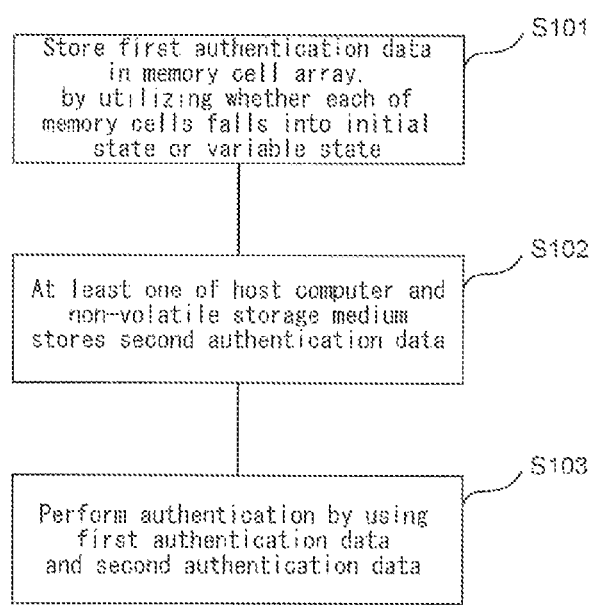
FIG. 25 is a flowchart showing an exemplary authentication method of Embodiment 1.

FIG. 25 is a flowchart showing an exemplary authentication method (hereinafter, "authentication method" includes the operation method of the authentication system, the operation method of the host computer, and the operation method of the non-volatile memory) of Embodiment 1.

Initially, the first authentication data is stored in the memory cell array 90, on the basis of whether each of the memory cells 91 is in the initial state or the variable state (step S101: corresponding to step A).

Then, at least one of the host computer 110 and the non-volatile memory 111 stores the second authentication data (step S102: corresponding to step B).

Finally, the authentication is performed on the basis of the first authentication data and the second authentication data (step S103: corresponding to step C). The entity which performs the authentication may be the host computer 110, the non-volatile memory 111, or both of the host computer 110 and the non-volatile memory 111.

Either one of Step S101 and Step S102 may be performed first, or both of Step S101 and Step S102 may be performed at the same time. Step S101 (step A) may be performed preliminarily. In this case, Step S101 (step A) is not an essential step in the authentication method (the same applies to other embodiments).

Embodiment 2

An authentication system of Embodiment 2 is the authentication system of Embodiment 1, in which the non-volatile memory may further include an authentication control circuit operative to perform the authentication by verifying the first authentication data obtained from the memory cell array and the second authentication data obtained from the host computer.

In this configuration, it becomes possible to provide a safer authentication technique which employs a novel data storing method which is not provided in a prior art, in the non-volatile memory device.

In the above authentication system, the host computer may be operative to output the second authentication data encrypted with a public key to the authentication control circuit, and the authentication control circuit may be operative to obtain the encrypted second authentication data from the host computer, decrypt the encrypted second authentication data with a secret key corresponding to the public key to obtain decrypted second authentication data, and perform the authentication by verifying the first authentication data obtained from the memory cell array and the decrypted second authentication data.

In the authentication system, the authentication control circuit may be operative to store third authentication data, output the third authentication data to the host computer, obtain the second authentication data encrypted with a public key, from the host computer, obtain the third authentication data encrypted with the public key, from the host computer, decrypt the encrypted second authentication data to obtain decrypted second authentication data with a secret key corresponding to the public key, decrypt the encrypted third authentication data to obtain decrypted third authentication data with the secret key, and perform the authentication by verifying the decrypted third authentication data and the third authentication data stored therein, and verifying the first authentication data and the decrypted second authentication data.

"The authentication control circuit may store third authentication data" may mean that the authentication control circuit itself may store the third authentication data, or another circuit, the memory cell array and others may store the third authentication data. The term "store" includes a case where data is temporarily retained (the same applies to the following description). The third authentication data may be stored in the memory cell array or the like as a fixed value, or may be generated and stored in each authentication operation (the same applies to the following description).

In the above authentication system, the data may further include the secret key. For example, the above data may include key information used for decrypting the encrypted authentication data, and the key information may include the secret key.

In the above authentication system, the authentication control circuit may be operative to permit the host computer to access a content memory device only when a degree of match between the first authentication data and the second authentication data satisfies a preset condition.

The content memory device may be provided inside or outside the non-volatile memory. In other words, the content memory device may or may not be a part of the non-volatile memory (the same applies to the following description).

The term "permit" includes the fact that the cipher control circuit changes a state in which the host computer cannot access the content memory device even when there is a command from the host computer, into a state in which the host computer can access the content memory device in response to a command from the host computer, when the command is provided. The term "access" may be to, for example, perform reading the data or writing the data, or perform both of reading the data and writing the data. Also, the term "access" may include a case where the host computer changes from a state in which the host computer does not access the content memory device even when there is a command from the user, to a state in which the host computer starts to access the content memory device in response to a command from the user, when the command is provided. In other words, the term "permit" includes a case where self-regulation of the host computer is terminated (the same applies to the following description). For example, the host computer may terminate the self-regulation of the access to the content memory device, in response to a command from the cipher control circuit. The cipher control circuit may permit the host computer to access to all of the memory cells in the content memory device or give a stepwise permission to the host computer such that a part of the areas is limited in access, depending on plural kinds of the authentication.

In the above authentication system, the host computer may be operative to obtain the second authentication data from outside the host computer.

"Outside the host computer" may be, for example, Dongle, a data server on Internet, etc. (the same applies to the following description).

A non-volatile memory of Embodiment 2 comprises a memory cell array including a plurality of memory cells, and an authentication control circuit operative to communicate with the host computer, the plurality of memory cells including: a memory cell in a variable state, in which a resistance value reversibly changes between a plurality of changeable resistance value ranges in accordance with an electric signal applied; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data including first authentication data is stored on the basis of whether each of the plurality of memory cells is in the initial state or the variable state, wherein the data includes first authentication data, and wherein the authentication control circuit is operative to perform authentication by verifying the first authentication data obtained from the memory cell array and the second authentication data obtained from the host computer.

In the above non-volatile memory, the authentication control circuit may obtain the second authentication data as the second authentication data encrypted with a public key, decrypt the encrypted second authentication data to obtain the decrypted second authentication data, and perform the authentication by verifying the first authentication data obtained from the memory cell array and the decrypted second authentication data.

In the above non-volatile memory, the authentication control circuit may store third authentication data, output the third authentication data to the host computer, obtain the second authentication data encrypted with a public key and the third authentication data encrypted with the public key, from the host computer, decrypt the encrypted second authentication data and the encrypted third authentication data to obtain the decrypted second authentication data and the decrypted third authentication data, respectively, and perform the authentication by verifying the decrypted third authentication data and the stored third authentication data, and by verifying the first authentication data and the decrypted second authentication data.

In the above non-volatile memory, the data may include a secret key. For example, the above data may include key information used for decrypting the encrypted authentication data, and the key information may include the secret key.

In the above non-volatile memory, the authentication control circuit may be operative to permit the host computer to access the content memory device only when a degree of match between the first authentication data and the second authentication data satisfies a preset condition.

In the above non-volatile memory, the host computer may be operative to obtain the second authentication data from outside the host computer.

An authentication method of Embodiment 2 is the authentication method of Embodiment 1, in which the step B is the step of storing the second authentication data in the host computer, and the step C is the step of performing the authentication, with the non-volatile memory, by verifying the first authentication data obtained from the memory cell array and the second authentication data obtained from the host computer.

In the above authentication method, the step B may be the step of storing in the host computer, the second authentication data as the second authentication data encrypted with a public key, and the step C may be the step of obtaining, with the non-volatile memory, the encrypted second authentication data from the host computer, and decrypting, with the non-volatile memory, the encrypted second authentication data to obtain the encrypted second authentication data, and then performing the authentication, with the non-volatile memory, by verifying the first authentication data obtained from the memory cell array and the decrypted second authentication data.

In the above authentication method, the step C may be the step of storing in the non-volatile memory, the third authentication data and outputting the third authentication data from the non-volatile memory to the host computer, then obtaining, with the non-volatile memory, the second authentication data encrypted with a public key and the third authentication data encrypted with the public key, from the host computer, then decrypting, with the non-volatile memory, the encrypted second authentication data and the encrypted third authentication data to obtain the decrypted second authentication data and the decrypted third authentication data, respectively, and then performing the authentication, with the non-volatile memory, by verifying the decrypted third authentication data and the stored third authentication data, and verifying the first authentication data and the decrypted second authentication data.

In the above authentication method, a secret key may be stored in the memory cell array, on the basis of whether each of the memory cells is in the initial state or the variable state.

The above authentication method may further comprise the step E of permitting the host computer to access the content memory device, only when a degree of match between the first authentication data and the second authentication data satisfies a preset condition.

In the above authentication method, the step B may be the step of obtaining, with the host computer, the second authentication data from outside the host computer and storing the second authentication data in the host computer.

[Device Configuration]

Figure 26:
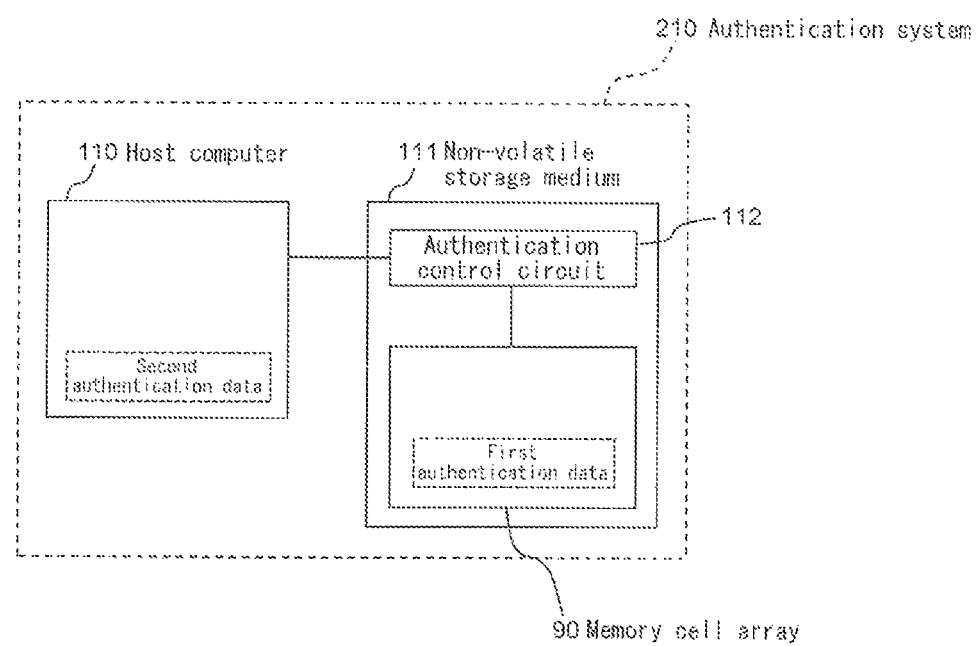
FIG. 26 is a block diagram showing the exemplary schematic configuration of an authentication system according to Embodiment 2.

FIG. 26 is a block diagram showing the exemplary schematic configuration of an authentication system according to Embodiment 2.

As exemplarily shown in FIG. 26, the authentication system 210 of the present embodiment includes the host computer 110 and the non-volatile memory 111. The non-volatile memory 111 includes the authentication control circuit 112 and the memory cell array 90. The configuration of the memory cell array 90 may be the same as that of Embodiment 1, and will not be described in detail repeatedly.

The authentication control circuit 112 is operative to communicate with the host computer 110. The host computer 110 contains the second authentication data. The authentication control circuit 112 is operative to perform the authentication by verifying the first authentication data obtained from the memory cell array 90 and the second authentication data obtained from the host computer 110.

It is sufficient that the authentication control circuit 112 has a control function. The authentication control circuit 112 includes a processor (not shown), and a storage section (not shown) for storing control programs and temporarily storing data of computation. Examples of the processor are MPU and CPU. Example of the storage section is a memory. The authentication control circuit 112 may be constituted by a single control circuit which performs centralized control and a plurality of control circuits which perform distributed control cooperatively with each other. The "circuit" may be a unit as a component, a chip, or a functional unit including the CPU and a memory (the same applies to the reference embodiments).

The host computer 110 may obtain the second authentication data from outside the host computer 110. In this case, the host computer 110 may temporarily hold the second authentication data in a data latch, or the like. The host computer 110 may store the second authentication data as the plaintext data or the ciphertext data.

Embodiment 2 may be modified as in the reference embodiments and Embodiment 1.

(Authentication Method)

The authentication method of Embodiment 2 may be identical to that of Embodiment 1 except that of the steps of FIG. 25, step S102 is the step of storing the second authentication data in the host computer 110, and the step S103 is the step of performing the authentication, with the non-volatile memory 111, by verifying the first authentication data obtained from the memory cell array 90 and the second authentication data obtained from the host computer 110.

Modified Example 1

In Modified example 1, the encryption and decryption of the second authentication data are performed by employing the public key cryptosystem.

The host computer 110 contains the second authentication data encrypted with a public key. The host computer 110 may output the second authentication data encrypted with the public key, to the authentication control circuit 112.

Alternatively, the host computer 110 may contain the second authentication data of the plaintext, and encrypt this second authentication data with the public key to obtain the encrypted second authentication data. In this case, the host computer 110 may temporarily hold the encrypted second authentication data.

The authentication control circuit 112 obtains the encrypted second authentication data from the host computer 110. In addition, the authentication control circuit 112 decrypts the encrypted second authentication data to obtain decrypted second authentication data. Further, the authentication control circuit 112 performs the authentication by verifying the first authentication data obtained from the memory cell array 90 and the decrypted second authentication data.

The secret key required to decrypt the encrypted second authentication data may be stored in the memory cell array 90 on the basis of whether each of the memory cells 90 is in the initial state or the variable state.

Except for the above, the authentication system, the host computer and the non-volatile memory of Modified example 1 may be identical in device configuration to those of Embodiment 2 (FIG. 26). Therefore, the same components are identified by the same reference symbols and names, and will not be described in detail repeatedly.

Figure 27:
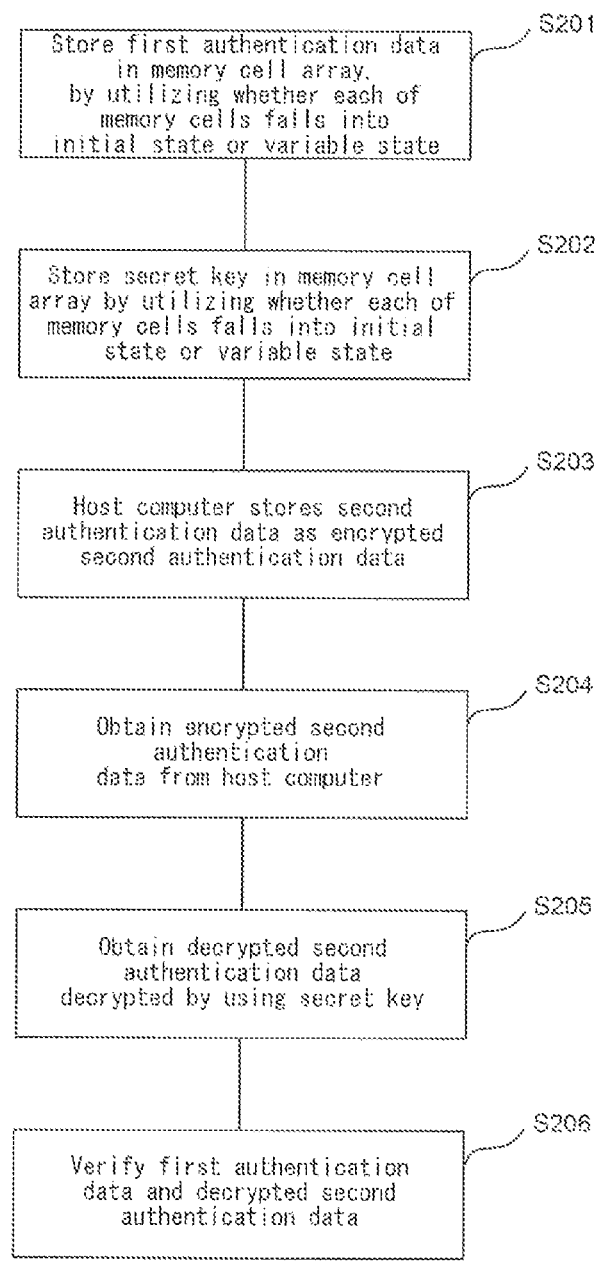
FIG. 27 is a flowchart showing an exemplary authentication method of Modified example 1 of Embodiment 2.

FIG. 27 is a flowchart showing an exemplary authentication method of Modified example 1 of Embodiment 2.

Initially, the first authentication data is stored in the memory cell array 90, on the basis of whether each of the memory cells 91 is in the initial state or the variable state (step S201: corresponding to step A).

Then, the secret key is stored in the memory cell array 90 on the basis of whether each of the memory cells 91 is in the initial state or the variable state (step S202: corresponding to step D).

Then, the host computer 110 stores the second authentication data as the second authentication data encrypted with a public key (step S203: corresponding to step B).

Then, the non-volatile memory 111 obtains the second authentication data encrypted with the public key, from the host computer 110 (step S204).

Then, the non-volatile memory 111 decrypts the encrypted second authentication data, with the secret key stored in the memory cell array 90, to obtain the decrypted second authentication data (step S205).

Finally, the non-volatile memory 111 performs the authentication by verifying the first authentication data stored in the memory cell array 90 and the decrypted second authentication data which is obtained in step S205 (step S206).

The operations of step S204 to step S206 correspond to step S103 of FIG. 25.

Either one of Step S201 and Step S202 may be performed first, or both of Step S201 and Step S202 may be performed at the same time. Step S202 may be performed preliminarily. In this case, Step S201 (step D) is not an essential step in the authentication method of Modified example 1.

The present modified example may be modified as in the reference embodiments and Embodiment 1.

In accordance with the present modified example, since the authentication is performed by using the public key cryptosystem, only a person who owns a secret key which is different in key data from the public key can decrypt the data encrypted with the public key. In other words, the host computer 110 can be authenticated in such a manner that only the non-volatile memory 111 which owns the secret key decrypts with the secret key the data encrypted with the host computer 110, with the public key. In a case where the secret key and the first authentication data which are used in the authentication are stored as a combination of the first-kind data and the second-kind data, the secret key and the first authentication data cannot be read easily. This makes it possible to reduce a risk of a leakage of the secret key and the first authentication data due to unauthorized reading.

(Modified Example 2)

In Modified example 2, the authentication control circuit sends the third authentication data to the host computer, and the host computer encrypts the third authentication data and sends back the encrypted third authentication data to the authentication control circuit. This can improve the accuracy of the authentication.

The authentication control circuit 112 stores the third authentication data and outputs the third authentication data to the host computer 110.

The specific content of the third authentication data is not particularly limited. For example, the third authentication data may be the random number, the serial number unique to each content, the hash value obtained from the content data, etc.

The hash value is unique data of a constant digit number, which is obtained by inputting data of an arbitrary digit number to a function called a hash function. Original data cannot be extracted from an output hash value. However, the output hash value significantly changes even when a very small part of the original data is changed. By making the use of the hash value, it can be easily examined whether or not the original data has been altered dishonestly. Examples of the hash value are SHA (Secure Hash Algorithm) in American Standard, PIPEMD (RACE Integrity Primitives Evaluation Message Digest) in European, etc.

The third authentication data may be stored in, for example, the memory cell array 90 or may be generated for each authentication operation. In a case where the third authentication data is newly generated, the generated third authentication data may be temporarily held by the authentication control circuit 112.

The host computer 110 encrypts the third authentication data with the public key. The host computer 110 outputs to the authentication control circuit 112 the second authentication data encrypted with the public key and the third authentication data encrypted with the public key. The second authentication data may be encrypted preliminarily or encrypted concurrently with the encryption of the third authentication data.

The authentication control circuit 112 obtains the second authentication data encrypted with the public key and the third authentication data encrypted with the public key, from the host computer 110. In addition, the authentication control circuit 112 decrypts the encrypted second authentication data and the encrypted third authentication data, with the secret key, thereby obtaining the decrypted second authentication data and the decrypted third authentication data, respectively. Further, the authentication control circuit 112 performs the authentication by verifying the decrypted third authentication data and the stored third authentication data and by verifying the first authentication data and the decrypted second authentication data.

A specific authentication method is not particularly limited. Specifically, for example, when a degree of match between the decrypted authentication data and the stored third authentication data satisfies a preset condition, and a degree of match between the first authentication data and the second authentication data satisfies a preset condition, it is considered that the authentication is succeeded in. Or, for example, only when there is a perfect degree of match between the decrypted third authentication data and the stored third authentication data, and there is a perfect match between the first authentication data and the second authentication data, it is considered that the authentication is succeeded in.

The secret key required to decrypt the encrypted second authentication data may be stored in the memory cell array 90 on the basis of whether each of the memory cells 91 is in the initial state or the variable state.

Except for the above, the authentication system, the host computer and the non-volatile memory of Modified example 2 may be identical in device configuration to those of Embodiment 2 (FIG. 26). Therefore, the same components are identified by the same reference symbols and names, and will not be described in detail repeatedly.

Figure 28:
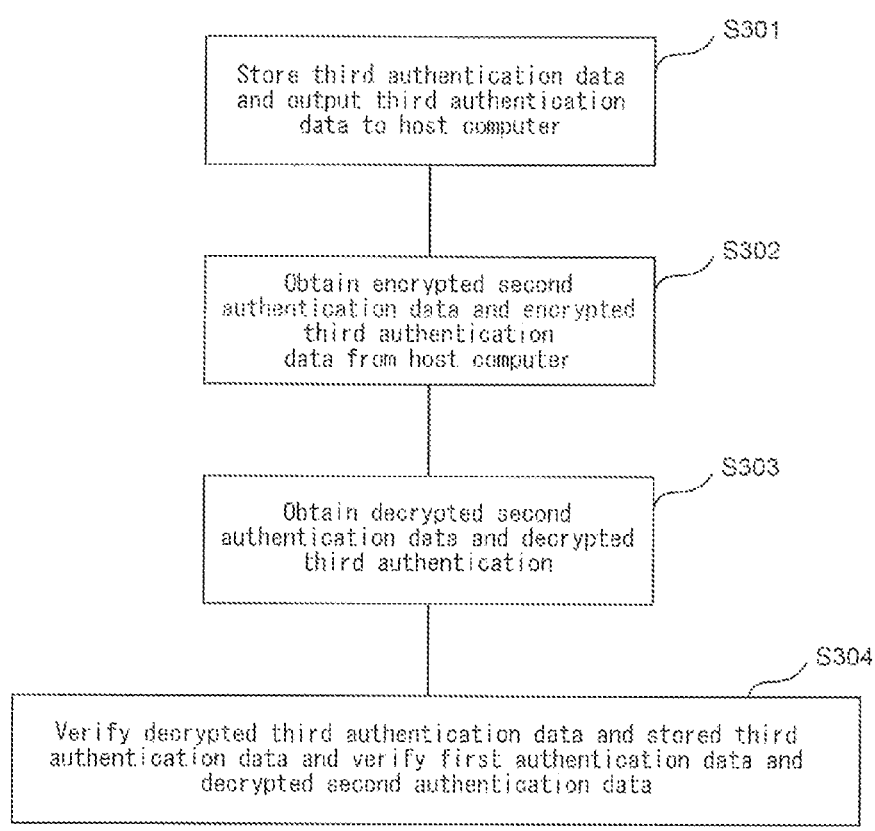
FIG. 28 is a flowchart showing an exemplary authentication method of Modified example 2 of Embodiment 2.

FIG. 28 is a flowchart showing an exemplary authentication method of Modified example 2 of Embodiment 2.

The authentication method of Modified example 2 may be identical to that of Embodiment 2 except for the authentication step (corresponding to step S103 of FIG. 25). Therefore, in FIG. 28, only the authentication step is illustrated. For example, the authentication step of Modified example 2 is performed according to the following procedure.

Initially, the authentication control circuit 112 stores the third authentication data and outputs the third authentication data to the host computer 110 (step S301).

Then, the authentication control circuit 112 obtains the second authentication data encrypted with the public key and the third authentication data encrypted with the public key, from the host computer 110 (step S302).

Then, the authentication control circuit 112 decrypts the encrypted second authentication data and the encrypted third authentication data, with the secret key, thereby obtaining the decrypted second authentication data and the decrypted third authentication data, respectively (step S303).

Further, the authentication control circuit 112 verifies the decrypted third authentication data obtained in step S303 and the third authentication data stored in step S301. Concurrently with this, the authentication control circuit 112 verifies the first authentication data stored in the memory cell array 90 and the decrypted second authentication data obtained in step S303. With this operation, the authentication control circuit 112 performs the authentication (step S304).

The present modified example may be modified as in the reference embodiments and Embodiment 1.

In accordance with the present modified example, it becomes possible to reduce a possibility of spoofing at the host computer 110 side. In addition, since the third authentication data is varied from authentication to authentication, it becomes possible to more effectively reduce a possibility of spoofing at the host computer 110 side.

Modified Example 3

In Modified example 3, the authentication control circuit is operative to communicate with a content memory device, and permits the host computer to access the content memory device based on a result of the authentication.

Figure 29:
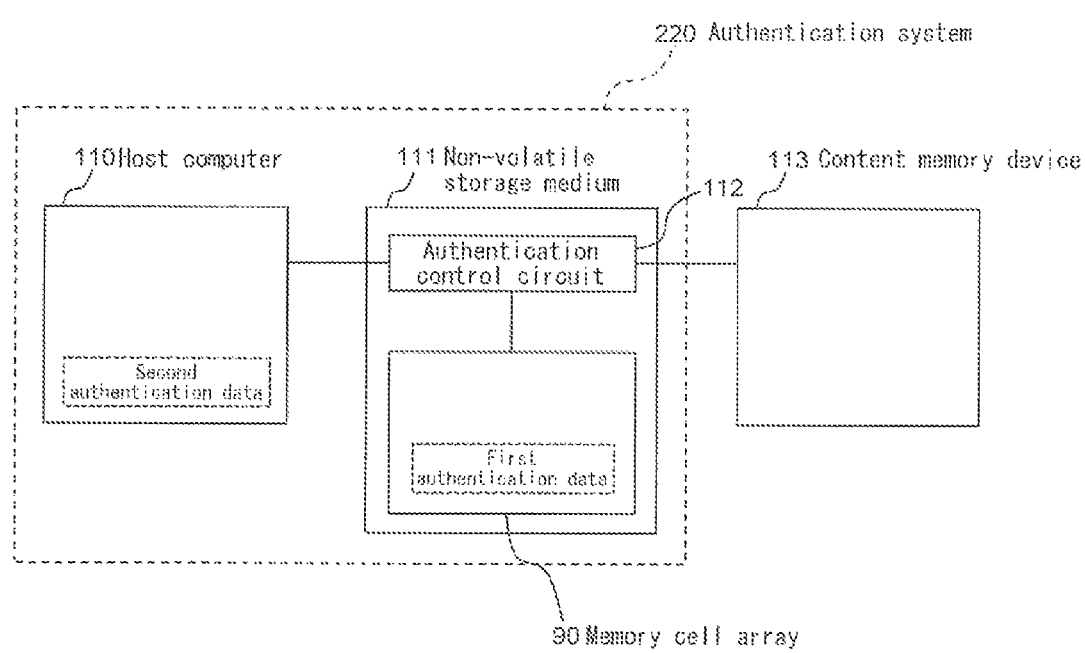
FIG. 29 is a block diagram showing the exemplary schematic configuration of an authentication system according to Modified example 3 of Embodiment 2.

FIG. 29 is a block diagram showing the exemplary schematic configuration of an authentication system according to Modified example 3 of Embodiment 2.

As exemplarily shown in FIG. 29, the authentication control circuit 112 is operative to communicate with a content memory device 113. The authentication control circuit 112 permits the host computer 110 to access the content memory device 113, only when a degree of match between the first authentication data and the second authentication data satisfies a preset condition.

The content memory device 113 may contain the content data used by the host computer 110. Specifically, for example, the content memory device 113 may include at least one selected from the group consisting of a hard disc, CD, DVD, BD, a flash memory, FeRAM, MRAM, PCRAM, and ReRAM.

Although in the example of FIG. 29, the content memory device 113 is provided outside the authentication system 220, it may be provided inside the authentication system 220. In other words, the content memory device 113 may be or not may be a part of the authentication system 220.

Although in the example of FIG. 29, the content memory device 113 is provided outside the non-volatile memory 111, it may be provided inside non-volatile memory 111. In other words, the content memory device 113 may be or not may be a part of the non-volatile memory 111.

The content memory device 113 may be a data server on Internet or a data memory device on cloud.

The phrase "a degree of match between the first authentication data and the second authentication data satisfies a preset condition" means, for example, a case where there is a match between the first authentication data and the second authentication data except for bit of a predetermined number (e.g., 1). Or, for example, the phrase "a degree of match between the first authentication data and the second authentication data satisfies a preset condition" means a case where there is a perfect match between the first authentication data and the second authentication data.

Except for the above, the authentication system, the host computer and the non-volatile memory of Modified example 3 may be identical in device configuration to those of Embodiment 2 (FIG. 26). Therefore, the same components are identified by the same reference symbols and names, and will not be described in detail repeatedly.

Figure 30:
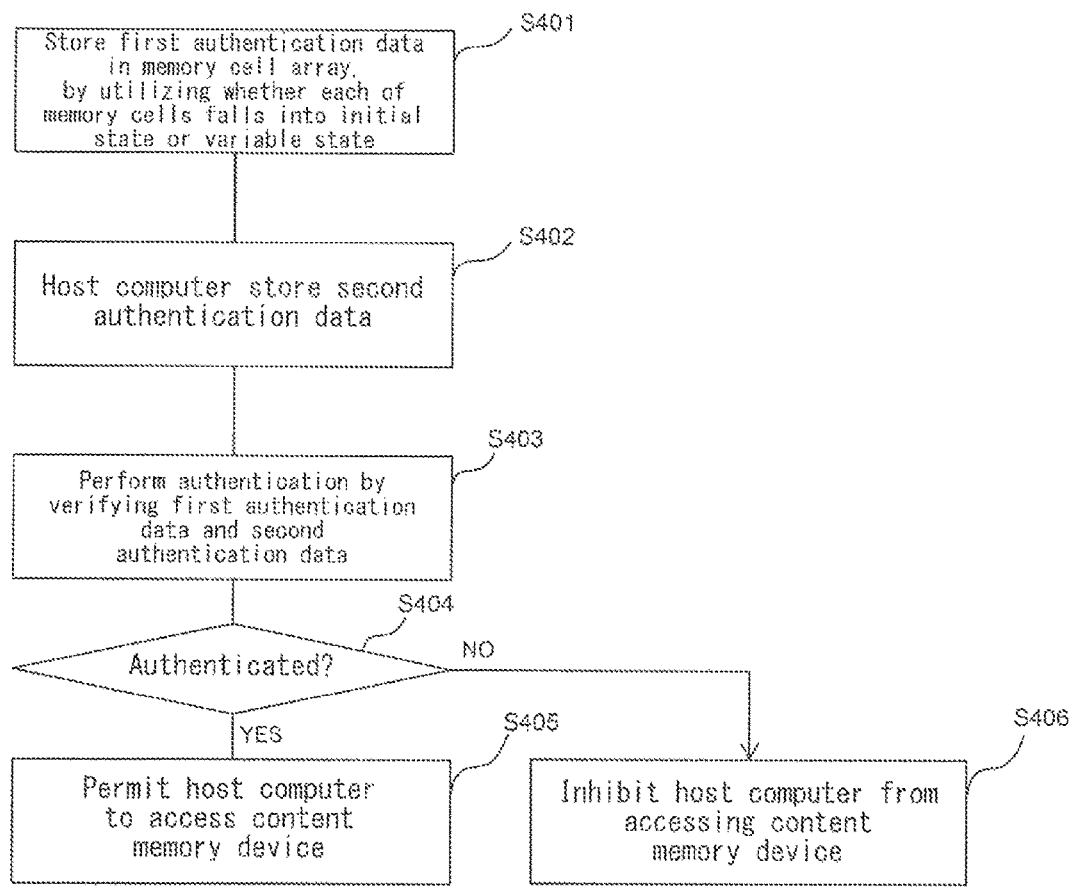
FIG. 30 is a flowchart showing an exemplary authentication method of Modified example 3 of Embodiment 2.

FIG. 30 is a flowchart showing an exemplary authentication method of Modified example 3 of Embodiment 2.

Initially, the first authentication data is stored in the memory cell array 90, on the basis of whether each of the memory cells 91 is in the initial state or the variable state (step S401: corresponding to step A).

Then, the host computer 110 stores the second authentication data (step S402: corresponding to step B).

Then, the authentication control circuit 112 obtains the second authentication data from the host computer 110, and verifies this second authentication data and the first authentication data stored in the memory cell array 90, to determine whether or not a degree of match between the first authentication data and the second authentication data satisfies a preset condition (step S403 to S404: corresponding to step C).

When the authentication is succeeded in (YES in step S404), the authentication control circuit 112 permits the host computer 110 to access the content memory device 113 (step S205: corresponding to step E).

When the authentication has been failed in (rejected) (NO in step S404), the authentication control circuit 112 does not permit the host computer 110 to access the content memory device 113 (step S406). If the host computer 110 is not permitted to access the content memory device 113 in the initial state, step S406 may be omitted.

Either one of Step S401 and Step S402 may be performed first, or both of Step S401 and Step S402 may be performed at the same time.

The present modified example may be modified as in the reference embodiments and Embodiment 1.

Example 1

Example 1 is a combination of Modified example 1, Modified example 2 and Modified example 3 of Embodiment 2.

Figure 31:
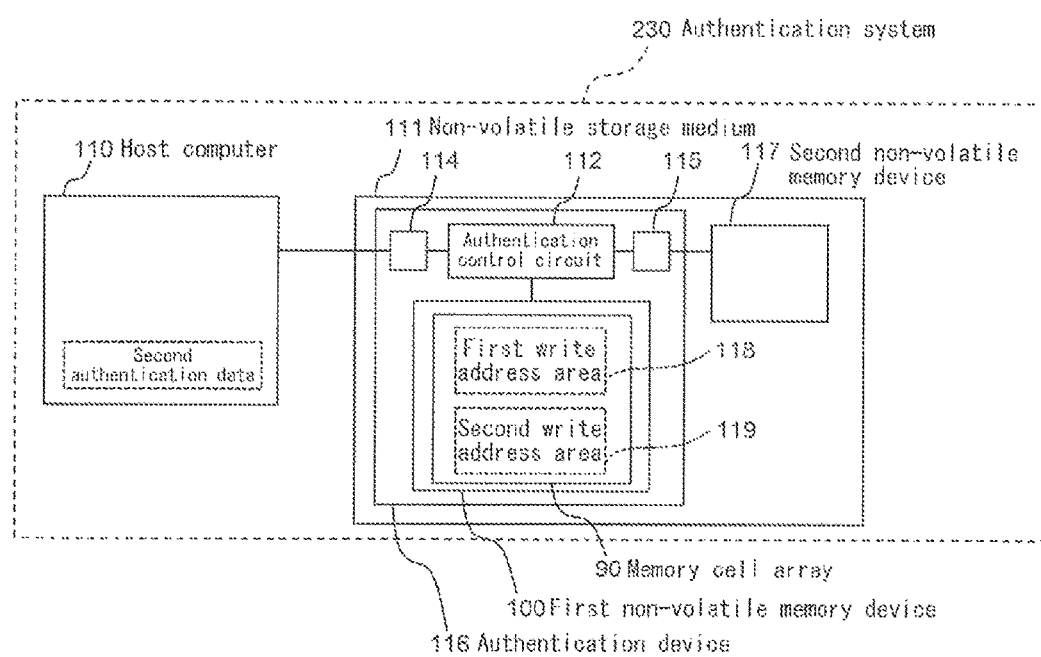
FIG. 31 is a block diagram showing the exemplary schematic configuration of an authentication system according to Example 1 of Embodiment 2.

FIG. 31 is a block diagram showing the exemplary schematic configuration of an authentication system according to Example 1 of Embodiment 2.

As exemplarily shown in FIG. 31, the authentication system 230 of the present example includes the host computer 110 and the non-volatile memory 111.

The non-volatile memory 111 (non-volatile memory module) includes an authentication device 116 (non-volatile memory controller) and a second non-volatile memory device 117. The authentication device 116 includes the authentication control circuit 112 (public key cipher/decryption/authentication circuit), the first non-volatile memory device 100, a first input/output circuit 114 (host I/F circuit), and a second input/output circuit 115 (memory I/F circuit). The first non-volatile memory device 100 includes the memory cell array 90. The memory cell array 90 includes the first write address area 118 (forming/non-forming data area) and the second write address area 119 (HR/LR level data area).

The second non-volatile memory device 117 corresponds to the content memory device 113.

Except for the above, the authentication system, the host computer and the non-volatile memory of Example 1 may be identical in device configuration to those of Embodiment 2 (FIG. 26). Therefore, in FIG. 31, the same components as those of FIG. 26 are identified by the same reference symbols and names, and will not be described in detail repeatedly.

Now, the outline of a general encryption method (cryptosystem) will be described, and then the authentication operation performed by the authentication system 230 will be described.

As the encryption method, there are a method which uses the same secret key and the same algorithm for the encryption and the decryption (common key cryptosystem) and a method which uses different keys for the encryption and the decryption (public key cryptosystem) may be used. In Embodiment 2, both of the common key cryptosystem and the public key cryptosystem may be employed.

In the present example, it is supposed that the public key cryptosystem is employed. In addition, it is supposed that a method which can return the plaintext data converted with the secret key to original plaintext data with the public key, in the public key cryptosystem, is employed. As such an encryption method, there is, for example, RSA (Rivest Shamit, Aldeman) encryption. Hereinafter, it is supposed that RSA encryption is employed as the public key cryptosystem, unless otherwise noted.

The conversion of the plaintext data with the secret key is not the "encryption" in a strict sense. However, in the specification, this conversion will also be referred to as "encryption" for easier explanation. The event that the plaintext data encrypted with the secret key is converted with the public key is not the "decryption" in a strict sense. However, in the specification, this conversion will also be referred to as "decryption" for easier explanation.

Since the encryption and the decryption are performed with different keys, the public key cryptosystem is also referred to as non-symmetric algorithm. A general flow of the processing is as follows.

(1) A key administrator creates a pair of secret key and public key.

(2) The public key is published to a user, while the secret key is kept by the key administrator.

(3) The user obtains the public key, and encrypts the plaintext with the public key to obtain the ciphertext.

(4) The key administrator decrypts the ciphertext obtained from the user, with the secret key.

In this processing, based on the fact that the plaintext can be created by the encryption, it is proved that the public key used for the encryption is the public key created by the key administrator.

A method which is different from the above may be employed. The flow of the processing is as follows.

(1) The key administrator creates a pair of secret key and public key.

(2) The public key is published to a user, while the secret key is kept by the key administrator.

(3) The key administrator encrypts the plaintext with the secret key to obtain the ciphertext, and sends the ciphertext.

(4) The user obtains the public key, and decrypts the ciphertext obtained from the key administrator, with the public key.

Only the user who can obtain the public key can decrypt the ciphertext, and use the resulting plaintext. Only the key administrator who owns the secret key can create the ciphertext which can be decrypted with the public key.

The processing of the encryption and the decryption is one-way processing. In other words, the ciphertext created by the encryption with the public key cannot be decrypted without using the secret key which forms the pair. Or, the ciphertext created by the encryption with the secret key cannot be decrypted without using the public key which forms the pair. In other words, the plaintext encrypted with one of the keys of the pair cannot be decrypted into the original plaintext without using the other of the keys of the pair.

On example of the public key cryptosystem having the above stated characteristic is the RSA encryption. The RSA encryption uses two large prime numbers in the algorithm.

One example of the RSA encryption is as follows.

(1) Sufficiently large prime numbers P, Q are chosen, and a product P·Q is expressed as n.

(2) An integer e which is coprime to (P−1)·(Q−1) is chosen. n and e are the public key.

(3) When the plaintext data (integer data obtained by replacing character string with numeric value) is M, the remainder obtained by dividing $M^e$ by n is ciphertext data C (integer data). That is, the ciphertext data C is derived from the plaintext data M according to the following formula:

$$C \equiv M^e \pmod{n}$$

This formula means that C is equal to the remainder obtained by dividing $M^e$ by n.

One example of the decryption in the algorithm of the RSA encryption is as follows.

(1) (P−1)·(Q−1)=ϕ(n) is found. ϕ(n) is the secret key. ϕ(n) is Euler's function, and indicates the number of positive integers which are smaller than n and coprime to n. Since P and Q are the prime numbers, ϕ(n)=ϕ(P·Q)=(P−1)·(Q−1).

(2) d is found such that the remainder resulting from the division of a product of d and e by ϕ(n) is 1. That is, an integer d is found such that:

$$d \cdot e \equiv 1 \pmod{\phi(n)}$$

This formula indicates that d·e and 1 constitute a congruence with ϕ(n) being divisor. That is, (d·e−1) can be divided by ϕ(n) with no remainder.

(3) Regarding the ciphertext data C, the remainder resulting from the division of $C^d$ by n is the plaintext data M. Specifically, according to the following formula, the plaintext data M is derived from the ciphertext data C:

$$M \equiv C^d \pmod{n}$$

For easier understanding, for example, two prime numbers, 3 and 11 are used. For easier calculation, small prime numbers are used.

In this case, $$n=33, \phi(n)=(3-1)\times(11-1)=2 \times 10=20$$

e=3 is used as an integer which is coprime to 20. That is, n=33 and e=3 are the public key. Now, it is assumed that English word "TOM" is encrypted by using ASCII and sent. A, B, C, . . . of ASCII correspond to 65, 66, 67, . . . in decimal form, respectively. For easier explanation, 64 is subtracted from ASCII, and it is assumed that A, B, C, . . . correspond to 1, 2, 3, . . . , respectively. In this case, "TOM" is expressed as "20, 15, 13". When this character string is encrypted, The cube of 20 is 8000. When 8000 is divided by 33, the remainder is 14 . . . corresponding to N.

The cube of 15 is 3375. When 3375 is divided by 33, the remainder is 9 . . . corresponding to I.

The cube of 13 is 2197. When 2197 is divided by 33, the remainder is 83 . . . corresponding to s. Therefore, a sender sends the ciphertext "NIs" created by encrypting the plaintext "TOM" to a recipient.

The recipient receives the ciphertext "NIs". Since the recipient knows the secret key ϕ(n), the recipient can know the original English word through the following procedure.

Since the recipient also knows e=3, the integer d is found such that 3d=1 (mod 20). As a result, d=7 is derived.

The seventh power of 14 is 105413504. When 105413504 is divided by 33, the remainder is 20 . . . T The seventh power of 9 is 4782969. When 4782969 is divided by 33, the remainder is 15 . . . O The seventh power of 83 is 893871739. When 893871739 is divided by 33, the remainder is 13 . . . M In this way, the original plaintext "TOM" is reproduced.

Although n is set to a small value, even a high-speed computer cannot decrypt the data within a realistic time by setting the value of n to a sufficiently large value in actual cases. Specifically, in a case where P and Q are also sufficiently large values (e.g., about 150-digit numbers in decimal form), n is sufficiently large (e.g., about 300-digit number in decimal form). In this case, even if the value of n is published, factorization of n into two prime numbers (factorization into prime numbers (factors)) cannot be performed within a realistic time. The value of ϕ(n) is unknown to a third party who does not have the authority (hereinafter, will be simply referred to as third party), and therefore, the third party has difficulty in the decryption.

There are many algorithms in the public key cryptosystem, and the algorithms are not limited to the above.

In the present example, the public key, the secret key, the parameters required to derive the two keys, the value of the parameter which makes a change to the encryption algorithm, the plaintext data to be encrypted (e.g., ID, serial number, a portion of file data, hash values of all data, etc.), etc., are stored in the first write address area 118 of the first non-volatile memory device 100. To store the parameters, all of the bit strings corresponding to the parameters may be stored in the first write address area 118. Or, a portion of the bit strings may be stored in the first write address area 118 and the remaining portion of the bit strings may be stored in the second write address area 119.

Next, the authentication operation in the present example will be described. The terms described in the reference embodiments, and the like, have the same meaning. Therefore, these terms will not be described in detail repeatedly.

Prior to the authentication operation, firstly, necessary data and the like are stored. The data to be processed in the present example includes the ID data set to each content data administrator, the random number N, the public key, and the secret key corresponding to the public key. These data is decided by the manufacturer of the non-volatile memory 111.

The content data administrator may be, for example, the copyright administrator, or the like of the content data stored in the non-volatile memory. The manufacturer of the non-volatile memory may be, for example, a business agent who manufactures and sells the non-volatile memory 111.

The manufacturer of the non-volatile memory 111 stores portions of the ID data, the random number N, and the secret key, as the first-kind data in the memory cell array 90 of the first non-volatile memory device 100, and the remaining portions of the ID data, the random number N, and the secret key, as the second-kind data in the memory cell array 90. Preset values may be artificially written as the ID data, the random number N, and the secret key, or random data created by utilizing randomness of occurrence of the forming may be used as the ID data, the random number N, and the secret key.

The first-kind data is written in the special write mode. In contrast, the second-kind data is written in the normal write mode. Of the data, the portion written as the first-kind data is stored in the first write address area 118. Of the data, the portion written as the second-kind data is stored in the second write address area 119.

The ID stored in the memory cell array 90 corresponds to the first authentication data. The random number N is a value unique to each device of the non-volatile memory 111, and corresponds to the third authentication data.

In the write in the special write mode, a host interface terminal used in the normal write mode as IO port may be used, or a terminal which is different from the terminal in the normal write mode may be used. In a case where the terminal which is different from the terminal in the normal write mode is used, the third party has difficulty in interpreting the content or write method of the data to be written. As a result, the tamper resistance, or the like can be improved, and the security can be further improved.

The manufacturer of the non-volatile memory 111 notifies the content data administrator of the ID data and the publish key. The content data administrator stores the ID data and the publish key in the host computer 110. The ID data stored in the host computer 110 corresponds to the second authentication data.

Through the above described procedure, the storage of the required data and the like is completed. Next, an actual authentication operation will be described.

Firstly, the authentication control circuit 112 reads the ID data (first authentication data) and the random number N (third authentication data) from the first non-volatile memory device 100.

Then, the authentication control circuit 112 outputs the random number N (third authentication data) to the host computer 110.

Then, the host computer 110 encrypts the random number N (third authentication data) received from the authentication control circuit 112 and the ID data (second authentication data) stored in the host computer 110, with the public key stored in the host computer 110. The host computer 110 outputs the ciphertext data created by the encryption to the non-volatile memory 111.

Then, the authentication control circuit 112 decrypts the ciphertext data received from the host computer 110, with the secret key stored in the memory cell array 90.

Then, the authentication control circuit 112 performs the authentication by verifying the ID data (second authentication data) created by the decryption and the ID data (first authentication data) read from the first non-volatile memory device 100, and by verifying the random number N (third authentication data) created by the decryption and the random number N (third authentication data) read from the first non-volatile memory device 100.

When there is a match between the value obtained by the decryption and the read value, for both of the ID data and the random number N, the authentication control circuit 112 determines that the host computer 110 is proper (authenticated), and permits the host computer 110 to access the second non-volatile memory device 117.

In summary, in Example 1, the manufacturer of the non-volatile memory 111 creates a pair of secret key and public key, and the non-volatile memory 111 determines whether or not the host computer 110 has the authority to the content data (data stored in the non-volatile memory (second non-volatile memory device)).

The first authentication data can be written only in the special write mode and can be read only in the special read mode. Since these modes are kept secret, it becomes possible to reduce a possibility that the third party rewrites or read the first authentication data.

The ID data is encrypted with the public key, sent, and received. The encrypted ID data cannot be decrypted without knowing the secret key. This makes it possible to reduce a possibility that the third party obtains the ID data via the signal line or the like in an unauthorized manner.

In a case where only the ciphertext data (ciphertext data created by encrypting the ID data with the public key) is sent, the signal on an interface can be decrypted, or code data can be copied, for example. If the ciphertext data is mimicked and sent to the non-volatile memory, the host computer may spoof. However, since the non-volatile memory sends the random number N unique to the device to the host computer in real time, and the host computer encrypts the random number N and the ID data with the public key and send the encrypted random number N and the encrypted ID data, the spoofing of the host computer can be prevented.

The random number N (third authentication data) may be stored in the memory cell array 90, as described above. Or, a random number generating circuit may be provided to generate the random number N (third authentication data) in each authentication operation. As the third authentication data, a serial number unique to each content or a hash value obtained from the content data may be used, instead of the random number N.

By using the unique values having a particular meaning, such as the serial number and the hash value, for the authentication, the host computer may examine that the content data is proper data and genuine data (unaltered data), for example. In this case, third authentication data may be pre-stored in the first non-volatile memory device such that the third authentication data is associated with the content data stored in the second non-volatile memory device.

For example, in a case where the first non-volatile memory device has a large capacity, the second non-volatile memory device may be omitted, and the content data may be stored in the first non-volatile memory device. In this case, the authentication control circuit may permit the host computer to access the content data stored in the first non-volatile memory device, according to a result of the authentication.

Although in the present example, the encryption and the decryption are performed by using the public key cryptosystem, they may be performed by using the common key cryptosystem.

Embodiment 3

An authentication system of Embodiment 3 is the authentication system of Embodiment 1, in which the host computer stores the second authentication data, and the host computer is operative to perform the authentication by verifying the first authentication data obtained from the non-volatile memory and the second authentication data.

In this configuration, it becomes possible to provide a safer authentication technique which employs a novel data storing method which is not provided in a prior art, in the non-volatile memory device.

In the above authentication system, the non-volatile memory may be operative to output the first authentication data encrypted with a public key to the host computer, and the host computer may be operative to obtain the encrypted first authentication data from the non-volatile memory, decrypt the encrypted first authentication data with a secret key corresponding to the public key to obtain decrypted first authentication data, and perform the authentication by verifying the decrypted first authentication data and the second authentication data.

In the above authentication system, the non-volatile memory may store the encrypted first authentication data.

In the above authentication system, the host computer may contain the secret key.

The above authentication system may further comprise a content memory device, and the host computer may be operative to access the content memory device, only when a degree of match between the first authentication data and the second authentication data satisfies a preset condition.

The above authentication system may further comprise a content memory device, and the host computer may store the content data in the content memory device, only when a degree of match between the first authentication data and the second authentication data satisfies a preset condition.

In the above authentication system, the data may include additional data, the host computer may be operative to obtain the additional data from the non-volatile memory, and the host computer may store the additional data in the content memory device, only when a degree of match between the first authentication data and the second authentication data satisfies a preset condition.

The phrase "the host computer may be operative to obtain the additional data from the non-volatile memory" includes a case where the host computer obtains the additional data from the non-volatile memory, only when a degree of match between the first authentication data and the second authentication data satisfies a preset condition.

According to Embodiment 3 of the present disclosure, there is provided a host computer operative to communicate with the non-volatile memory, the plurality of memory cells including: a memory cell in a variable state, in which a resistance value reversibly changes between a plurality of changeable resistance value ranges in accordance with an electric signal applied thereto; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein in the memory cell array, data including first authentication data is stored on the basis of whether each of the plurality of memory cells is in the initial state or the variable state.

The host computer may be operative to obtain the first authentication data as the encrypted first authentication data from the non-volatile memory, decrypt the encrypted first authentication data to obtain the decrypted first authentication data, and perform the authentication by verifying the decrypted first authentication data and the second authentication data.

In the above host computer, the non-volatile memory may contain the encrypted first authentication data.

In the above host computer, the encrypted first authentication data may be the first authentication data encrypted with the public key, the host computer may store the secret key corresponding to the public key and decrypt the encrypted first authentication data with the secret key.

The above host computer may be operative to communicate with a content memory device, and access the content memory device, only when a degree of match between the first authentication data and the second authentication data satisfies a preset condition.

The above host computer may store the content data in the content memory device, only when a degree of match between the first authentication data and the second authentication data satisfies a preset condition.

In the above host computer, the data may include additional data, the host computer may be operative to obtain the additional data from the non-volatile memory, and the host computer may store the additional data and the content data in the content memory device, only when a degree of match between the first authentication data and the second authentication data satisfies a preset condition.

An authentication method of Embodiment 3 is the authentication method of Embodiment 1, in which the step B may be the step of storing the second authentication data, in the host computer, and the step C may be the step of performing the authentication, with the host computer, by verifying the first authentication data obtained from the non-volatile memory and the second authentication data.

In the above authentication method, the first authentication data may be stored in the memory cell array as the encrypted first authentication data, the step C may be the step of obtaining, with the host computer, the encrypted first authentication data from the non-volatile memory, decrypting, with the host computer, the encrypted first authentication data to obtain the decrypted first authentication data, and then performing the authentication, with the host computer, by verifying the decrypted first authentication data and the second authentication data.

In the above authentication method, the encrypted first authentication data may be the first authentication data encrypted with the public key, the method may further comprise the step G of storing in the host computer, the secret key corresponding to the public key, and decrypting, with the host computer, the encrypted first authentication data with the secret key.

The above authentication method may further comprise the step E of permitting the host computer to access the content memory device, only when a degree of match between the first authentication data and the second authentication data satisfies a preset condition.

In the above authentication method, the step E may be the step of permitting the host computer to access the content data stored in the content memory device, only when a degree of match between the first authentication data and the second authentication data satisfies a preset condition.

In the above authentication method, in the memory cell array, the additional data may be stored on the basis of whether each of the memory cells is in the initial state or the variable state, and the method may further comprise the step I of obtaining, with the host computer, the additional data from the non-volatile memory, and the step E may be the step of permitting the host computer to store the additional data and the content data in the content memory device, only when a degree of match between the first authentication data and the second authentication data satisfies a preset condition.

In the above authentication method, in the memory cell array, the conversion parameter data may be stored on the basis of whether each of the memory cells is in the initial state or the variable state, and the method may further comprise the step F of obtaining, with the host computer, the conversion parameter data from the non-volatile memory, and the step E may be the step of permitting the host computer to store content data encrypted with the conversion parameter data, in the content memory device, only when a degree of match between the first authentication data and the second authentication data satisfies a preset condition.

[Device Configuration]

In Embodiment 3, the host computer 110 contains the second authentication data. The host computer 110 is operative to perform the authentication by verifying the first authentication data obtained from the non-volatile memory 111 and the second authentication data.

Except for the above, the authentication system, the host computer and the non-volatile memory of Embodiment 3 may be identical in device configuration to those of, for example, Embodiment 1 shown in FIG. 24, or for example, Embodiment 2 shown in FIG. 26. Therefore, the same components are identified by the same reference symbols and names, and will not be described in detail repeatedly.

Embodiment 3 may be modified as in the reference embodiments, Embodiment 1 and Embodiment 2.

[Authentication Method]

The authentication method of Embodiment 3 may be identical to that of Embodiment 1, except that of the steps of FIG. 25, step S102 is the step of storing in the host computer 110, the second authentication data, and step S103 is the step of performing the authentication, with the host computer 110, by verifying the first authentication data obtained from the non-volatile memory 111 and the second authentication data stored in the host computer 110.

Modified Example 4

In Modified example 4, the first authentication data is encrypted and decrypted.

The non-volatile memory 111 outputs the first authentication data to the host computer 110 as the encrypted first authentication data. The first authentication data may be stored in the memory cell array 90 in a pre-encrypted state. Or, the first authentication data may be stored in the memory cell array 90 in a plaintext state. In this case, the first authentication data may be encrypted and output to the host computer 110 after it is read from the memory cell array 90.

The host computer 110 obtains the encrypted first authentication data from the non-volatile memory 111. In addition, the host computer 110 decrypts the encrypted first authentication data to obtain the decrypted first authentication data. Further, the host computer 110 performs the authentication by verifying the decrypted first authentication data and the second authentication data.

The encrypted first authentication data may be the first authentication data encrypted with the public key. The host computer 110 may store the secret key corresponding to the public key. The host computer 110 may decrypt the encrypted first authentication data, with the secret key. The public key may be stored in the memory cell array 90. The public key may be stored in the memory cell array 90 on the basis of whether each of the memory cells is in the initial state or the variable state.

Except for the above, the authentication system, the host computer and the non-volatile memory of Modified example 4 may be identical in device configuration to those of Embodiment 3. Therefore, the same components are identified by the same reference symbols and names, and will not be described in detail repeatedly.

Figure 32:
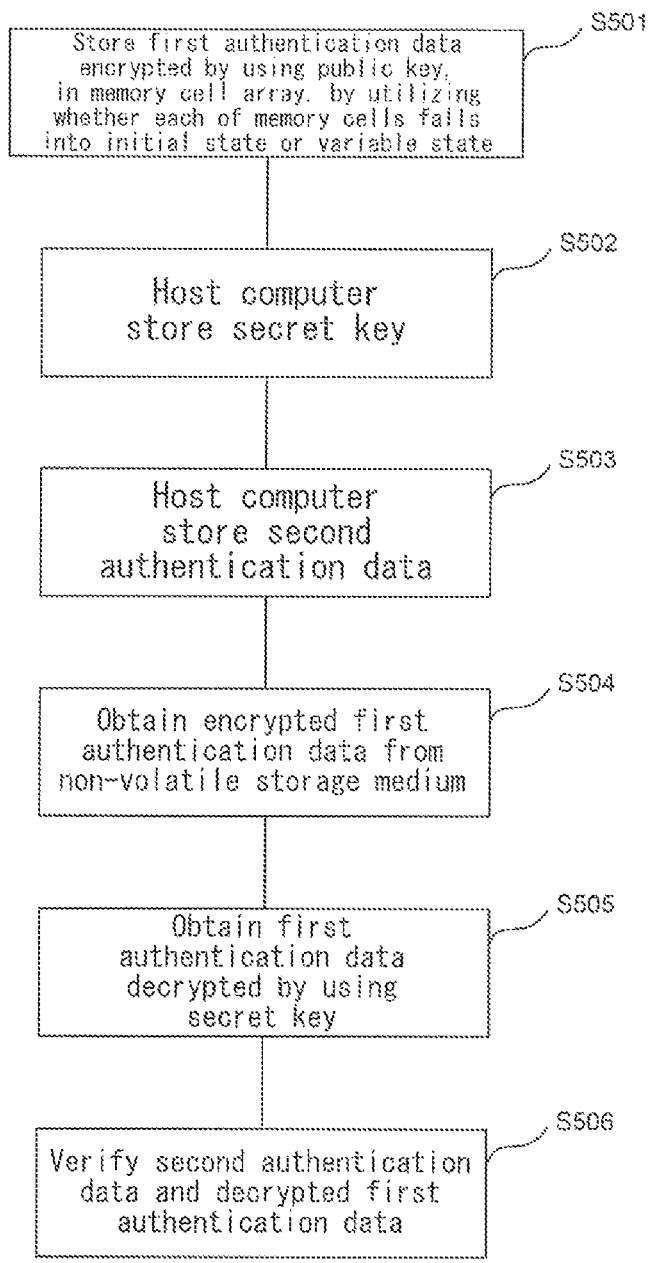
FIG. 32 is a flowchart showing an exemplary authentication method of Modified example 4 of Embodiment 3.

FIG. 32 is a flowchart showing an exemplary authentication method of Modified example 4 of Embodiment 3.

Initially, the first authentication data encrypted with the public key is stored in the memory cell array 90 of the non-volatile memory 111, on the basis of whether each of the memory cells 91 is in the initial state or the variable state (step S501: corresponding to step A).

Then, the host computer 110 stores the secret key (step S502: corresponding to step G).

Then, the host computer 110 stores the second authentication data (step S503: corresponding to step B).

Then, the host computer 110 obtains the first authentication data encrypted with the public key, from the non-volatile memory 111 (step S504).

Then, the host computer 110 decrypts the encrypted first authentication data, with the secret key stored in step S502, to obtain the decrypted first authentication data (step S505).

Finally, the host computer 110 performs the authentication, by verifying the second authentication data stored in step S503 and the decrypted first authentication data, which is obtained in step S305 (step S506).

The operations from step S304 to step S306 correspond to step S103 of FIG. 25.

Step S301 to step S303 may be performed in any order, or a plurality of steps of S301 to step S303 may be performed at the same time.

The present modified example may be modified as in the reference embodiments, Embodiment 1 and Embodiment 2.

In accordance with the present modified example, since the authentication is performed by using the public key cryptosystem, only a person who owns the secret key which is different in key data from the public key can decrypt the data encrypted with the public key. In other words, the non-volatile memory 111 can be authenticated in such a manner that only the host computer 110 which owns the secret key decrypts with the secret key, the data encrypted by the non-volatile memory 111 with the public key. In a case where the public key used for the authentication or the first authentication data encrypted with the public key is stored as a combination of the first-kind data and the second-kind data, the public key or the first authentication data encrypted with the public key cannot be easily read. That is, it becomes possible to reduce a risk of a leakage of the public key or the encrypted first authentication data, due to unauthorized read.

Modified Example 5

In Modified example 5, the additional data is stored in the non-volatile memory, and the host computer is operative to store the additional data and the content data in the content memory device.

The authentication system of the present example includes the content memory device 113. The specific configuration of the content memory device 113 may be the same as that of Modified example 3, and will not be described in detail repeatedly.

The content memory device 113 is operative to communicate with the host computer 110 via the non-volatile memory 111 or without via the non-volatile memory 111.

The additional data is stored in the memory cell array 90 on the basis of whether each of the memory cells is in the initial state or the variable state. Specifically, for example, the additional data may be password data set for each content data. A portion of the additional data may be stored as the first-kind data, while the remaining portion of the additional data may be stored as the second-kind data.

The host computer 110 obtains the additional data from the non-volatile memory 111. The host computer 110 stores the additional data and the content data in the content memory device 133, only when a degree of match between the first authentication data and the second authentication data satisfies a preset condition. The content data may be stored in an encrypted state or in an unencrypted state, in the content memory device 113.

Except for the above, the authentication system, the host computer and the non-volatile memory of Modified example 5 may be identical in device configuration to those of Embodiment 3. Therefore, the same components are identified by the same reference symbols and names, and will not be described in detail repeatedly.

Figure 33:
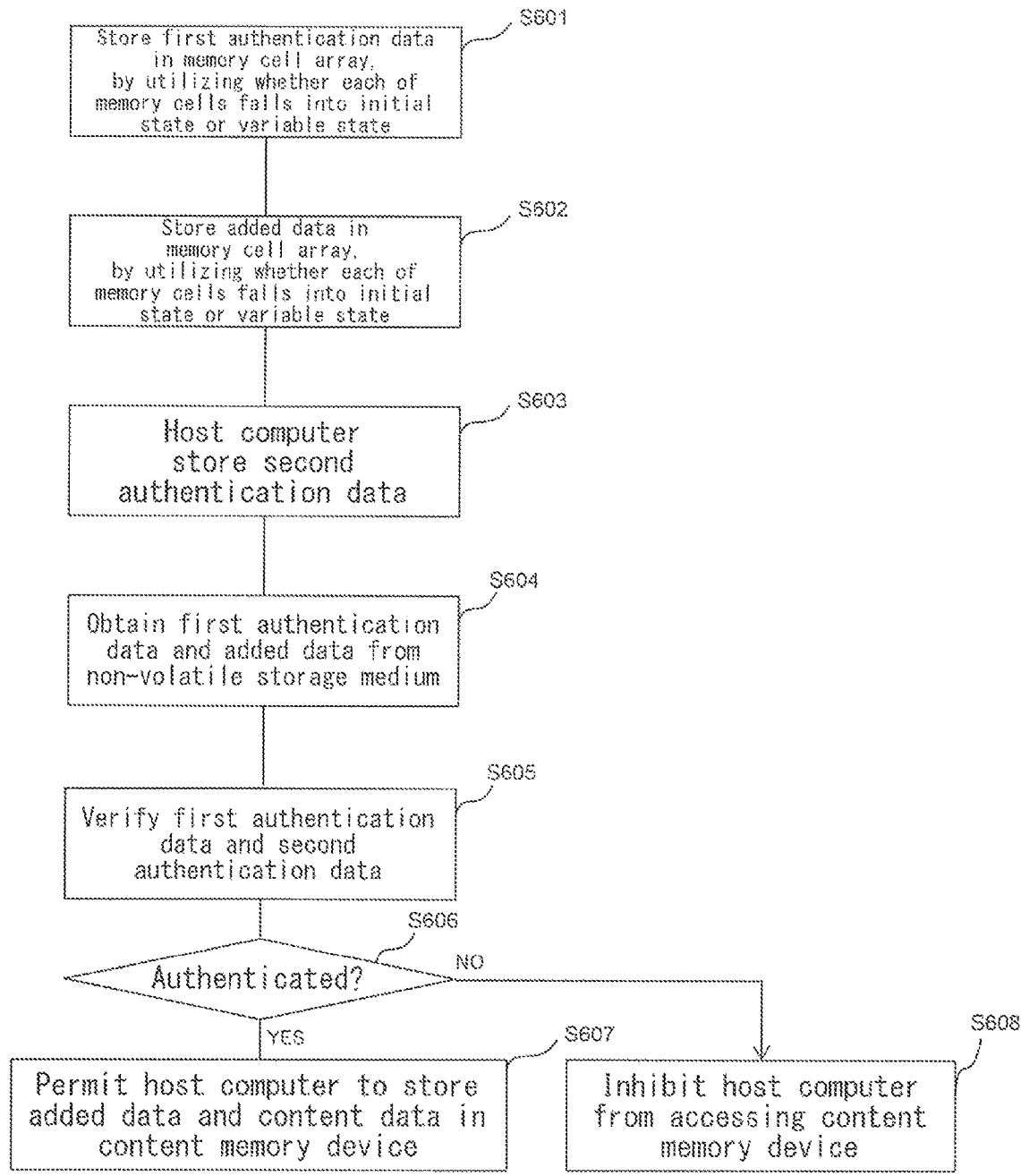
FIG. 33 is a flowchart showing an exemplary authentication method of Modified example 5 of Embodiment 3.

FIG. 33 is a flowchart showing an exemplary authentication method of Modified example 5 of Embodiment 3.

Initially, the first authentication data is stored in the memory cell array 90 on the basis of whether each of the memory cells 91 is in the initial state or the variable state (step S601: corresponding to step A).

Then, the additional data is stored in the memory cell array 90 on the basis of whether each of the memory cells 91 is in the initial state or the variable state (step S602: corresponding to step H).

Then, the host computer 110 stores the second authentication data (step S603: corresponding to step B).

Then, the host computer 110 obtains the first authentication data and the additional data, from the non-volatile memory 111 (step S604: corresponding to step I).

Then, the host computer 110 determines whether or not a degree of match between the first authentication data and the second authentication data satisfies a preset condition, by verifying the first authentication data obtained in step S604 and the second authentication data stored in step S603 (step S605 and step S606: corresponding to step C).

When the authentication is succeeded in (YES in step S606), the host computer 110 is permitted to store the additional data and the content data in the content memory device 113 (step S607: corresponding to step E). In response to this, the host computer 110 stores the additional data and the content data in the content memory device 113.

When the authentication is not succeeded in (NO in step S606), the host computer 110 is not permitted to access the content memory device 113 (step S608). If the host computer 110 is not permitted to access the content memory device 113 in the initial state, then, step S608 may be omitted.

Step S601 to step S603 may be performed in any order, or a plurality of steps of Step S601 to step S603 may be performed at the same time. Step S602 may be pre-executed. In this case, step S602 (step H) is not an essential step in the authentication method of Modified example 5.

The present modified example may be modified as in the reference embodiments, Embodiment 1 and Embodiment 2.

In accordance with the present modified example, since the authentication is performed with the public key cryptosystem, only a person who owns the secret key which is different in key data from the public key can decrypt the data encrypted with the public key. In other words, the non-volatile memory 111 can be authenticated in such a manner that only the host computer 110 which owns the secret key decrypts with the secret key, the data encrypted by the non-volatile memory 111 with the public key. In a case where the public key used for the authentication or the first authentication data encrypted with the public key is stored as a combination of the first-kind data and the second-kind data, the public key or the first authentication data cannot be easily read. That is, it becomes possible to reduce a risk of a leakage of the public key or the encrypted first authentication data, due to unauthorized read.

In addition, since the additional data stored in the memory cell array 90 is stored in the content memory device 113, the memory cell array 90 and the content memory device 113 can be associated with each other. In a case where the additional data which is added for each content is stored as a combination of the first-kind data and the second-kind data, the additional data cannot be read easily. That is, since the additional data and the authentication data which cannot be read easily are stored in the memory cell array 90 such that these data correspond to the content data within the non-volatile memory 111, it becomes possible to prevent creation of an unauthorized clone of the non-volatile memory 111.

Modified Example 6

In Modified example 6, the host computer encrypts the content data on the basis of the conversion parameter data stored in the memory cell array and stores the encrypted content data in the content memory device.

The data stored in the memory cell array 90 on the basis of whether each of the memory cells 91 is in the initial state or the variable state includes the conversion parameter data. A portion of the conversion parameter data may be stored as the first-kind data, while the remaining portion of the conversion parameter data may be stored as the second-kind data.

The "conversion parameter data" is parameter data used for at least one of encryption and decryption. The conversion parameter data may be parameter data used only for the encryption, parameter data used only for the decryption or parameter data used for both of the encryption and the decryption.

The host computer 110 obtains the conversion parameter data from the non-volatile memory 111. The host computer 110 may encrypt the content data on the basis of the conversion parameter data and store the encrypted content data in the content memory device 113, only when a degree of match between the first authentication data and the second authentication data satisfies a preset condition.

The method of encryption using the conversion parameter data may be the common key cryptosystem or the public key cryptosystem.

Except for the above, the authentication system, the host computer and the non-volatile memory of Modified example 6 may be identical in device configuration to those of Embodiment 3. Therefore, the same components are identified by the same reference symbols and names, and will not be described in detail repeatedly.

Figure 34:
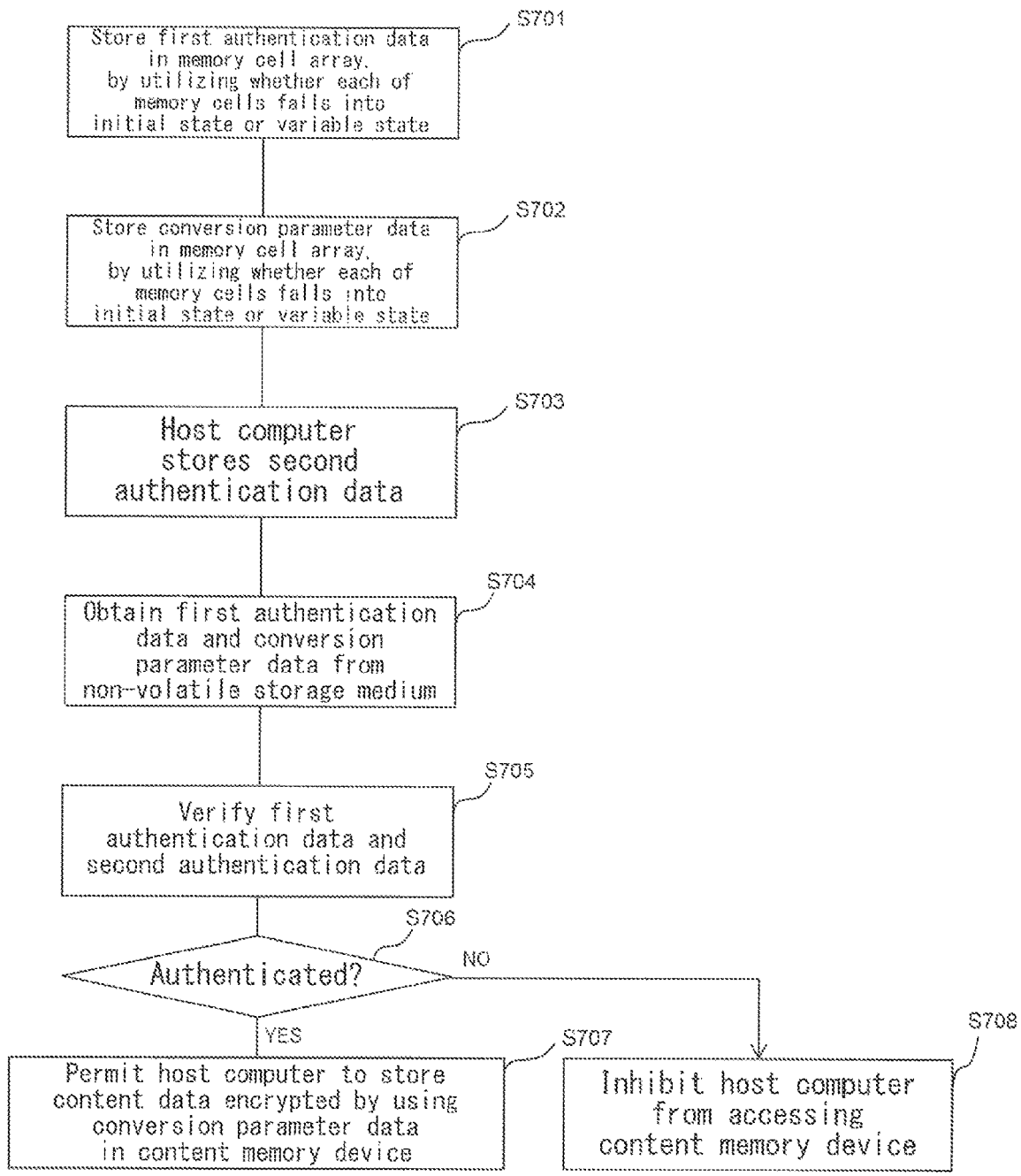
FIG. 34 is a flowchart showing an exemplary authentication method of Modified example 6 of Embodiment 3.

FIG. 34 is a flowchart showing an exemplary authentication method of Modified example 6 of Embodiment 3.

Initially, the first authentication data is stored in the memory cell array 90 on the basis of whether each of the memory cells 91 is in the initial state or the variable state (step S701: corresponding to step A).

Then, the conversion parameter data is stored in the memory cell array 90 on the basis of whether each of the memory cells 91 is in the initial state or the variable state (step S702: corresponding to step J).

Then, the host computer 110 stores the second authentication data (step S703: corresponding to step B).

Then, the host computer 110 obtains the first authentication data and the conversion parameter data, from the non-volatile memory 111 (step S704: corresponding to step F). For example, in a case where the encrypted first authentication data is stored in the above step A, the encrypted first authentication data may be decrypted on the basis of the conversion parameter data to obtain the first authentication data, after the encrypted first authentication data and the conversion parameter data are obtained.

Then, the host computer 110 determines whether or not a degree of match between the first authentication data and the second authentication data satisfies a preset condition, by verifying the first authentication data obtained in step S704 and the second authentication data stored in step S703 (step S705 to step S706: corresponding to step C).

When the authentication is succeeded in (YES in step S706), the host computer 110 is permitted to store the content data encrypted on the basis of the conversion parameter data, in the content memory device 113 (step S707: corresponding to step E). In response to this, the host computer 110 is permitted to store the content data encrypted on the basis of the conversion parameter data, in the content memory device 113.

On the other hand, when the authentication is not succeeded in (NO in step S706), the host computer 110 is not permitted to access the content memory device 113 (step S708). If the host computer 110 is not permitted to access the content memory device 113 in the initial state, step S708 may be omitted.

Step S701 to step S703 may be performed in any order, or a plurality of steps of Step S701 to step S703 may be performed at the same time. Step S702 (step J) may be pre-executed. In this case, step S702 (step J) is not an essential state in the authentication method of Modified example 6.

The present modified example may be modified as in the reference embodiments, Embodiment 1 and Embodiment 2.

In accordance with the present modified example, since the authentication is performed by using the public key cryptosystem, only a person who owns the secret key which is different in key data from the public key can decrypt the data decrypted with the public key. In other words, the non-volatile memory 111 can be authenticated in such a manner that only the host computer 110 which owns the secret key decrypts with the secret key, the data encrypted by the non-volatile memory 111 with the public key. In addition, in a case where the public key used for the authentication or the first authentication data encrypted with the public key is stored as a combination of the first-kind data and the second-kind data, these data cannot be read easily. Further, in a case where the conversion parameter data used for encrypting the content data is varied from non-volatile memory to non-volatile memory and is changed for each authentication data, the tamper resistance can be improved, and the data cannot be easily read. That is, it becomes possible to reduce a risk of a leakage of the public key or the encrypted first authentication data, due to unauthorized read.

Example 2

Example 2 is an application of a combination of Modified example 4, Modified example 5, and Modified example 6 of Embodiment 3.

In Example 2, the authentication system, the host computer and the non-volatile memory may be identical in device configuration to those of Example 1 (FIG. 31). Therefore, the same components are identified by the same reference symbols and names, and will not be described in detail repeatedly.

Next, the authentication operation in the present example will be described. The terms described in the reference embodiments, Example 1, and the like, have the same meaning. Therefore, these terms will not be described in detail repeatedly.

Prior to the authentication operation, firstly, necessary data and the like are stored. The data to be processed in the present example includes the ID data set for each non-volatile memory, or defined for each manufacturing lot of a predetermined number of the non-volatile memory, the password defined for each content data, the public key, and the secret key corresponding to the public key. These data are decided by the content data administrator.

The content data administrator stores the ID data, the password set for each content, and the secret key, in the host computer 110. The ID data stored in the host computer corresponds to the second authentication data. The password corresponds to the additional data.

The content data administrator notifies the manufacturer of the non-volatile memory of the password encrypted with the public key and the ID data encrypted with the public key. The manufacturer of the non-volatile memory stores a portion of the password encrypted with the public key and a portion of the ID data encrypted with the public key, as the first-kind data in the memory cell array 90 of the first non-volatile memory device 100, and stores the remaining portion of the password encrypted with the public key and the remaining portion of the ID data encrypted with the public key, as the second-kind data in the memory cell array 90 of the first non-volatile memory device 100.

The first-kind data is written in the special write mode. In contrast, the second-kind data is written in the normal write mode. Of the data, the portion written as the first-kind data is stored in the first write address area 118. Of the data, the portion written as the second-kind data is stored in the second write address area 119.

The ID data encrypted with the public key, which is stored in the memory cell array 90 corresponds to the first authentication data. The password encrypted with the public key corresponds to the additional data.

In the write in the special write mode, a host interface terminal used in the normal write mode as IO port may be used, or a terminal which is different from the terminal in the normal write mode may be used. In a case where the terminal which is different from the terminal in the normal write mode is used, the third party has difficulty in interpreting the content or write method of the data to be written. As a result, the tamper resistance can be improved, and the security can be further improved.

Through the above described procedure, the storage of the required data and the like is completed. Next, an actual authentication operation will be described.

Firstly, in response to the command from the host computer 110, the authentication control circuit 112 reads the ID data (first authentication data) encrypted with the public key and the password (additional data) encrypted with the public key, from the first non-volatile memory device 100. Then, the authentication control circuit 112 outputs the encrypted ID data and the encrypted password to the host computer 110.

Then, the host computer 110 decrypts the encrypted ID data, which is received from the authentication control circuit 112, with the secret key stored in the host computer 110. Then, the host computer 110 verifies the ID data (first authentication data) created by the decryption, and the ID data (second authentication data) stored in the host computer 110. If there is a match between the two ID data, the host computer 110 determines that the non-volatile memory 111 is proper. This is because it may be determined that the non-volatile memory 111 contains the proper ID which is known by only the person who has the authority.

When the host computer 110 determines that the non-volatile memory 111 is proper, then the host computer 110 decrypts the encrypted password (additional data), which is received from the authentication control circuit 112, with the secret key stored in the host computer 110. Then, the host computer 110 verifies the password (additional data) created by the decryption and the password stored in the host computer 110. If there is a match between the two passwords, the host computer 110 determines that the use of the content data corresponding to the password is proper. The password corresponding to each content, which is stored in the host computer 110, may be stored in the host computer 110, via a particular path, when an action for acquiring the authority is performed, for example, at the time of purchase. The particular path may be, for example, Internet.

The content data owned by the content data administrator is stored in the second non-volatile memory device, together with the additional data. The host computer 110 reads the encrypted password, which is stored in the first non-volatile memory device 100, acquires the password decrypted with the secret key, and performs programming so that the use of the content data is forbidden unless a match between the acquired password and the password stored in the host computer 110 as a result of the user's purchase, is found. In other words, unless the password added to the content data, the password stored in the host computer 110, and the encrypted password which is stored in the first non-volatile memory device 100, are all obtained, the use of the content data is not permitted. This can achieve the high security. The password stored in the first non-volatile memory device 100 can be read only in the special read mode. Even if the content data stored in the second non-volatile memory device leaks and is cloned, the use of the content data is forbidden, unless the password is read from the first non-volatile memory device 100 and the same write method as that for the first non-volatile memory device 100 is known. This can reduce a possibility of the third party's unauthorized use of the content data.

Especially, in a case where many passwords are prepared so as to correspond to many contents, a different password can be added for each content data, and can be protected individually. This can construct a clone prevention mechanism with a high security.

In summary, in Example 2, the content data administrator creates a pair of secret key and public key, and the host computer determines whether or not the content data (data stored in the non-volatile memory (second non-volatile memory device)) is the data created properly. In accordance with the present example, the unauthorized use of the content data can be effectively suppressed.

The first authentication data can be written only in the special write mode and can be read only in the special read mode. Since these modes are kept secret, it becomes possible to reduce a possibility that the third party rewrites or read the first authentication data or the additional data.

The ID data encrypted with the public key is provided to the manufacturer of the non-volatile memory and sent from the non-volatile memory to the host computer. The encrypted ID data cannot be decrypted without knowing the secret key. This makes it possible to reduce a possibility that the third party improperly uses the ID data.

Embodiment 4

An authentication system of Embodiment 4 is the authentication system of Embodiment 1, in which wherein in the memory cell array, the first authentication data encrypted with a first public key is stored, wherein the non-volatile memory further contains the second authentication data as the encrypted second authentication data, which is generated on the basis of the first authentication data, and wherein the host computer is operative to decrypt the he encrypted first authentication data input from the non-volatile memory to obtain decrypted first authentication data, decrypt the encrypted second authentication data input from the non-volatile memory to obtain decrypted second authentication data, and perform the authentication by verifying the decrypted first authentication data and the decrypted second authentication data.

In this configuration, it becomes possible to provide a safer encryption technique which employs a novel data storing method which is not provided in a prior art, in a non-volatile memory device.

In the above authentication system, encrypted second authentication data is encrypted with a second secret key which is different from a first secret key corresponding to the first public key.

In the above authentication system, the host computer may be operative to decrypt the encrypted first authentication data input from the non-volatile memory to obtain the decrypted first authentication data, and encrypt the decrypted first authentication data to obtain the encrypted second authentication data, and wherein the non-volatile memory may be operative to store the obtained encrypted second authentication data in the memory cell array.

The above authentication system may further comprise a content memory device, wherein the content memory device may contain content data and a second public key corresponding to the second secret key, and wherein the host computer may be operative to decrypt the encrypted second authentication data with the second public key obtained from the content memory device.

According to Embodiment 4, there is provided a host computer operative to communicate with a non-volatile memory, the plurality of memory cells including: a memory cell in a variable state, in which a resistance value reversibly changes between a plurality of changeable resistance value ranges in accordance with an electric signal applied thereto; and a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges, wherein the non-volatile memory stores first authentication data as the first authentication data encrypted with a public key, wherein the non-volatile memory further stores second authentication data as the encrypted second authentication data, which is created based on the first authentication data, wherein the host computer is operative to decrypt the encrypted first authentication data which is obtained from the non-volatile memory to obtain the decrypted first authentication data, decrypt the encrypted second authentication data which is obtained from the non-volatile memory to obtain the decrypted second authentication data, and perform the authentication by verifying the decrypted first authentication data and the decrypted second authentication data.

In the above host computer, the encrypted second authentication data may be encrypted with a second secret key which is different from a first secret key corresponding to the first public key.

The above host computer may wherein the host computer is operative to decrypt the encrypted first authentication data input from the non-volatile memory to obtain the decrypted first authentication data, and encrypt the decrypted first authentication data to obtain the encrypted second authentication data, and wherein the non-volatile memory is operative to store the obtained encrypted second authentication data in the memory cell array.

The above host computer may further comprise a content memory device, the content memory device may store the content data and the second public key corresponding to the second secret key, and the host computer may be operative to decrypt the encrypted second authentication data, with the second public key obtained from the content memory device.

An authentication method of Embodiment 4 is the authentication method of Embodiment 1, in which the first authentication data is stored as the first authentication data encrypted with the public key, the step B is the step of storing in the memory cell array, the second authentication data as the encrypted second authentication data which is created based on the first authentication data, and the step C is the step of decrypting, with the host computer, the encrypted first authentication data which is obtained from the non-volatile memory to obtain the decrypted first authentication data, decrypting, with the host computer, the encrypted second authentication data which is obtained from the non-volatile memory to obtain the decrypted second authentication data, and then performing the authentication, with the host computer, by verifying the decrypted first authentication data and the decrypted second authentication data.

In the above authentication method, the encrypted first authentication data may be created by encryption with a first public key, and the encrypted second authentication data may be created by encryption with a second secret key which is different from the first secret key, when a secret key corresponding to the first public key is the first secret key.

In the above authentication method, the step B may include the step K of decrypting, with the host computer, the encrypted first authentication data which is obtained from the non-volatile memory, to obtain the decrypted first authentication data, and then encrypting, with the host computer, the decrypted first authentication data to obtain the encrypted second authentication data, and the step L of storing, with the non-volatile memory, in the memory cell array, the encrypted second authentication data which is obtained from the host computer.

The above authentication method may further comprise the step M of storing in a content memory device the content data and the second public key corresponding to the second secret key, and the step C may include decrypting, with the host computer, the encrypted second authentication data, with the second public key obtained from the content memory device.

The above authentication method may further comprise the step N of permitting the host computer to access the content data stored in the content memory device, only when a degree of match between the first authentication data and the second authentication data satisfies a preset condition.

In the above authentication method, at least a portion of the secret key used to decrypt the encrypted first authentication data may be stored on the basis of whether each of the memory cells is in the initial state or the variable state.

In the above authentication method, the encrypted second authentication data may be stored without utilizing whether or not the resistance value of each of the memory cells is within the initial resistance value range and on the basis of whether or not the resistance value of each of the memory cells is within at least one of the changeable resistance value ranges.

[Device Configuration]

In Embodiment 4, the non-volatile memory 111 contains the first authentication data as the first authentication data encrypted with the public key, and the second authentication data as the encrypted second authentication data, which is created based on the first authentication method.

The host computer 110 decrypts the encrypted first authentication data which is obtained from the non-volatile memory 111 to obtain the decrypted first authentication data. In addition, the host computer 110 decrypts the encrypted second authentication data which is obtained from the non-volatile memory 111 to obtain the decrypted second authentication data. Further, the host computer 110 performs the authentication by verifying the decrypted first authentication data and the decrypted second authentication data.

Except for the above, the authentication system, the host computer and the non-volatile memory of Embodiment 4 may be identical in device configuration to those of, for example, Embodiment 1 shown in FIG. 24, or for example, Embodiment 2 shown in FIG. 26. Therefore, the same components are identified by the same reference symbols and names, and will not be described in detail repeatedly.

Embodiment 4 may be modified as in the reference embodiments, Embodiment 1, Embodiment 2, and Embodiment 3.

[Authentication Method]

The authentication method of Embodiment 4 may be identical to the authentication method of Embodiment 1 except that, in the steps of FIG. 25, the step S101 is the step of storing in the memory cell array 90, the first authentication data as the first authentication data encrypted with the public key, on the basis of whether each of the memory cells is in the initial state or the variable state, the step S102 is the step of storing in the memory cell array 90, the encrypted second authentication data, which is created based on the first authentication data, the step S103 is the step of decrypting the encrypted first authentication data which is obtained from the non-volatile memory 111 to obtain the decrypted first authentication data, and decrypting the encrypted second authentication data which is obtained from the non-volatile memory 111 to obtain the decrypted second authentication data, and then performing the authentication by verifying the decrypted first authentication data and the decrypted second authentication data.

Modified Example 7

In Modified example 7, the host computer 110 creates the second authentication data from the first authentication data, and the non-volatile memory stores the second authentication data.

The host computer 110 decrypts the encrypted first authentication data which is obtained from the non-volatile memory 111 to obtain the decrypted first authentication data. In addition, the host computer 110 encrypts the decrypted first authentication data to obtain the encrypted second authentication data. Further, the host computer 110 outputs the encrypted second authentication data to the non-volatile memory 111.

The non-volatile memory 111 stores in the memory cell array 90, the encrypted second authentication data, which is obtained from the host computer 110.

Except for the above, the authentication system, the host computer and the non-volatile memory of Modified example 7 may be identical in device configuration to those of Embodiment 4. Therefore, the same components are identified by the same reference symbols and names, and will not be described in detail repeatedly.

Figure 35:
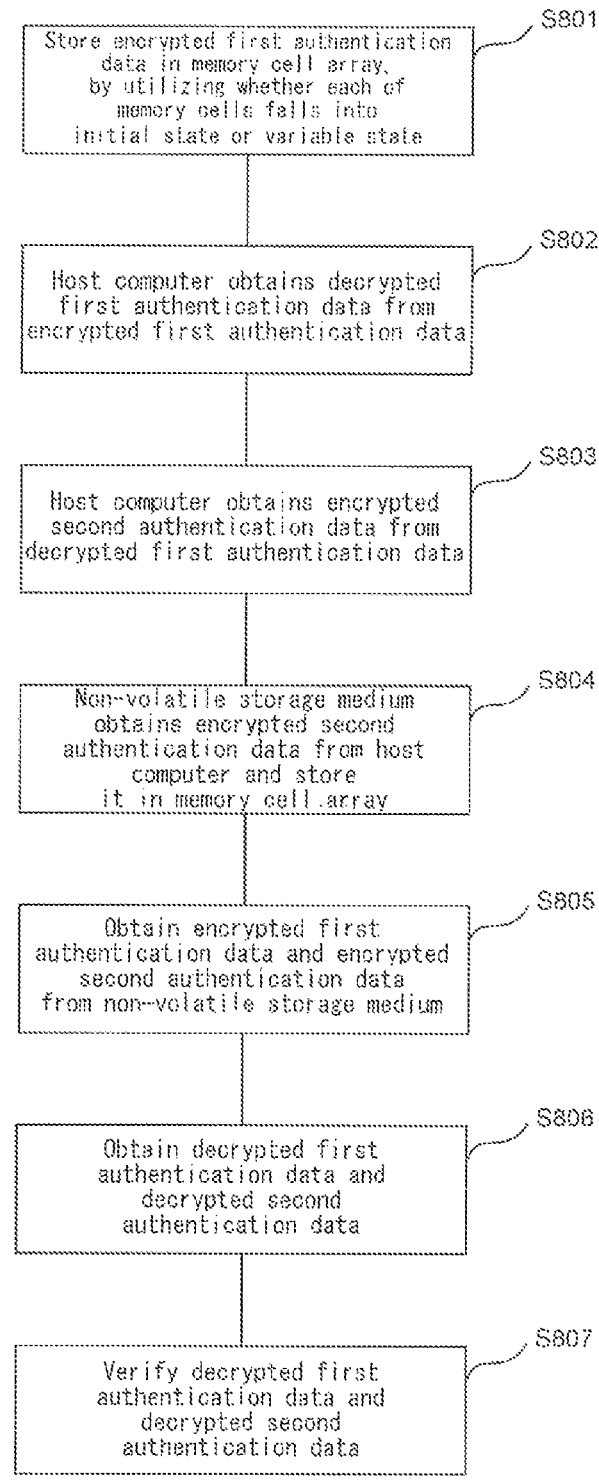
FIG. 35 is a flowchart showing an exemplary authentication method of Modified example 7 of Embodiment 4.

FIG. 35 is a flowchart showing an exemplary authentication method of Modified example 7 of Embodiment 4.

Initially, the first authentication data encrypted with the public key is stored in the memory cell array 90 on the basis of whether each of the memory cells is in the initial state or the variable state (step S801: corresponding to step A).

Then, the host computer 110 obtains the encrypted first authentication data, from the non-volatile memory 111, and decrypts the encrypted first authentication data with the secret key to obtain the decrypted first authentication data (step S802). The secret key may be the first secret key. The first secret key may be stored in the host computer 110, or the host computer 110 may externally obtain the first secret key via Internet, etc.

Then, the host computer 110 encrypts the decrypted first authentication data to obtain the encrypted second authentication data (step S803). That is, in the present modified example, the second authentication data is the first authentication data encrypted by the host computer 110. The first authentication data may be encrypted with a second secret key which is different from the first secret key. The second secret key may be stored in the host computer 110, or the host computer 110 may externally obtain second secret key via Internet, etc. In a case where second secret key is pre-stored in the host computer 110, an activation method may be employed, which permits the use of second secret key as a result of the user's purchase of authority of utilization of the content data.

Then, the non-volatile memory 111 obtains the encrypted second authentication data from the host computer 110 and stores the encrypted second authentication data in the memory cell array 90 (step S804: corresponding to step L).

Then, the host computer 110 obtains the encrypted first authentication data and the encrypted second authentication data, from the non-volatile memory 111 (step S805).

Then, the host computer 110 decrypts the encrypted first authentication data and the encrypted second authentication data, to obtain the decrypted first authentication data and the decrypted second authentication data, respectively (step S806).

Finally, the host computer 110 performs the authentication, by verifying the decrypted first authentication data, and the decrypted second authentication data (step S807).

The operations of step S802 and step S803 correspond to step K. The operations from step S802 to step S804 correspond to step S102 of FIG. 25. The operations from step S805 to step S807 correspond to step S103 of FIG. 25.

The present modified example may be modified as in the reference embodiments, Embodiment 1, Embodiment 2, and Embodiment 3.

Unlike in Example 2, in accordance with the present modified example, it is not necessary to pre-store the encrypted password in the host computer 110. Therefore, the confidentiality of the password can be improved. In addition, since the encrypted second authentication data is stored in the non-volatile memory 111, data associated with the communication between the non-volatile memory 111 and the host computer 110 can be kept in the non-volatile memory 111. For example, in a case where the data indicating a result of granting the authority of utilization of the content data is managed, the data associated with storage of the second authentication data, corresponding to each content can be kept in the non-volatile memory 111. This can eliminate a need for the host computer 110 to store and manage this data. In other words, it becomes possible to realize the non-volatile memory 111 which provides the data indicating a result of granting the authority of utilization of each content data.

For example, the encrypted first authentication data stored in step S801 may be the first authentication data which is encrypted with the public key corresponding to the first secret key and varied from medium to medium. The host computer 110 may decrypt the encrypted first authentication data with the first secret key, encrypt the decrypted first authentication data with the second secret key, and store the encrypted first authentication data in the memory cell array 90. In this case, the requirement for the host computer 110 to obtain the second secret key may be the user's purchase of the authority of utilization. This permits only the user who has gone through a proper purchase procedure of the authority of utilization to obtain the first authentication data (equivalent to the second authentication data) encrypted with the second secret key and use the content data corresponding to the second secret key.

Modified Example 8

In Modified example 8, the second authentication data is encrypted with the second secret key, the second public key and the content data are stored in the content memory device, and the host computer decrypts the encrypted second authentication data with the second public key obtained from the content memory device.

The authentication system of the present modified example includes the content memory device 113. The content memory device 113 contains the content data and the second public key corresponding to the second secret key. The specific configuration of the content memory device 113 may be the same as that of Modified example 3, and will not be described in detail repeatedly.

The content memory device 113 is operative to communicate with the host computer 110 via the non-volatile memory 111 or without via the non-volatile memory 111.

The encrypted first authentication data is created by encryption with the first public key. The encrypted second authentication data is created by encryption with the second secret key which is different from the first secret key, when the secret key corresponding to the first public key is the first secret key.

The host computer 110 decrypts the encrypted second authentication data with the second public key obtained from the content memory device 113.

Except for the above, the authentication system, the host computer and the non-volatile memory of Modified example 8 may be identical in device configuration to those of Embodiment 4. Therefore, the same components are identified by the same reference symbols and names, and will not be described in detail repeatedly.

Figure 36:
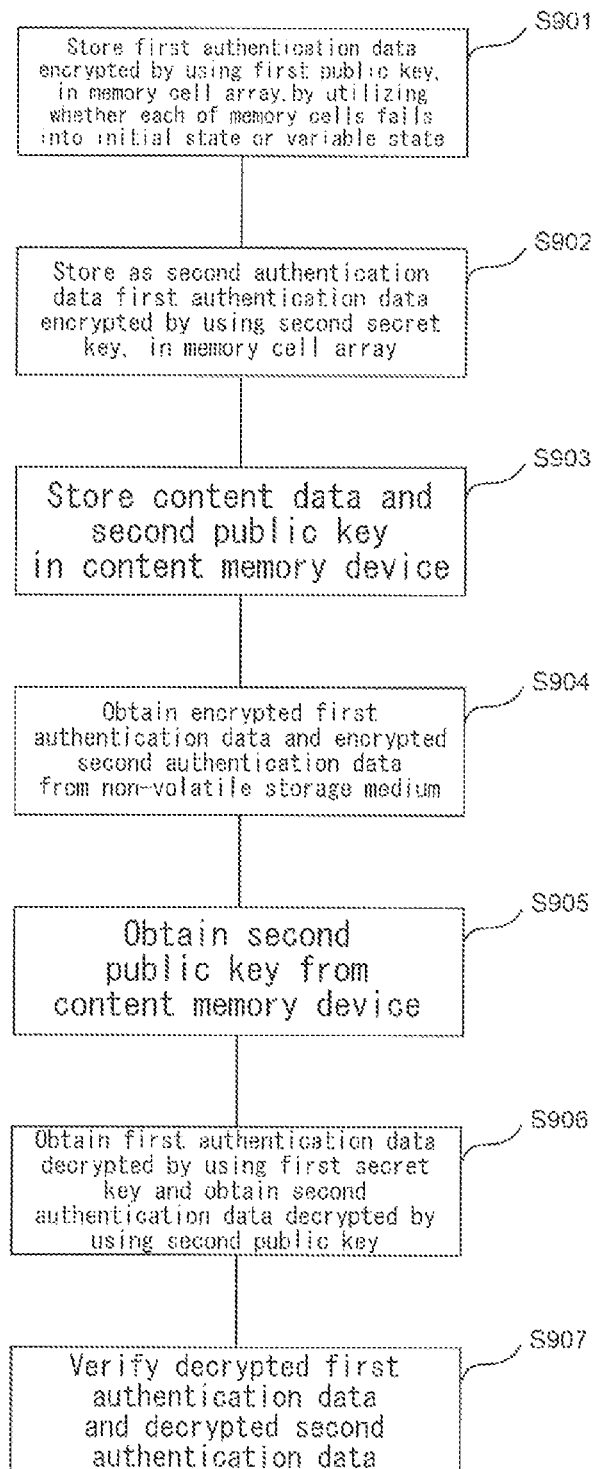
FIG. 36 is a flowchart showing an exemplary authentication method of Modified example 8 of Embodiment 3.

FIG. 36 is a flowchart showing an exemplary authentication method of Modified example 8 of Embodiment 4.

Initially, the first authentication data encrypted with the public key is stored in the memory cell array 90 on the basis of whether each of the memory cells 91 is in the initial state or the variable state (step S901: corresponding to step A).

Then, the host computer 110 obtains the encrypted first authentication data, from the non-volatile memory 111, and decrypts the encrypted first authentication data with the first secret key to obtain the decrypted first authentication data.

The first secret key may be stored in the host computer 110, or the host computer 110 may externally obtain the first secret key via Internet, etc. In addition, the host computer 110 encrypts the decrypted first authentication data with the second secret key to obtain the second authentication data (first authentication data encrypted with the second secret key). The second secret key may be stored in the host computer 110. Or, the host computer 110 may externally obtain the second secret key via Internet, etc., and the second authentication data may be output from the host computer 110 to the non-volatile memory 111. The second authentication data is stored in the memory cell array 90 (step S902: corresponding to step B).

Then, the host computer 110 stores the content data and the second public key in the content memory device 113 (step S903: corresponding to step M).

Then, the host computer 110 obtains the first authentication data encrypted with the first public key and the second authentication data encrypted with the second secret key, from the non-volatile memory 111 (step S904).

Then, the host computer 110 obtains the second public key from the content memory device 113 (step S905).

Then, the host computer 110 decrypts the encrypted first authentication data with the first secret key to obtain the decrypted first authentication data, and decrypts the encrypted second authentication data with the second secret key to obtain the decrypted second authentication data (step S906).

Finally, the host computer 110 performs the authentication by verifying the decrypted first authentication data and the decrypted second authentication data (step S907).

The operations from step S904 to step S907 correspond to step S103 of FIG. 25.

The present modified example may be modified as in the reference embodiments, Embodiment 1, Embodiment 2, and Embodiment 3.

Unlike in Example 2, in accordance with the present modified example, it is not necessary to pre-store the encrypted password in the host computer 110. Therefore, the confidentiality of the password can be improved. In addition, since the encrypted second authentication data is stored in the non-volatile memory 111, data associated with the communication between the non-volatile memory 111 and the host computer 110 can be kept in the non-volatile memory 111. For example, in a case where the data indicating a result of granting the authority of utilization of the content data is managed, the data associated with storage of the second authentication data, corresponding to each content can be kept in the non-volatile memory 111. This can eliminate a need for the host computer 110 to store and manage this data. In other words, it becomes possible to realize the non-volatile memory 111 which provides the data indicating a result of granting the authority of utilization of each content data.

For example, the encrypted first authentication data stored in step S901 may be the first authentication data which is encrypted with the public key corresponding to the first secret key and varied from medium to medium. The host computer 110 may decrypt the encrypted first authentication data with the first secret key, encrypt the decrypted first authentication data with the second secret key, and store the encrypted first authentication data in the memory cell array 90. In this case, the requirement for the host computer 110 to obtain the second secret key may be the user's purchase of the authority of utilization. This permits only the user who has gone through a proper purchase procedure of authority of utilization to obtain the first authentication data (equivalent to the second authentication data) encrypted with the second secret key and use the content data corresponding to the second secret key.

The content data may be preliminarily added with the second public key corresponding to the second secret key. In a case where the second authentication data encrypted by the second secret key is decrypted with the second public key obtained from the content data, and there is a match between the decrypted second authentication data and the first authentication data, it may be determined that the user is a proper (authorized) user who purchased the second secret key. When it is determined that the user is a proper (authorized) user, the host computer 110 may permit that user to use the content data. The encrypted first authentication data may be information that is unique to each medium, and may be stored as a combination of the first-kind data and the second-kind data. Thereby, the tamper resistance can be improved, and the data cannot be easily read. In other words, the proper use of content data can be realized while reducing a risk of unauthorized reading and clone.

Example 3

Example 3 is a combination of Modified example 7 and Modified example 8 of Embodiment 4.

Except for the above, the authentication system, the host computer and the non-volatile memory of Example 3 may be identical in device configuration to those of Example 1 (FIG. 31). Therefore, the same components are identified by the same reference symbols and names, and will not be described in detail repeatedly.

Next, the authentication operation in the present example will be described. The terms described in the reference embodiments, Example 1, and the like, have the same meaning. Therefore, these terms will not be described in detail repeatedly.

Prior to the authentication operation, firstly, necessary data and the like are stored. The data to be processed in the present example includes the ID data (serial number) set to each non-volatile memory, the first public key, the first secret key corresponding to the first public key, the second public key, and the second secret key corresponding to the second public key. These data is decided by the content data administrator. The ID data is varied from non-volatile memory to non-volatile memory.

The content data administrator notifies the manufacturer of the non-volatile memory 111 of the ID data encrypted with the first public key.

The manufacturer of the non-volatile memory 111 stores the entire of ID data encrypted with the first public key, as the first-kind data, in the memory cell array 90. Since the entire of ID data is stored as the first-kind data, it becomes possible to reduce a possibility that the third party alters the ID data dishonestly. Note that a portion of the ID data encrypted with the first public key may be stored as the first-kind data and the remaining portion of the ID data encrypted with the first public key may be stored as the second-kind data.

The first-kind data is written in the special write mode. In contrast, the second-kind data is written in the normal write mode. Of the data, the portion written as the first-kind data is stored in the first write address area 118. Of the data, the portion written as the second-kind data is stored in the second write address area 119.

The ID data which is encrypted with the first public key and stored in the memory cell array 90 corresponds to the first authentication data.

In the write in the special write mode, a host interface terminal used in the normal write mode as IO port may be used, or a terminal which is different from the terminal in the normal write mode may be used. In a case where the terminal which is different from the terminal in the normal write mode is used, the third party has difficulty in interpreting the content or write method of the data written. As a result, the tamper resistance can be improved, and the security can be further improved.

The content data administrator stores the first secret key, and the second secret key in the host computer 110.

The content data administrator stores the content data and the second public key in the second non-volatile memory device 117. The content data may be called content data with the public key. The second non-volatile memory device 117 corresponds to the content memory device 113.

Through the above described procedure, the storage of the required data and the like is completed. Next, an actual authentication operation will be described.

Firstly, the authentication control circuit 112 reads the ID data encrypted with the first public key, from the first non-volatile memory device 100, and outputs the ID data to the host computer 110.

Then, the host computer 110 decrypts the ID data encrypted with the first public key, which is received from the authentication control circuit 112, with the first secret key stored in the host computer 110.

Then, the host computer 110 stores therein the ID data (first authentication data) decrypted with the first secret key, and encrypts the ID data with the second secret key to obtain the ID data (second authentication data) encrypted with the second secret key.

Then, the host computer 110 outputs the ID data encrypted with the second secret key, to the authentication control circuit 112, via the first input/output circuit 114. The ID data encrypted with the second secret key corresponds to the second authentication data.

Then, the authentication control circuit 112 stores as the second-kind data the ID data (second authentication data) encrypted with the second secret key, which is received from the host computer 110, in the second write address area. Since the ID data (second authentication data) encrypted with the second secret key is written in the normal write mode, it becomes possible to reduce a possibility of a leakage of the special write command. Note that a portion of the ID data (second authentication data) encrypted with the second secret key may be stored as the first-kind data and the remaining portion of the ID data encrypted with the second secret key may be stored as the second-kind data.

Then, in response to a command from the host computer 110, the content data and the second public key which are stored in the second non-volatile memory device 117 are output to the host computer 110, via the second input/output circuit 115, the authentication control circuit 112, and the first input/output circuit 114.

Then, in response to a command from the host computer 110, the authentication control circuit 112 reads the ID data (second authentication data) encrypted with the second secret key, from the first non-volatile memory device 100, and outputs the ID data to the host computer 110.

Then, the host computer 110 decrypts the ID data (second authentication data) encrypted with the second secret key, with the second public key received from the second non-volatile memory device 117.

Then, the host computer 110 verifies the ID data (second authentication data) decrypted with the second public key and the ID data (first authentication data) decrypted with the first secret key, which is stored in the host computer 110. When there is a match between these two ID data, the host computer 110 is permitted to use the content data.

In summary, in Example 3, there is a one-to-one correspondence between the content data stored in the second non-volatile memory device 117 and the first-kind data (first authentication data) stored in the first non-volatile memory device 100, and it is determined whether or not the content data has been cloned in an unauthorized manner. This makes it possible to confirm that a person who is going to use the content data is the proper (authorized) user (user who uses a sole and proper host computer which is compatible with a particular non-volatile memory). This also makes it possible to confirm that the person is the user who acquired the second secret key properly. Thus, only the proper user can use the content including the second public key. As a result, the spoofing of the user, and the use of the content data cloned in an unauthorized manner, can be limited.

Specifically, for example, the non-volatile memory 111 can be connected to the host computer 110, and the host computer 110 can download the second secret key via Internet, etc. The user may be charged for the download of the content data. In this case, the second secret key may be varied from content data to content data.

In this configuration, when the non-volatile memory 111 is used by using the same host computer 110 thereafter, the host computer 110 owns the second secret key and the ID data (first authentication data) decrypted with the first secret key. This allows the host computer 110 to succeed in the authentication using the ID data and the second public key, with respect to the non-volatile memory 111. This method is effectively used to realize a node locked license.

When the non-volatile memory 111 is connected to the host computer 110 for the first time, the non-volatile memory 111 may set a flag so that the use by another computer may be limited. For example, as the flag, ID information that is unique to and allocated to each host computer 110 may be written in the non-volatile memory 111. In this case, the non-volatile memory 111 is operative to receive as an input the ID information of the host computer 110, from the host computer 110, while taking measures against spoofing.

In this configuration, for example, while the flag is ON, the non-volatile memory 111 does not newly send to the host computer 110 the ID data encrypted with the first public key or the ID data encrypted with the second public key. Between the non-volatile memory 111 and the host computer 110 to which the non-volatile memory 111 is firstly connected, the authentication can be carried out by using the ID data and the second public key. In this way, proper use can be realized.

The above authentication method is applicable to a program which executes a part or entire of the steps of the authentication method, or a providing method of the program.

An aspect of the present disclosure is useful as a non-volatile memory device which can provide a novel data storing method which is not provided in a prior art and is applicable to a safer encryption technique or the like.

Numeral improvements and alternative embodiments of the present disclosure will be conceived by those skilled in the art in view of the foregoing description. Accordingly, the description is to be construed as illustrative only, and is provided for the purpose of teaching those skilled in the art the best mode of carrying out the present disclosure. The details of the structure and/or function may be varied substantially without departing from the spirit of the present disclosure.

What is claimed is:

1. An authentication system comprising:
    a host computer; and
    a non-volatile memory that includes a memory cell array including a plurality of memory cells, the plurality of memory cells including:
        a memory cell in a variable state, in which a resistance value reversibly changes between a plurality of changeable resistance value ranges in accordance with an electric signal applied thereto; and
        a memory cell in an initial state which does not change to the variable state unless a forming stress for changing the memory cell in the initial state to the variable state is applied thereto, a resistance value of the memory cell in the initial state being within an initial resistance value range which does not overlap with the plurality of changeable resistance value ranges,
    wherein in the memory cell array, data including first authentication data is stored by storing in the memory cell in the initial state a first value of the first authentication data and storing in the memory cell in the variable state a second value of the first authentication data different from the first value,
    wherein at least one of the host computer and the non-volatile memory stores second authentication data, and
    wherein at least one of the host computer and the non-volatile memory is operative to perform authentication by verifying that a degree of match between the first authentication data and the second authentication data satisfies a preset condition.

2. The authentication system according to claim 1, wherein the changeable resistance value ranges include a high-resistance value range and a low-resistance value range.

3. The authentication system according to claim 1, wherein the stored data includes:
    first-kind data stored on the basis of whether or not the resistance value of each of the plurality memory cells is within the initial resistance value range; and
    second-kind data stored without utilizing whether or not the resistance value of each of the plurality of memory cells is within the initial resistance value range and on the basis of whether or not the resistance value of each of the plurality of memory cells is within at least one of the changeable resistance value ranges, and
    wherein the first authentication data includes first-kind authentication data stored as the first-kind data, and second-kind authentication data stored as the second-kind data.

4. The authentication system according to claim 1, wherein the non-volatile memory further includes an authentication control circuit operative to perform the authentication by verifying the first authentication data obtained from the memory cell array and the second authentication data obtained from the host computer.

5. The authentication system according to claim 4, wherein the host computer operative to output the second authentication data encrypted with a public key to the authentication control circuit, and
    wherein the authentication control circuit is operative to obtain the encrypted second authentication data from the host computer,
        decrypt the encrypted second authentication data with a secret key corresponding to the public key to obtain decrypted second authentication data, and
        perform the authentication by verifying the first authentication data obtained from the memory cell array and the decrypted second authentication data.

6. The authentication system according to claim 4, wherein the authentication control circuit is operative to store third authentication data,
    output the third authentication data to the host computer,
    obtain the second authentication data encrypted with a public key, from the host computer,
    obtain the third authentication data encrypted with the public key, from the host computer,
    decrypt the encrypted second authentication data to obtain decrypted second authentication data with a secret key corresponding to the public key,
    decrypt the encrypted third authentication data to obtain decrypted third authentication data with the secret key, and
    perform the authentication by verifying the decrypted third authentication data and the third authentication data stored therein, and verifying the first authentication data and the decrypted second authentication data.

7. The authentication system according to claim 5, wherein the data further includes the secret key.

8. The authentication system according to claim 4, wherein the authentication control circuit is operative to permit the host computer to access a content memory device only when the degree of match between the first authentication data and the second authentication data satisfies the preset condition.

9. The authentication system according to claim 4, wherein the host computer is operative to obtain the second authentication data from outside the host computer.

10. The authentication system according to claim 1, wherein the host computer stores the second authentication data, and
    wherein the host computer is operative to perform the authentication by verifying the first authentication data obtained from the non-volatile memory and the second authentication data.

11. The authentication system according to claim 10, wherein the non-volatile memory is operative to output the first authentication data encrypted with a public key to the host computer, and
    wherein the host computer is operative to
        obtain the encrypted first authentication data from the non-volatile memory,
        decrypt the encrypted first authentication data with a secret key corresponding to the public key to obtain decrypted first authentication data, and
        perform the authentication by verifying the decrypted first authentication data and the second authentication data.

12. The authentication system according to claim 11, wherein the non-volatile memory stores the encrypted first authentication data.

13. The authentication system according to claim 11, wherein the host computer stores the secret key.

14. The authentication system according to claim 10, further comprising:

a content memory device, wherein the host computer is operative to access the content memory device, only when a degree of match between the first authentication data and the second authentication data satisfies a preset condition.

15. The authentication system according to claim 10, further comprising:

a content memory device, wherein the host computer is operative to store content data in the content memory device, only when a degree of match between the first authentication data and the second authentication data satisfies a preset condition.

16. The authentication system according to claim 15, wherein the data includes additional data, wherein the host computer is operative to obtain the additional data from the non-volatile memory, and store the additional data in the content memory device, only when a degree of match between the first authentication data and the second authentication data satisfies a preset condition.

17. The authentication system according to claim 1, wherein in the memory cell array, the first authentication data encrypted with a first public key is stored, wherein the non-volatile memory further contains the second authentication data as the encrypted second authentication data, which is generated on the basis of the first authentication data, and wherein the host computer is operative to decrypt the encrypted first authentication data input from the non-volatile memory to obtain decrypted first authentication data, decrypt the encrypted second authentication data input from the non-volatile memory to obtain decrypted second authentication data, and perform the authentication by verifying the decrypted first authentication data and the decrypted second authentication data.

18. The authentication system according to claim 17, wherein the encrypted second authentication data is encrypted with a second secret key which is different from a first secret key corresponding to the first public key.

19. The authentication system according to claim 17, wherein the host computer is operative to decrypt the encrypted first authentication data input from the non-volatile memory to obtain the decrypted first authentication data, and encrypt the decrypted first authentication data to obtain the encrypted second authentication data, and wherein the non-volatile memory is operative to store the obtained encrypted second authentication data in the memory cell array.

20. The authentication system according to claim 18, further comprising:

a content memory device, wherein the content memory device contains content data and a second public key corresponding to the second secret key, and wherein the host computer is operative to decrypt the encrypted second authentication data with the second public key obtained from the content memory device.

\* \* \* \* \*